United States Patent
Wang et al.

(10) Patent No.: US 6,596,143 B1
(45) Date of Patent: Jul. 22, 2003

(54) APPARATUS FOR SWITCHING AND MANIPULATING PARTICLES AND METHOD OF USE THEREOF

(75) Inventors: Xiao-Bo Wang, San Diego, CA (US); Weiping Yang, San Diego, CA (US); Junquan Xu, Fujian (CN); Jing Cheng, Beijing (CN); Lei Wu, San Diego, CA (US)

(73) Assignee: Aviva Biosciences Corporation, San Diego, CA (US)

( * ) Notice: Subject to any disclaimer, the term of this patent is extended or adjusted under 35 U.S.C. 154(b) by 259 days.

(21) Appl. No.: 09/678,263

(22) Filed: Oct. 3, 2000

(30) Foreign Application Priority Data

Sep. 27, 2000 (CN) .......................................... 00129043 A

(51) Int. Cl.[7] .............................................. G01N 27/26
(52) U.S. Cl. ........................ 204/547; 204/643; 204/450
(58) Field of Search ................................ 204/547, 643, 204/450, 451, 600, 601, 660, 554

(56) References Cited

U.S. PATENT DOCUMENTS

| 5,454,472 | A | * | 10/1995 | Benecke et al. | 209/127.1 |
| 5,653,859 | A | | 8/1997 | Parton et al. | 204/450 |
| 5,993,631 | A | | 11/1999 | Parton et al. | 204/547 |
| 6,056,861 | A | | 5/2000 | Fuhr et al. | 204/547 |
| 6,149,789 | A | | 11/2000 | Benecker et al. | 204/547 |
| 6,306,272 | B1 | * | 10/2001 | Soane et al. | 204/450 |

FOREIGN PATENT DOCUMENTS

| DE | 195 44 127 C1 | 11/1995 |
| DE | 196 53 659 C1 | 12/1996 |
| WO | WO97/34689 | 9/1997 |

OTHER PUBLICATIONS

Becker, et al., Proc. Natl. Acad. Sci. USA, vol. 92, pp. 860–864, Jan. 1995, "Separation of Human Breast Cancer Cells from Blood by Differential Dielectric Affinity".

Edman, et al., Nucleic Acids Research, 1997, vol. 25, No. 24, pp. 4907–4914, 1997, "Electric Field Directed Nucelic Acid Hybridization on Microchips". Month unknown.

(List continued on next page.)

Primary Examiner—Nam Nguyen
Assistant Examiner—Alex Noguerola
(74) Attorney, Agent, or Firm—Knobbe, Martens, Olson & Bear LLP

(57) ABSTRACT

A device acts as a particle switch to transport and/or re-direct microparticles which are in a fluid suspension. The switch comprises at least three structural branches and the branches may be connected at a common junction. Particles can be transported along the branches as a result of the forces generated along that branch. Particles are transported into or out of the particle switch via the ends of the branches. Particles can be switched from one branch into one of the other branches. Depending on the properties of the particles, the transportation mechanism may be traveling-wave-dielectrophoresis or traveling-wave-electrophoresis.

53 Claims, 28 Drawing Sheets

OTHER PUBLICATIONS

Effenhauser, et al., Analytical Chemistry, vol. 66, No. 18, Sep. 15, 1994, "High–Speed Separation of Antisense Oligonucleotides on a Micromachined Capillary Electrophoresis Device".

Fuhr, et al., Sensors and Materials, vol. 7, No. 2 (1995) pp. 131–146, "Positioning and Manipulation of Cells and Microparticles Using Miniaturized Electric Field Traps and Traveling Waves". Month unknown.

Gascoyne, et al., IEEE Transactions on Industry Applications, vol. 33, No. 3, May/Jun. 1997, "Dielectrophoretic Separation of Cancer Cells from Blood".

Harrison, et al., Science, New Series, vol. 261, Issue 5123 (Aug. 13, 1993), pp. 895–897, "Micromachining a Miniaturized Capillary Electrophoresis–Based Chemical Analysis System on a Chip".

Huang, et al., Biochimica et Biophysica Acta 1282 (1996), pp. 76–84, "Membrane Changes Associated with the Temperature–Sensitive $P85^{gag-mos}$–Dependent Transformation of Rat Kidney Cells as Determined by Dielectrophoresis and Electrorotation". Month unknown.

Huang, et al., Journal of Hematotherapy & Stem Cell Research 8:481–490, 1999, "The Removal of Human Breast Cancer Cells from Hematopietic $CD34^+$ Stem Cells by Dielectrophoretic Field–Flow–Fractionation". Month unknown.

Huang, et al., J. Phys. D: Appl. Phys. 26 (1993) pp. 1528–1535, "Electrokinetic Behavior of Colloidal Particles in Travelling Electric Fields: Studies Using Yeast Cells". Month unknown.

Huang, et al., Phys. Med. Biol. 40 (1995) pp. 1789–1806, "Electrorotational Studies of the Cytomplasmic Dielectric Properties of Friend Murine Erythroleukaemia Cells". Month unknown.

Morgan, et al., J. Micromech. Mircoreng. 7 (1997) pp. 65–70, "Large–Area Travelling–Wave Dielectrophoresis Particle Separator". Month unknown.

Sosnowski, et al., Proc. Natl. Acad. Sci. USA, vol. 94, pp. 1119–1123, Feb. 1997, "Rapid Determination of Single Base Mismatch Mutations in DNA Hybrids by Direct Electric Field Control". Month unknown.

Wang, et al., J. Phys. D: Appl. Phys., vol. 27, pp. 1571–1574, 1994, "A Unified Theory of Dielectrophoresis and Travelling Wave Dielectrophoresis". Month unknown.

Wang, et al., Biochimica et Biophysica Acta 1193 (1994) pp. 330–344, "Changes in Friend Murine Erythroleukaemia Cell Membranes During Induced Differentiation Determined by Electrorotation". Month unknown.

Wang, et al., Biophysical Journal, vol. 72, Apr. 1997 pp. 1887–1899, "Dielectrophoretic Manipulation of Cells with Spiral Electrodes".

Wang, et al., IEEE Transactions on Industry Application, vol. 33, No. 3 May/Jun. 1997, "Dielectrophoretic Manipulation of Particles".

Wang, et al., Biochimica et Biophysica Acta 1243 (1995) pp. 185–194, "Non–Uniform Spatial Distributions of Both the Magnitude and Phase of AC Electric Fields Determine Dielectrophoretic Forces". Month unknown.

Yang, et al., Biophysical Journal, vol. 76, Jun. 1999, pp. 3307–3314, "Dielectric Properties of Human Leukocyte Subpopulations Determined by Electrorotation as a Cell Separation Criterion".

Gasperis, et al. "Microfluidic Cell Separation by 2–Dimensional Dielectrophoresis", Biomedical Microdevices, 2:1, pp. 41–49, 1999, Month unknown.

Wang, et al., "Cell Separation by Dielectrophoretic Field–Flow–Fractionation", Analytical Chemistry, Reprinted from vol. 72, No. 4, pp. 832–839, Feb. 2000.

Rai–Choudhury, P., Editor, "Handbook of Microlithography, Micromachining, and Microfabrication", vol. 1: Microlithography, Chapter 1 and 4, 1997.

Rai–Choudhury, P., Editor, "Handbook of Microlithography, Micromachining, and Microfabrication", vol. 2: Micromachining and Microfabrication, Chapter 1, 2 & 5 1997.

Masuda, et al., Separation of small particles suspended in liquid by nonuniform traveling field, May/Jun. 1987, IEEE Transactions on Industry Applications, vol., IA–23, No. 3.

* cited by examiner

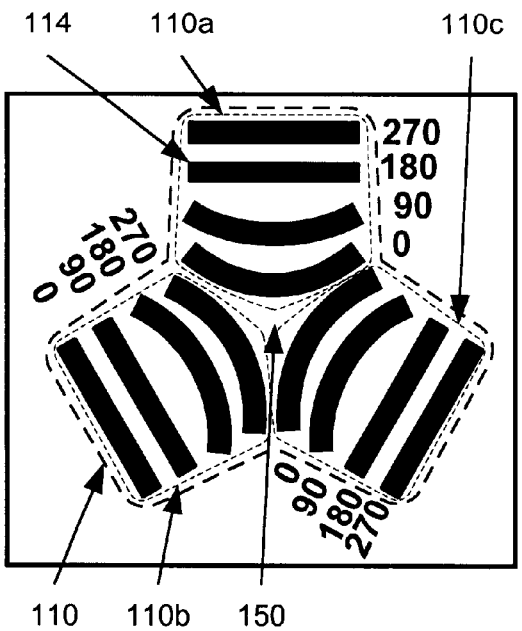
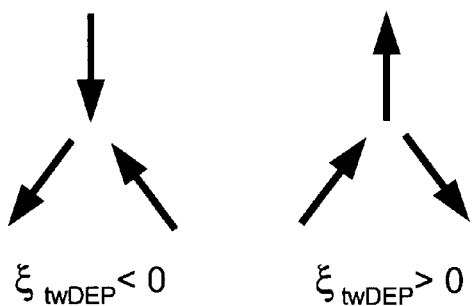
FIGURE 5A     FIGURE 5B     FIGURE 5C
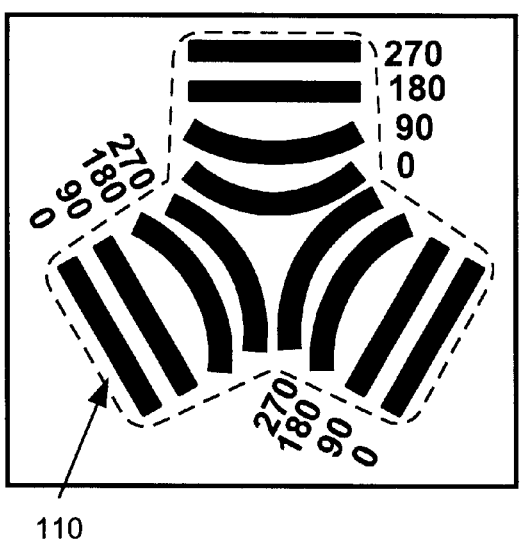
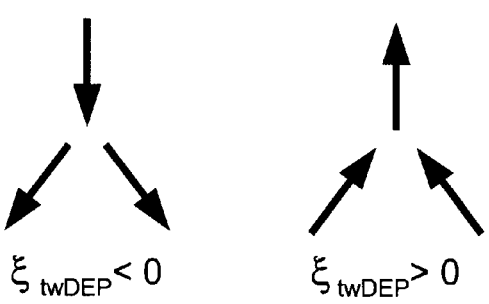
FIGURE 6A     FIGURE 6B     FIGURE 6C

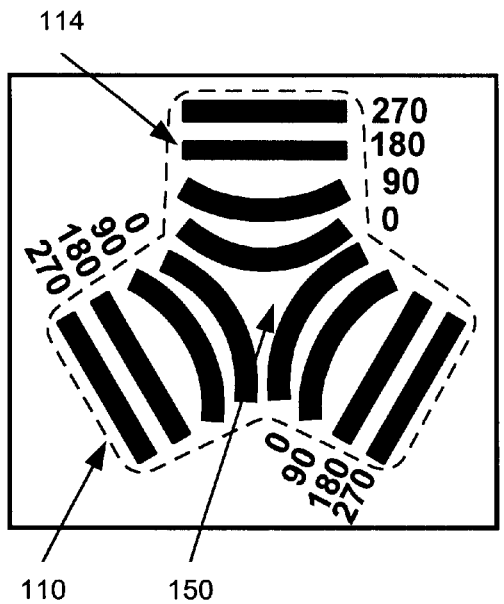
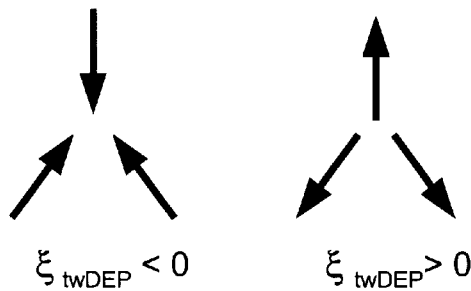
FIGURE 7A   FIGURE 7B   FIGURE 7C
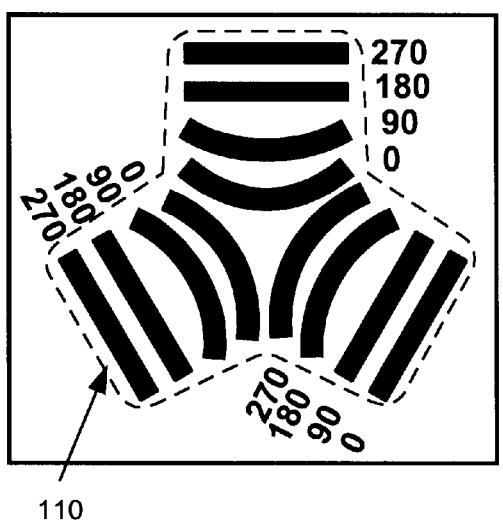
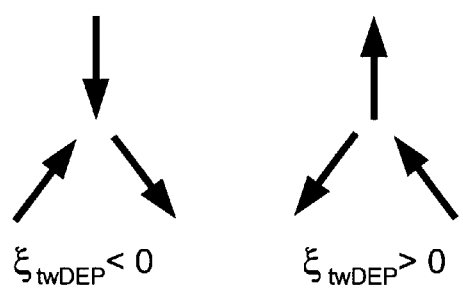
FIGURE 8A   FIGURE 8B   FIGURE 8C

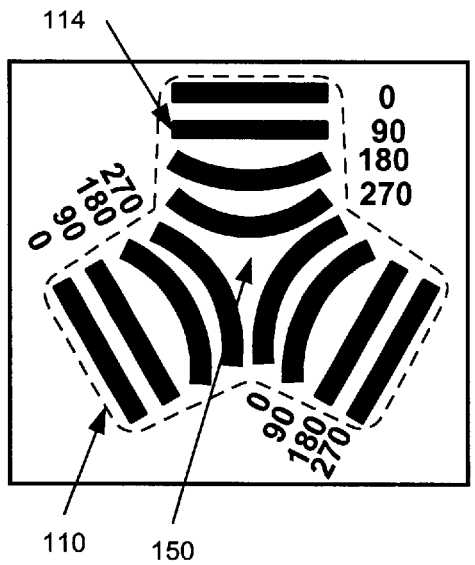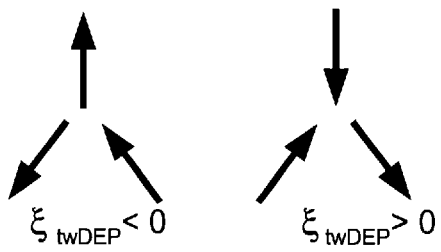
FIGURE 9A   FIGURE 9B   FIGURE 9C
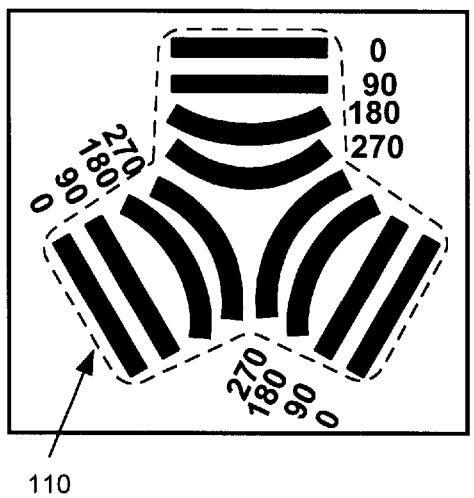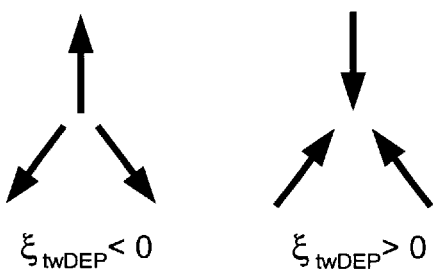
FIGURE 10A   FIGURE 10B   FIGURE 10C

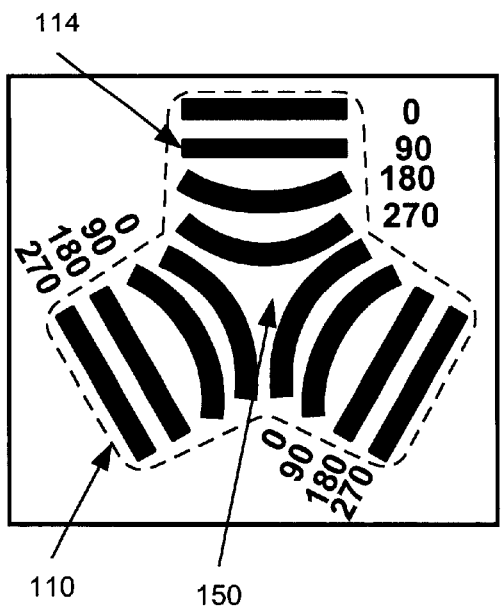
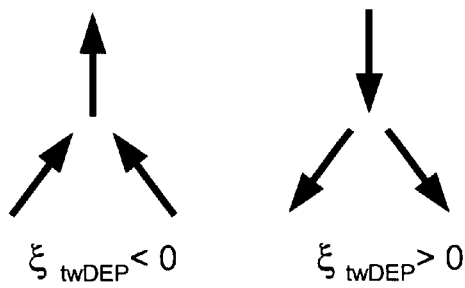
FIGURE 11A  FIGURE 11B  FIGURE 11C
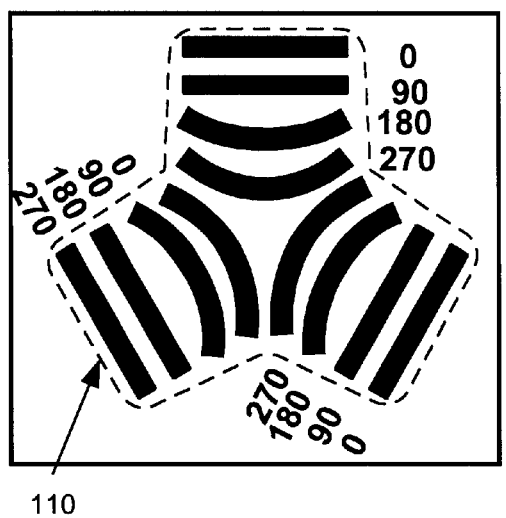
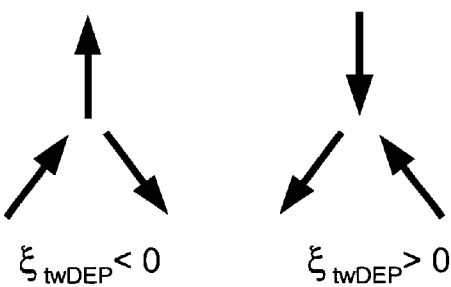
FIGURE 12A  FIGURE 12B  FIGURE 12C

US 6,596,143 B1

APPARATUS FOR SWITCHING AND MANIPULATING PARTICLES AND METHOD OF USE THEREOF

RELATED APPLICATIONS

The present application claims priority to the Chinese patent application entitled "Apparatus For Switching and Manipulating Particles and Method of Use Thereof", Serial No. 001290436, (NTD Patent & Trademark Agency Limited), filed on Sep. 27, 2000 the disclosure of which is incorporated herein by reference in its entirety.

BACKGROUND OF THE INVENTION

1. Field of the Invention

The invention is concerned with the manipulation of particles, and more particularly, with the manipulation of small particles (e.g., cells, microbeads) using electric fields.

2. Description of the Related Art

The manipulation of particles, especially biological material, can be used to advantage in a variety of biomedical applications. The ability to manipulate individual cancer cells is of particular significance, permitting the researcher to study the interaction of either a single cancer cell or a collection of cancer cells with selected drugs in a carefully controlled environment. Various kinds of forces can be used to manipulate particles, including optical, ultrasonic, mechanical, and hydrodynamic. For example, flow cytometry has been successfully used to sort and characterize cells. Another example is the centrifuge, which has been widely used in laboratories for processing biological samples.

A current trend in the biological and biomedical sciences is the automation and miniaturization of bioanalytical devices. The development of so-called biochip-based microfluidic technologies has been of particular interest. A biochip includes a solid substrate having a surface on which biological, biochemical, and chemical reactions and processes can take place. The substrate may be thin in one dimension and may have a cross-section defined by the other dimensions in the shape of, for example, a rectangle, a circle, an ellipse, or other shapes. A biochip may also include other structures, such as, for example, channels, wells, and electrode elements, which may be incorporated into or fabricated on the substrate for facilitating biological/biochemical/chemical reactions or processes on the substrate. An important goal for researchers has been to develop fully automated and integrated devices that can perform a series of biological and biochemical reactions and procedures. Ideally, such an integrated device should be capable of processing a crude, original biological sample (e.g., blood or urine) by separating and isolating certain particles or bio-particles from the rest of the sample (e.g., cancer cells in blood, fetal nucleated cells in maternal blood, or certain types of bacteria in urine). The isolated particles are then further processed to obtain cellular components (e.g., target cells are lysed to release biomolecules, such as DNA, mRNA and protein molecules). The cellular components of interest are then isolated and processed (e.g., DNA molecules are separated and target sequences are amplified through polymerase-chain-reactions, PCR). Finally, a detection procedure is performed to detect, measure and/or quantify certain reaction products (e.g., a hybridization may be performed on the PCR-amplified DNA segments with fluorescent detection then being used to detect the hybridization result). Clearly, the ability of a biochip to manipulate and process various types of particles, including cells and cellular components from a particle mixture, would be of great significance.

Limited progress has been made to date in the manipulation of particles or bioparticles on a chip. Electronic hybridization technologies have been developed in which charged DNA molecules are manipulated and transported on an electronic chip (e.g., "Rapid Determination of Single Base Mismatch Mutations in DNA Hybrids by Direct Electric Field Control", Sosnowski, R., et al., *Proc. Natl. Acad. Sci.*, Volume 94, pages 1119–1123, 1997; "Electric Field Directed Nucleic Acid Hybridization on Microchips", Edman, C., *Nucl. Acids Res.*, 25: pages 4907–4914, 1998, the disclosures of which are incorporated herein by reference in their entireties). Also, electrokinetic pumping and separation technologies have been developed in which biomolecules or other particles can be transported, manipulated, and separated through the use of electroosmosis and electrophoresis based kinetic effects (e.g., "Micromachining a miniaturized capillary electrophoresis-based chemical analysis system on a chip", Harrison, D. J. et al, *Science*, Volume 261, pages: 895–896, 1993; "High-speed separation of antisense of ligonucleotides on a micro machined capillary electrophoresis device", Effenhauser, C. S. et al., *Anal. Chem.* Volume 66, pages: 2949–2953, 1994, the disclosures of which are incorporated herein by reference in their entireties). However, each of these devices suffer from limitations. Accordingly, there is a need for improved particle manipulation devices.

SUMMARY OF THE INVENTION

The present invention relates to the manipulation of particles (including bioparticles such as cells, cell organelles) using traveling-wave dielectrophoresis. The devices and methods of the present invention are suitable for the selective processing and manipulation of one kind of particle in a particle mixture. The devices and methods of the present invention are also capable of concentrating and mixing different types of particles. In addition, the devices and methods of the present invention allow the flexible and easy manipulation and control of a single type or multiple types of particles.

In one embodiment, there is provided a device for producing traveling wave electric fields, which comprises at least three electrically independent branches. Each of the branches comprises a plurality of electrodes capable of producing a traveling wave electric field in its respective branch when the electrodes in its respective branch are connected to out-of-phase signals. The branches meet at a common junction.

In another embodiment, there is provided a device for producing traveling wave electric fields, which comprises at least three sets of electrodes. The sets of electrodes are capable of producing respective traveling wave electric fields in regions adjacent to the sets of electrodes when the electrodes are connected to out-of-phase signals. The sets of electrodes are electrically independent of each other and meet at a common junction.

In another embodiment, there is provided a device for manipulating particles, which comprises at least three sets of electrodes that are electrically independent from each other. The sets of electrodes are capable of generating respective traveling-wave dielectrophoresis (twDEP) forces on particles to move the particles along respective branches when the electrodes in the sets of electrodes are connected to out-of-phase signals, and the branches are interconnected at a common junction to permit the twDEP forces to route particles from one of the branches to another of the branches. In one preferred embodiment of the device, there are three sets of electrodes, and the three sets of electrodes are oriented at about 120 degrees with respect to each other. In another preferred embodiment of the device, there are four sets of electrodes, and the four sets of electrodes are oriented at about 90 degrees with respect to each other. In yet another preferred embodiment of the device, each of the sets of electrodes comprises at least three electrodes. In another preferred embodiment of the device, the device further comprises input tubing which is in fluid communication with a particle source and at least a first one of the sets of electrodes, and may further comprise output tubing in fluid communication with at least a second one of the sets of electrodes (in which the output tubing is in fluid communication with an output reservoir). In one preferred embodiment of the device, the at least three sets of electrodes are disposed on a solid substrate, and the substrate may be selected from the group consisting of silicon, glass, ceramics, and plastics. In another preferred embodiment of the device, the device further comprises a substrate on which the sets of electrodes are disposed, a cover having at least one port therein through which the input tubing passes, and a spacer element disposed between the substrate and the cover, in which the spacer element has an opening therein through which the particles to be manipulated are introduced from the input tubing. In one preferred embodiment of the device, the device further comprises at least one electrical signal source which applies AC voltages to each electrode in the sets of electrodes, in which the phases of the voltages applied to the electrodes of the sets of electrodes are selected to induce respective traveling wave electric fields along the branches. For example, these phases may be at 0, 90, 180, and 270 degrees with respect to each other. In another preferred embodiment of the device, the device further comprises conductor elements that extend from the electrodes to connection pads, in which the connection pads are connected to at least one signal generator. The electrodes in any given one of the sets of electrodes may all be connected to different connection pads, or alternatively, in any given one of the sets of electrodes, adjacent electrodes are connected to different connection pads and more than one electrode is connected to at least one of the connection pads. In a preferred embodiment of the device, the voltages applied to adjacent electrodes are out-of-phase with each other. In yet another preferred embodiment of the device, the device further comprises an electrically-independent, linear electrode set located adjacent one of the sets of electrodes, in which the linear electrode set is capable of producing traveling wave electric fields. In a preferred embodiment of the device, the particles comprise biological material. The biological material may comprise at least one member selected from the group consisting of cells, organelles, cell aggregates, biomolecule-covered microparticles, and complexes between moieties and their binding partners. Alternatively, the particles may comprise non-biological material. In yet another preferred embodiment of the device, at least one electrode that is disposed near the common junction has a curvature therein. In another preferred embodiment of the device, the electrodes have a configuration which is generally pointed. In yet another preferred embodiment of the device, the electrodes in each of the sets of electrodes are concentric arc segments with decreasing size towards the common junction.

In another embodiment, there is provided a device for manipulating particles, which comprises a first set of electrodes capable of generating traveling wave dielectrophoresis (twDEP) forces on particles which move the particles along a branch when the electrodes in the first set of electrodes are connected to out-of-phase signals. The device also comprises a second set of electrodes capable of generating a force, which urges the particles toward the center of the branch when the electrodes in the second set of electrodes are connected to at least one electrical signal. In a preferred embodiment, the first set of electrodes is disposed on a first substrate, the second set of electrodes is disposed on a second substrate, and the substrates are separated by a spacer.

In yet another embodiment, there is provided a device for manipulating particles, which comprises at least three branches. Each branch comprises a first set of electrodes capable of generating traveling wave dielectrophoresis (twDEP) forces on particles, which move the particles along a branch when the electrodes in the first set of electrodes are connected to out-of-phase signals. The branch also comprises a second set of electrodes capable of generating a force, which urges the particles toward the center of the branch when the electrodes in the second set of electrodes are connected to signals. The at least three branches meet at a common junction to permit the twDEP forces to route particles from one of the branches to another of the branches. In a preferred embodiment of the device, the second set of electrodes generate conventional dielectrophoresis (cDEP) forces, and the electrodes of the second set are oriented substantially perpendicular to the electrodes of the first set.

In another embodiment, there is provided a device for manipulating particles, which comprises an array of devices connected to one another. Each of the devices in the array comprises at least three sets of electrodes, which are electrically independent from each other. The sets of electrodes are capable of generating respective traveling-wave dielectrophoresis (twDEP) forces on particles to move the particles along respective branches when the electrodes in the sets of electrodes are connected to out-of-phase signals, and the branches are interconnected at a common junction to permit the twDEP forces to route particles from one of the branches to another of the branches.

In yet another embodiment, there is provided a method of transporting particles. The method comprises providing a plurality of electrodes, which are spaced apart from each other; and applying a voltage of a first polarity to a first electrode to attract particles having a net charge of a polarity opposite to the first polarity. The method comprises transporting the particles to a second electrode by applying a voltage of the first polarity to the second electrode, while reducing the magnitude of the voltage applied to the first electrode, so that the charged particles are moved away from the first electrode and attracted towards the second electrode; this transporting procedure is repeated for other electrodes to transport the particles from one electrode to another electrode in a step-wise fashion. In one preferred embodiment of the method, the plurality of electrodes comprises at least three sets of electrodes capable of generating forces on charged particles for moving the charged particles along respective branches, wherein the sets of electrodes are electrically independent from each other and the branches are interconnected at a common junction to permit the forces to route charged particles from one of the branches to another of the branches. In yet another preferred embodiment of the method, the step of reducing the magnitude of the voltage comprises reversing polarity of the first electrode. In another preferred embodiment of the method, the transporting step comprises applying a voltage of a polarity opposite to the first polarity to all the electrodes except the second electrode.

In another embodiment, there is provided a method of sorting particles. The method comprises providing a device that comprises at least three sets of electrodes which are electrically independent from each other, in which the sets of electrodes are capable of generating respective traveling-wave dielectrophoresis (twDEP) forces on particles to move the particles along respective branches when the electrodes in the sets of electrodes are connected to out-of-phase signals, and the branches are interconnected at a common junction to permit the twDEP forces to route particles from one of the branches to another of the branches. The method comprises introducing a sample comprising at least two types of particles into the device, and generating traveling wave dielectrophoresis forces at the junction such that at least one of the particle types travels away from the junction in a first direction and at least one of the other particle types travels away from the junction in a second direction. In a preferred embodiment of the method, the twDEP forces are generated by applying voltages to the sets of electrodes. In yet another preferred embodiment of the method, the method further comprises identifying at least one particle type before the particle type enters the junction and applying voltages to the sets of electrodes, in which the voltages are selected in view of the result of the identifying step. In yet another preferred embodiment of the method, the identifying step comprises monitoring the fluorescence of the particle types.

In another embodiment, there is provided a method of combining different kinds of particles, which comprises introducing at least a first kind of particle into a first branch of a device comprising at least three sets of electrodes which are electrically independent from each other. The sets of electrodes in the device are capable of generating respective traveling-wave dielectrophoresis (twDEP) forces on particles to move the particles along respective branches when the electrodes in the sets of electrodes are connected to out-of-phase signals, and the branches are interconnected at a common junction to permit the twDEP forces to route particles from one of the branches to another of the branches. The method comprises introducing at least a second kind of particle into a second branch of the device, and transporting the at least first kind and at least the second kind of particles towards the junction such that the at least first kind of particle and the at least second kind of particle are combined with one another at the junction.

In another embodiment, there is provided a method of concentrating particles, which comprises introducing particles into at least first and second branches of a device. The device comprises at least three sets of electrodes which are electrically independent from each other. The sets of electrodes are capable of generating respective traveling-wave dielectrophoresis (twDEP) forces on particles to move the particles along respective branches when the electrodes in the sets of electrodes are connected to out-of-phase signals, and the branches are interconnected at a common junction to permit the twDEP forces to route particles from one of the branches to another of the branches. The method comprises transporting the particles towards the junction such that the particles are concentrated at the junction. In one preferred embodiment of the method, the method comprises introducing particles into at least three branches of the device, and transporting the particles in the at least three branches towards the junction such that the particles are concentrated at the junction.

In yet another embodiment, there is provided a method of dispersing particles, which comprises introducing particles into a common junction of a device. The device comprises at least three sets of electrodes which are electrically independent from each other. The sets of electrodes are capable of generating respective traveling-wave dielectrophoresis (twDEP) forces on particles to move the particles along respective branches when the electrodes in the sets of electrodes are connected to out-of-phase signals, and the branches are interconnected at a common junction to permit the twDEP forces to route particles from one of the branches to another of the branches. The method comprises dispersing the particles away from the junction and into at least two of the branches. In a preferred embodiment of the method, the method comprises dispersing the particles away from the junction and into three branches.

In another embodiment, there is provided a method of separating a first kind of particle from a second kind of particle, the first and second kinds of particle being distributed throughout a device. The device comprises at least three sets of electrodes, which are electrically independent from each other. The sets of electrodes are capable of generating respective traveling-wave dielectrophoresis (twDEP) forces on particles to move the particles along respective branches when the electrodes in the sets of electrodes are connected to out-of-phase signals, and the branches are interconnected at a common junction to permit the twDEP forces to route particles from one of the branches to another of the branches. The method comprises applying conventional dielectrophoresis (cDEP) forces to the first kind of particle to cause the first kind of particle to remain stationary, and applying traveling wave dielectrophoresis (twDEP) forces to the second kind of particle to cause the second kind of particle to be moved away from and thereby be separated from the first kind of particle. In a preferred embodiment of the method, the method comprises causing the first kind of particle to be attracted to electrodes where the first kind of particle is held in place by the cDEP forces. In another preferred embodiment of the method, the method comprises diverting the second kind of particle to a desired branch. In yet another preferred embodiment of the method, the separation comprises applying electric fields of different frequencies to the electrodes, in which the fields of the different frequencies interact differently with the first and second kinds of particle to cause the first kind of particle to remain stationary while the second kind of particle is transported. In yet another preferred embodiment of the method, first and second kinds of particle are introduced onto electrodes in the form of a particle suspension. In still another preferred embodiment of the method, the method comprises separating out a third kind of particle from the first and second kinds of particle.

In another embodiment, there is provided a method of separating a first kind of particle from a second kind of particle, which comprises introducing a continuous stream of fluid having the first and second kinds of particle in suspension into a device. The device comprises at least three sets of electrodes, which are electrically independent from each other. The sets of electrodes are capable of generating respective traveling-wave dielectrophoresis (twDEP) forces on particles to move the particles along respective branches when the electrodes in the sets of electrodes are connected to out-of-phase signals, and the branches are interconnected at a common junction to permit the twDEP forces to route particles from one of the branches to another of the branches. The method also comprises applying conventional dielectrophoresis (cDEP) forces to the first kind of particle to cause the first kind of particle to be attracted to electrodes where the first kind of particle is held in place by cDEP forces while the second kind of particle is carried with the stream of fluid and thereby separated from the first kind of particle. The method comprises ceasing the stream of fluid, and applying electric voltages to the electrodes at a frequency selected to generate traveling wave dielectrophoresis forces for transporting the first kind of particle.

In yet another embodiment, there is provided a method of separating a first kind of particle from a second kind of particle, which comprises introducing a continuous stream of fluid having first and second kinds of particle in suspension into a device. The device comprises at least three sets of electrodes which are electrically independent from each other. The sets of electrodes are capable of generating respective traveling-wave dielectrophoresis (twDEP) forces on particles to move the particles along respective branches when the electrodes in the sets of electrodes are connected to out-of-phase signals, and the branches are interconnected at a common junction to permit the twDEP forces to route particles from one of the branches to another of the branches. The device comprises an electrically-independent, linear electrode set located adjacent one of the sets of electrodes, in which the linear electrode set is capable of producing traveling wave electric fields. The method comprises applying electric voltages to the linear electrode set to produce conventional dielectrophoresis (cDEP) forces on the first and second kinds of particles so that the first and second kinds of particles are attracted to electrodes of the linear electrode set where the first and second kinds of particles are held in place by the cDEP forces. The method comprises ceasing the stream of fluid, and applying electric voltages to the linear electrode set and to the at least three sets of electrodes at frequencies and phases selected to generate traveling wave dielectrophoresis forces for transporting the first kind of particle to the end of one branch and transporting the second kind of particles to the end of another branch.

BRIEF DESCRIPTION OF THE DRAWINGS

FIGS. 5A, B, C, 6A, B, C, 7A, B, C, 8A, B, C, 9A, B, C, 10A, B, C, 11A, B, C, and 12A, B, C illustrate how the phase of the AC voltage applied to the electrodes of a particle switch may be varied in order to transport particles in a certain way. In each case FIGURE A illustrates the relative phase values of the voltage applied to the electrodes, and FIGURES B and C show how particles are transported along the branches for particles having negative and positive twDEP polarization factors, respectively.

DETAILED DESCRIPTION OF THE PREFERRED EMBODIMENT

Figure 1A:
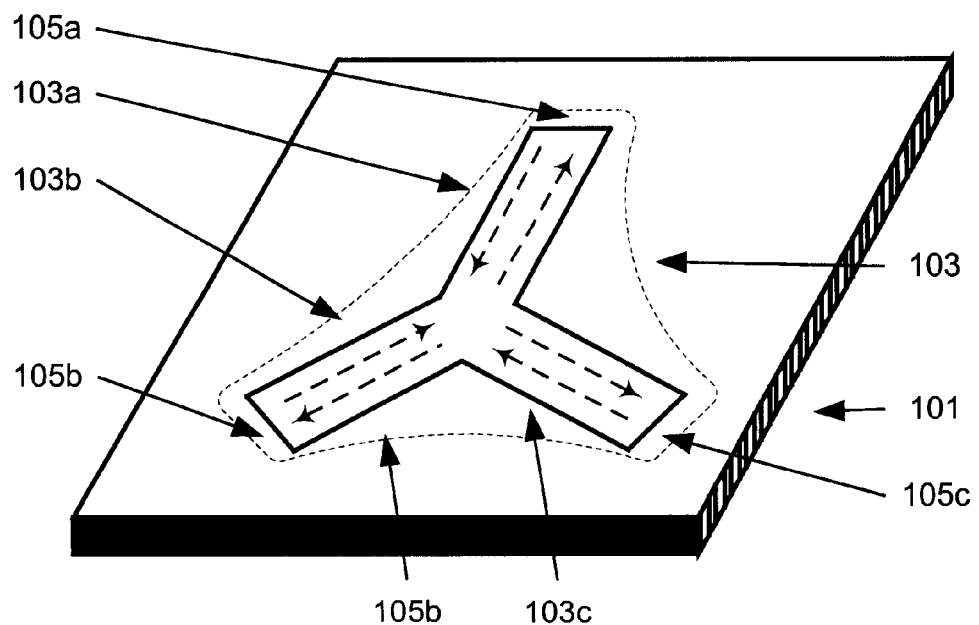
FIG. 1A is a schematic of one embodiment of a particle switch, which has three interconnected branches.

Unless otherwise defined, the technical and scientific terms used herein have the same meaning as is commonly understood by one of ordinary skill in the art.

As used herein, the terms "particles" and "microparticles" refer to any particulate matter, or solubilized matter, or any combination thereof on which twDEP may be performed. The diameter or characteristic dimension of such particles may range from nanometers to centimeters. The characteristic dimension of a particle (or a microparticle) is defined as the average of the lengths of its longest axis and shortest axis. Particles and microparticles are used interchangeably herein. The particles may be solid (e.g., glass beads, latex particles, plastic particles, magnetic beads), liquid (e.g., liquid droplets), or gaseous particles (e.g., gas bubble). The particles may include dissolved particles (e.g., molecules, proteins, antibodies, antigens, lipids, DNAs, RNAs, molecule-complexes), suspended particles (e.g., glass beads, latex particles, polystyrene beads). The particles may be organic (e.g., mammalian cells, bacteria, viruses, or other microorganisms) or inorganic (e.g., metal particles). Particles may be of different shapes (e.g., spherical, ellipsoidal, cubic, discoid, needle-type or other regular or irregular shapes) and can be of different sizes (e.g., nanometer-size gold sphere, to micrometer-size cells, to millimeter-size or centimeter particle-aggregates). Examples of the particles suitable for use with the embodiments herein include, but are not limited to, biomolecules such as DNA, RNA, chromosomes, protein molecules (e.g., antibodies), cells, colloid particles (e.g., polystyrene beads, magnetic beads), and molecule-particle complexes (e.g., protein molecules bound to antibody-coated magnetic beads).

The manipulation of particles using dielectrophoresis for addressing a number of cell separation and cell isolation problems has been reported (e.g., "Dielectrophoretic manipulation of particles," X-B. Wang et al., *IEEE/IAS Trans.*, vol. 33, pages 660–669, 1997, the disclosure of which is incorporated herein by reference in its entirety). Nevertheless, the current 2-D and 3-D dielectrophoresis-based manipulation technology for handling and processing particles on a biochip is very limited in terms of its flexibility, ease of use, applicability, and effectiveness. In general, current manipulation technologies for processing particles are of limited use and can only address certain kinds of problems. In particular, the efficiency of particle separation using these technologies needs improvement. Furthermore, on-chip techniques for transporting, separating, concentrating and mixing particles are limited.

The principle of using dielectrophoresis (DEP) forces to manipulate particles will now be described. DEP forces on a particle result from a non-uniform distribution of an AC electric field to which the particle is subjected. In particular, DEP forces arise from the interaction between an electric field induced polarization charge and a non-uniform electric field. The polarization charge is induced in particles by the applied field, and the magnitude and direction of the resulting dipole is related to the difference in the dielectric properties between the particles and medium in which the particles are suspended.

DEP forces may be either traveling-wave dielectrophoresis (twDEP) forces or conventional dielectrophoresis (cDEP) forces. A twDEP force refers to the force that is generated on a particle or particles, arising from a traveling-wave electric field. A traveling-wave electric field is characterized by AC electric field components, which have phase values that are non-uniformly distributed. On the other hand, a cDEP force refers to the force that is generated on a particle or particles, arising from the non-uniform distribution of the magnitude of an AC electric field. The origin of twDEP and cDEP forces is described in more detail below. The use of cDEP and twDEP forces for the manipulation of dielectric particles and the theory behind this use has been described in several articles, including "Electrokinetic behavior of colloidal particles in travelling electric fields: studies using yeast cells," Y. Huang et al., *J. Phys. D: Appl. Phys.*, vol. 26, pages 1528–1535, 1993; "A unified theory of dielectrophoresis and travelling-wave dielectrophoresis," X-B. Wang et al., *J. Phys. D: Appl. Phys.*, vol. 27, pages 1571–1574, 1994; "Dielectrophoretic Manipulation of Cells Using Spiral Electrodes," X-B. Wang et al., *Biophys. J.*, vol. 72, pages 1887–1899, 1997, "Dielectrophoretic manipulation of particles," X-B. Wang et al., *IEEE/IAS Trans.*, vol. 33, pages 660–669, 1997; "Positioning and manipulation of cells and microparticles using miniaturized electric field traps and travelling waves," by G. Fuhr et al., in *Sensors and Materials*, vol. 7, pages 131–146, 1995; and "Non-uniform spatial distributions of both the magnitude and phase of AC electric fields determine dielectrophoretic forces," X-B. Wang et al., *Biochim Biophys Acta*, vol. 1243, pages 185–194, 1995, the disclosures of which are incorporated herein by reference in their entireties.

An electric field of a single harmonic component may in general be expressed in the time-domain as $$\vec{E}(t) = \sum_{\alpha=x,y,z} E_{\alpha 0}\cos(2\pi f t + \varphi_\alpha)\vec{a}_\alpha, \quad (1)$$

where $\vec{a}_\alpha$ ($\alpha = x, y, z$) are the unit vectors in a Cartesian coordinate system, and $E_{\alpha 0}$ and $\phi_\alpha$ are the magnitude and phase, respectively, of the three field components. When a particle such as a cell is subjected to a non-uniform electric field (note that $E_{\alpha 0}$ and/or $\phi_\alpha$ vary with position), a net dielectrophoretic force is exerted on the particle because of the electric interaction between the field and the field-induced dipole moment in the particle. The DEP force is given by X-B. Wang et al. as (see "A unified theory of dielectrophoresis and travelling-wave dielectrophoresis" *J. Phys. D: Appl. Phys.*, vol. 27, pages 1571–1574, 1994, the disclosure of which is incorporated herein by reference in its entirety):

$$\vec{F}_{DEP} = 2\pi\epsilon_m r^3 (Re(f_{CM})\nabla E_{rms}^2 + Im(f_{CM})(E_{x0}^2\nabla\phi_x + E_{y0}^2\nabla\phi_y + E_{z0}^2\nabla\phi_z)), \quad (2)$$

where r is the particle radius, $\epsilon_m$ is the dielectric permittivity of the particle suspending medium, and $E_{rms}$ is the field RMS magnitude. The factor $f_{CM} = (\epsilon_p^* - \epsilon_m^*)/(\epsilon_p^* + 2\epsilon_m^*)$ is the dielectric polarization factor (the so-called Clausius-Mossotti factor). The complex permittivity is defined as $\epsilon_x^* = \epsilon_x - j\sigma_x/(2\pi f)$. The dielectric polarization factor depends on the frequency f of the applied field, conductivity $\sigma_x$, and permittivity $\epsilon_x$ of the particle (denoted by p) and its suspending medium (denoted by m).

As shown in Equation (2), dielectrophoretic (DEP) forces generally have two components, i.e., conventional DEP (cDEP) and traveling-wave DEP (twDEP) forces. The cDEP forces are associated with the in-phase component of the field-induced polarization (reflected by the term $Re(f_{CM})$, i.e., the real part of the factor $f_{CM}$, which is the conventional DEP polarization factor) interacting with the gradient of the field magnitude ($\nabla E_{rms}^2$). The traveling-wave DEP forces are associated with the out-of-phase component of the field-induced polarization (reflected by the term $Im(f_{CM})$, i.e., the imaginary part of the factor $f_{CM}$, which is the twDEP polarization factor) interacting with the gradient of the field phases ($\nabla\phi_x$, $\nabla\phi_y$ and $\nabla\phi_z$). It should be noted that an electric field in which the phase values of the field components are non-uniformly distributed is a traveling electric field, with the field traveling in the direction of decreasing phase value. An ideal traveling electric field (see below) has a phase distribution that varies linearly with position in the direction along which the field travels. Thus, the cDEP force refers to the force generated on a particle or particles due to a non-uniform distribution of the magnitude of an AC electric field. Although the conventional DEP force is sometimes referred to in the literature as simply the DEP force, this simplification in terminology is avoided herein. The same terminology used herein with respect to cDEP forces and twDEP forces has been used in a number of articles in the literature (see, for example, "A unified theory of dielectrophoresis and travelling-wave dielectrophoresis," X-B. Wang et al., *J. Phys. D: Appl. Phys.*, vol. 27, pages 1571–1574, 1994; "Non-uniform spatial distributions of both the magnitude and phase of AC electric fields determine dielectrophoretic forces," X-B. Wang et al., *Biochim Biophys Acta*, vol. 1243, pages 185–194, 1995; "Dielectrophoretic manipulation of particles," X-B. Wang et al., *IEEE/IAS Trans.*, vol. 33, pages 660–669, 1997; "Dielectrophoretic manipulation of cells with spiral electrodes", X-B. Wang et al., *Biophysical J.*, vol. 72, pages 1887–1899, 1997, the disclosures of which are incorporated herein by reference in their entireties).

The cDEP force $\vec{F}_{cDEP}$ acting on a particle of radius r which is subjected to an electrical field of non-uniform magnitude is given by $$\vec{F}_{cDEP} = 2\pi\epsilon_m r^3 \chi_{cDEP} \nabla E_{rms}^2 \quad (3)$$

where $E_{rms}$ is the RMS value of the field strength, and $\in_m$ is the dielectric permittivity of the medium. Equation (3) for a cDEP force is consistent with the general expression of DEP forces utilized above. The factor $\chi_{cDEP}$ is the particle cDEP polarization factor, given by $$\chi_{cDEP} = \text{Re}\left(\frac{\epsilon_p^* - \epsilon_m^*}{\epsilon_p^* + 2\epsilon_m^*}\right) \quad (4)$$

Here "Re" refers to the real part of the "complex number". The symbol $\in_x^* = \in_x - j\sigma_x/(2\pi f)$ is the complex permittivity. The parameters $\in_p$ and $\sigma_p$ are the effective permittivity and conductivity of the particle, respectively, and may be frequency dependent. For example, a typical biological cell will have frequency dependent conductivity and permittivity, which arises at least in part because of cytoplasm membrane polarization. Cell dielectric properties have been described in the literature. For example, the following articles provide dielectric properties of a number of mammalian cell types: "Membrane changes associated with the temperature-sensitive P85$^{gag-mos}$-dependent transformation of rat kidney cells as determined from dielectrophoresis and electrorotation", Y. Huang, et al, *Biochim. Biophys. Acta* Volume 1282, pages 76–84 1996; "Separation of human breast cancer cells from blood by differential dielectric affinity", F F. Becker, et al., *Proc. Nat. Academ. Sci. (USA)* Volume: 29, pages 860–864, 1995, the disclosures of which are incorporated herein by reference in their entireties.

The above equation for the conventional DEP force can be also be written as $$\vec{F}_{cDEP} = 2\pi \in_m r^3 \chi_{cDEP} V^2 (\nabla p) \quad (5)$$

where $p=p(x,y,z)$ is the square-field distribution for a unit-voltage excitation (Voltage V=1 V) on the electrodes, and V is the applied voltage.

When a particle exhibits a positive cDEP polarization factor ($\chi_{cDEP}>0$), the particle is moved by cDEP forces towards regions where the field is strongest. This is known as "positive cDEP", and the cDEP force is considered positive. On the other hand, when a particle exhibits a negative cDEP polarization factor ($\chi_{cDEP}<0$), the particle is moved by cDEP forces away from those regions where the field is strongest and towards those regions where the field is weakest. This is known as "negative cDEP", and the cDEP force is considered negative.

The twDEP force $F_{twDEP}$ for an ideal traveling wave field acting on a particle of radius r and subjected to a traveling-wave electrical field $E_{twDEP} = E\cos(2\pi(ft-z/\lambda_0))\vec{a}_x$ (i.e., the x-component of an E-field traveling in the z-direction, the phase value of the field x-component being a linear function of the position along the z-direction) is given by $$\vec{F}_{TWDEP} = \frac{4\pi^2 \in_m}{\lambda} r^3 \zeta_{twDEP} E^2 \cdot \vec{a}_z \quad (6)$$

where E is the magnitude of the field strength, and $\in_m$ is the dielectric permittivity of the medium. $\zeta_{twDEP}$ is the particle twDEP polarization factor and is given by $$\zeta_{twDEP} = \text{Im}\left(\frac{\epsilon_p^* - \epsilon_m^*}{\epsilon_p^* + 2\epsilon_m^*}\right) \quad (7)$$

Here "Im" refers to the imaginary part of the corresponding complex number. The symbol $\in_x^* = \in_x - j\sigma_x/(2\pi f)$ is the complex permittivity. The parameters $\in_p$ and $\sigma_p$ are the effective permittivity and conductivity of the particle, respectively, and may be frequency dependent.

Thus, the traveling-wave DEP force component of a DEP force acts on a particle in a direction that is either oriented with or against that of the direction of propagation of the traveling-wave field, depending upon whether the twDEP polarization factor is negative or positive, respectively. If a particle exhibits a positive twDEP-polarization factor ($\zeta_{twDEP}>0$) at the frequency of operation, the twDEP force will be exerted on the particle in a direction opposite that of the direction in which the electric field travels. On the other hand, if a particle exhibits a negative twDEP-polarization factor ($\zeta_{twDEP}<0$) at the frequency of operation, the twDEP force will be exerted on the particle in the same direction in which the electric field travels. For traveling-wave DEP manipulation of particles (including biological cells), traveling-wave DEP forces acting on a particle having a diameter of 10 microns are on the order of 0.01 to 10000 pN.

Generally, a traveling-wave field generates both twDEP forces ($\vec{F}_{twDEP}$) as well as conventional DEP forces ($\vec{F}_{cDEP}$). How a particle is moved or manipulated depends upon the relative strength of the two types of forces ($\vec{F}_{cDEP}$ and $\vec{F}_{twDEP}$). Thus, the manipulation of particles or particle mixtures will depend on the distribution of the electrical fields, the frequency of the applied field, and the magnitudes of the twDEP-polarization factor and the conventional-DEP-polarization factor. Thus, particles such as biological cells will experience cDEP and twDEP forces which depend upon their dielectric properties, which in turn are related to their permittivity and conductivity. Accordingly, particles having different dielectric properties which are subjected to identical electrical fields will experience different cDEP forces and different twDEP forces. A traveling wave electric field can be produced, for example, by applying appropriate AC signals to electrodes or microelectrodes. The electrodes or microelectrodes may be fabricated on a substrate, thereby forming a chip or microchip or particle manipulation chip, as described in a number of articles in the literature (See, for example, "Electrokinetic behavior of colloidal particles in travelling electric fields: studies using yeast cells," Y. Huang et al., *J. Phys. D: Appl. Phys.*, vol. 26, pages 1528–1535, 1993; "Non-uniform spatial distributions of both the magnitude and phase of AC electric fields determine dielectrophoretic forces," X-B. Wang et al., *Biochim Biophys Acta*, vol. 1243, pages 185–194, 1995"; "Dielectrophoretic manipulation of cells with spiral electrodes", X-B. Wang et al., *Biophysical J.*, vol. 72, pages 1887–1899, 1997; "Positioning and manipulation of cells and microparticles using miniaturized electric field traps and travelling waves", G. Fuhr et al., *Sensors and Materials*, vol. 7, pages 131–146, 1995; "Large-area traveling-wave dielectrophoretic particle separator", H. Morgan et al., *J. Micromech. Microeng.* Volume 7, pages 65–70, 1997, the disclosures of which are incorporated herein by reference in their entireties.)

For generating a traveling-wave-electric field, it is necessary to apply at least three electrical signals which are out-of-phase with each other. One possibility is to apply four phase-quadrature signals (0, 90, 180 and 270 degrees) to respective linear, parallel electrodes, as described in PCT application WO 97/34689, "Apparatus with electrode arrays for carrying out chemical, physical, or physico-chemical reaction," by R. Pethig et al, the disclosure of which is incorporated herein by reference in its entirety. See also U.S. Pat. No. 5,653,859, "Methods of analysis/separation", to Parton et al.; U.S. Pat. No. 5,993,631, "Methods of analysis/ separation" to Parton et al.; "Electrokinetic behavior of colloidal particles in travelling electric fields: studies using yeast cells," Y. Huang et al., *J. Phys. D: Appl. Phys.*, vol. 26, pages 1528–1535, 1993; "Non-uniform spatial distributions of both the magnitude and phase of AC electric fields determine dielectrophoretic forces," Wang et al., *Biochim Biophys Acta*, vol. 1243, pages 185–194, 1995"; and "Large-area traveling-wave dielectrophoretic particle separator", H. Morgan et al., *J. Micromech. Microeng.* volume 7, pages 65–70, 1997, the disclosures of which are incorporated herein by reference in their entireties. However, these devices are limited in their ability to simultaneously manipulate more than one kind of particle and are also limited with respect to their flexibility in transporting and directing a single kind or multiple kinds of particles.

In PCT application WO97/34689, a traveling-wave junction is formed by interweaving two sets of linear, parallel electrodes such that the electrodes in the junction are not electrically independent from the electrodes in the two electrode sets. Because the electrodes in the junction of this device are electrically connected to the electrodes in the two electrode sets, it is limited in its ability to separate particles from a mixture and also limited in its ability to transport and manipulate a single type or multiple types of particles. For example, particles from the three channels of the device cannot be simultaneously concentrated at the junction of the device. Further, particles within the device cannot be directed out of all three channels simultaneously. The device is also limited with respect to multi-frequency operation, i.e., operating the channels of the device at multiple frequencies, since the channel formed out of the interwoven electrodes cannot be operated at a frequency independent of the frequencies applied to the other two channels. These aspects of the device make it difficult to use in sophisticated manipulation and processing applications.

The particles herein may include complexes formed between moieties and their binding partners, as described in U.S. patent application "METHODS FOR MANIPULATING MOIETIES IN MICROFLUIDIC SYSTEMS" to X-B. Wang et al., Application Ser. No. 09/636,104, filed on Aug. 10, 2000, the disclosure of which is incorporated herein by reference in its entirety. "Moiety" refers to any substance whose manipulation is desirable. In some embodiments, the dimension of the moiety does not exceed 1 cm. Non-limiting examples of moieties that can be manipulated through the methods described herein are cells, cellular organelles (e.g. chromosomes, mitochondria, nuclei), viruses, molecules, (e.g., proteins, DNAs, RNAs, antibodies, antigens, enzymes, hormones, and polysaccharides), and an aggregate or complex thereof. The term "binding partners" refers to substances that bind to the moieties to be manipulated with desired affinity or specificity. Non-limiting examples of binding partners are cells, cellular organelles, viruses, microparticles or an aggregate or complex thereof, or an aggregate or complex of molecules. Binding partner-moiety complexes include particle-particle complexes and particle-molecule complexes (e.g., cell-magnetic bead complexes formed by binding cells onto antibody-coated beads through the interaction of antigens or protein molecules on cell surfaces with the antibody molecules immobilized on the magnetic bead surfaces; DNA molecule-magnetic bead complexes formed by immobilizing DNA molecules on magnetic bead surfaces, and protein molecule-polystyrene bead complexes formed by covering polystyrene bead surfaces with protein molecules). The methods disclosed in U.S. patent application Ser. No. 09/636,104, "METHODS FOR MANIPULATING MOIETIES IN MICROFLUIDIC SYSTEMS" to Wang et al., filed on Aug. 10, 2000 may be used for forming moieties and/or binding partner-moiety complexes to be manipulated in the present invention.

As used herein, a "chip" refers to a solid substrate on which certain processes, such as physical, chemical, biological, biophysical or biochemical processes, etc., can be carried out. Various types of 2-D or 3-D structures/microstructures, such as channels, wells, and electrode elements, may be incorporated or fabricated on the substrate for facilitating physical/biophysical/biological/biochemical/chemical reactions or processes on the substrate. The chip may be thin in one dimension and may have a cross section defined by the other dimensions, in the shape of, for example, a rectangle (e.g., a microscope glass slide having a thickness of about 1 mm), a circle (e.g., a 4 inch diameter silicon wafer having a thickness less than 1 mm), an ellipse, or other regular or irregular shapes. In some embodiments, the surface area of the chips used in the present methods can range from about 1 $mm^2$ to about 0.25 $m^2$. Preferably, the size of the chips useable in the present methods can be anywhere from about 4 $mm^2$ to about 25 $cm^2$ with a characteristic dimension (i.e., length or width for a rectangular chip; diameter for a circular chip) from about 1 mm to about 5 cm. However, the chips may have any dimensions compatible with their intended use. The chip surface may or may not be flat. Chips with uneven surfaces may include channels or wells fabricated on the surfaces.

As used herein, "biochip" refers to a class of chips on which certain processes, such as chemical, biological, biophysical or biochemical processes, etc., can be carried out.

As used herein, "electrode" refers to a structure of highly electrically-conductive material throughout which an applied electrical voltage is preferably constant or nearly-constant. Nearly-constant means that the voltage drop across such an electrically-conductive structure is so small that an electrical field sufficiently strong for inducing cDEP and/or twDEP manipulation forces at the regions around the electrode elements can be generated when the electrical signals are applied to the electrode elements. Typically, the electrically-conductive materials include metal films (e.g., gold, platinum, titanium, chromium, etc.) and semiconductor materials such as silicon doped with impurities (e.g., silicon doped with phosphorus, arsenic, antimony, aluminum, gallium, or indium), and other materials (e.g., metal wires) whose electrical conductivity is high. Electrically-conductive material refers to material whose electrical conductivity is substantially larger than that of the medium in which the particles to be manipulated are suspended.

As used herein, "manipulation" refers to moving or processing particles through one-, two- or three-dimensional movement of the particles in a medium. Non-limiting examples of manipulation include transportation, attraction, trapping, repulsion, concentration, levitation, separation, isolation, linear motion or other directed motion of the particles. Manipulation of particles may also include changing the direction of their motion.

FIG. 1A shows a first preferred embodiment 101 of a particle manipulation device. The device comprises a particle switch 103, which includes three interconnected branches 103a, 103b, and 103c. As illustrated, the three branches 103a, 103b and 103c meet each other at the center of the particle switch 103. Examples of the layout of the electrodes which can be used in the branches are given below. As illustrated by the dashed lines with arrowheads, particles can be transported along each branch in either direction, depending on the dielectric properties of the particles and how they are manipulated by electric fields within the device 101. Furthermore, depending on how the particles are manipulated, the three branch-end positions 105a, 105b, and 105c of the respective branches 103a, 103b and 103c are used as either particle-input(s) or particle-output(s) for the particle switch 103. For example, the position 105a in the branch 103a can be used as a particle-input for the particle switch 103 to receive particles, which then travel through the branches and exit the particle switch 103 through one or both of the branch-end positions 105b and 105c, depending upon the nature of the particles and how they are manipulated by electric fields within the device 101. The particles discussed herein which are manipulated may comprise non-biological and biological material. Preferably, however, the particles include biological materials such as cells, organelles, cell aggregates, and biomolecule-covered microbeads. Further details regarding the nature of the particles are provided herein. The particle manipulation devices, apparatuses and methods disclosed herein have many applications, such as biomedical/ pharmaceutical research, medical diagnosis, and novel drug development. Indeed, they can be used to study almost any chemical or biochemical reaction involving micro-particles (such as biological cells, bacteria, virus, DNA, RNA, protein molecules, plastic beads, magnetic beads etc) and molecules.

Figure 1B:
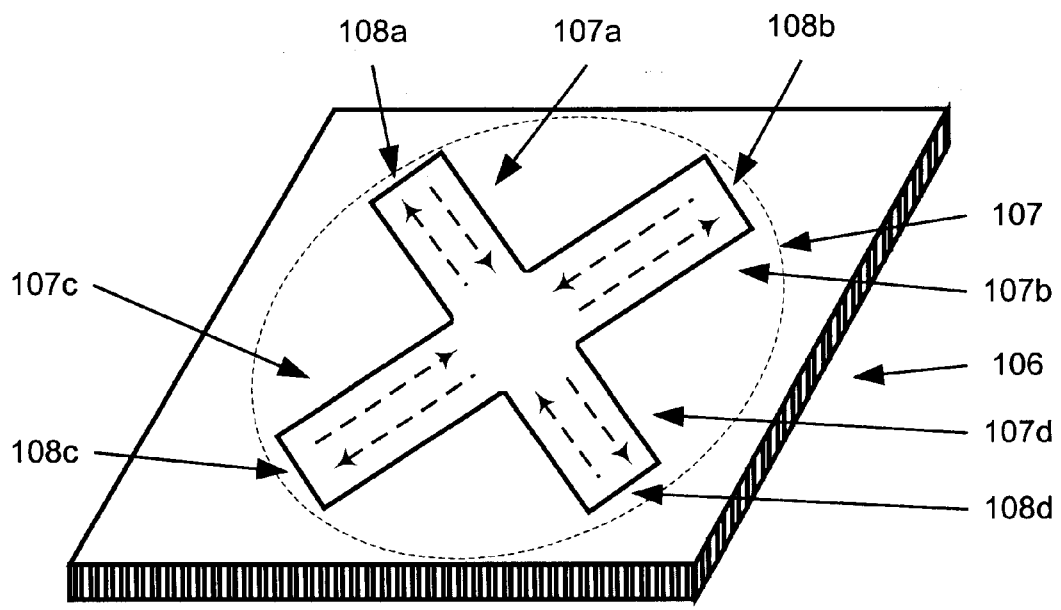
FIG. 1B is a schematic of one embodiment of a particle switch, which has four interconnected branches.

FIG. 1B shows another preferred embodiment 106 used for particle manipulation. The device 106 comprises a particle switch 107, which includes four interconnected branches 107a, 107b, 107c, and 107d. As illustrated, the four branches 107a, 107b, 107c, and 107d meet each other at the center of the particle switch 107. Examples of the layout of the electrodes which can be used in the branches are given below. As illustrated by the dashed lines with arrowheads, particles can be transported along each branch in either direction, depending on the dielectric properties of the particles and how they are manipulated by electric fields within the device 106. Furthermore, depending on how the particles are manipulated, the four branch-end positions 108a, 108b, 108c, and 108d of the respective branches 107a, 107b, 107c, and 107d, can be used as either particle-input(s) or particle-output(s) for the particle switch 107. For example, the branch-end position 108a in the branch 107a can be used as a particle-input for the particle switch 107 to receive particles, which then travel through the branches and exit the particle switch 107 through one or two or all three branch-end positions 108b, 108c, and 108d, depending upon the nature of the particles and how they are manipulated.

Figure 2:
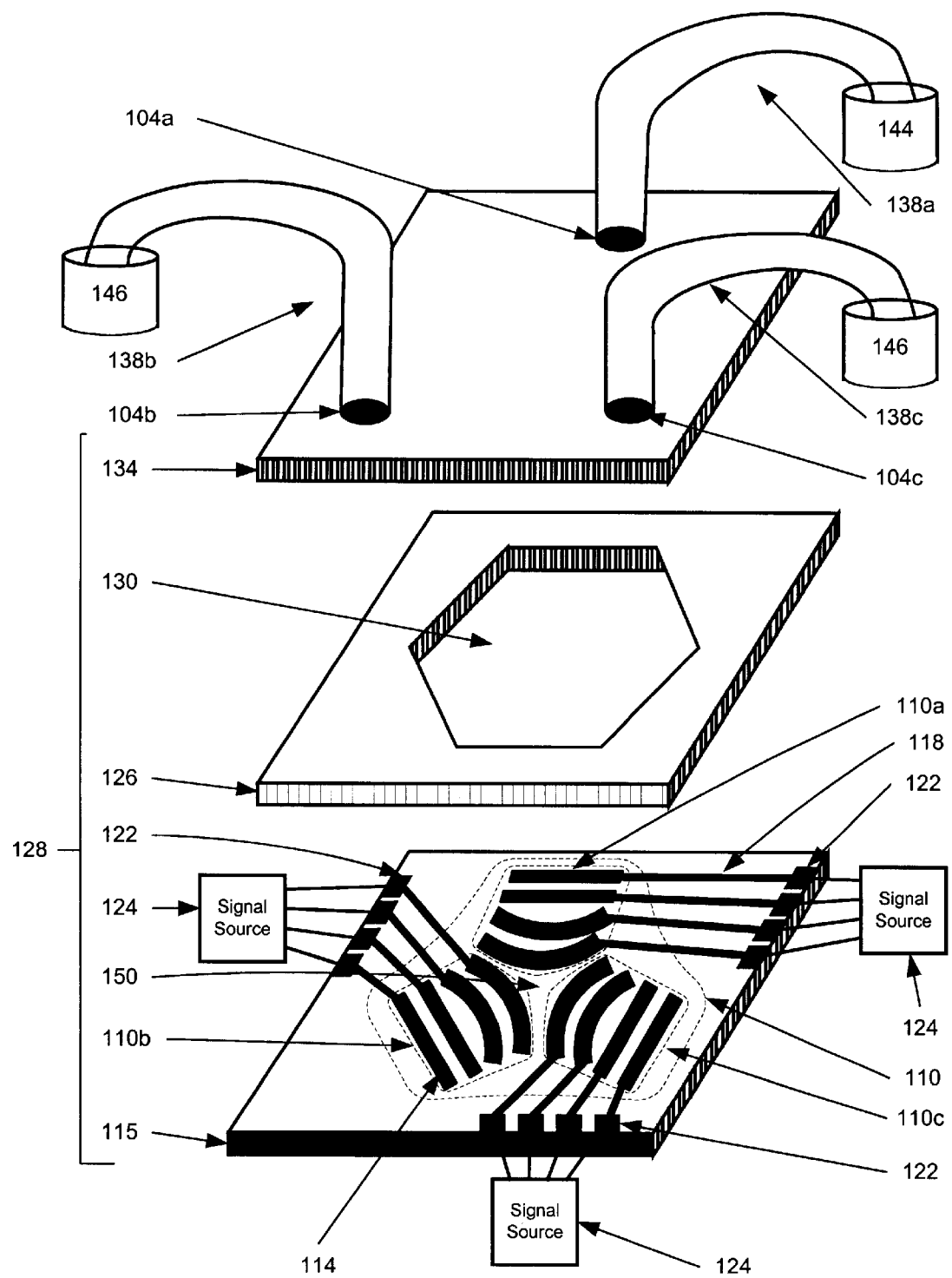
FIG. 2 is an assembly view of an apparatus that comprises a particle switch fabricated on a substrate to form a particle manipulation chip.

FIG. 2 is an exploded view of an apparatus 128 which generates traveling wave electric fields for the manipulation of particles, and shows how the apparatus 128 is constructed. The apparatus 128 comprises a substrate 115 onto which three sets 110a, 110b, 110c of electrodes 114 are disposed to form a particle switch 110. Note the three sets 110a, 110b, 110c of electrodes correspond to the three branches 103a, 103b, 103c, respectively, shown in FIG. 1. The three sets 110a, 110b, 110c of electrodes in this embodiment are spatially oriented at about 120 degrees with respect to each other, although other angular orientations may be desirable for certain applications.

The substrate 115 may be silicon, glass, a ceramic, plastic, or another solid material. The substrate materials may be porous or non-porous. The substrate may be 0.5–20 cm long or longer on each side but may have any dimensions compatible with its intended use. The electrodes 114 may be metallic films (e.g., gold, platinum) deposited onto the substrate 115. The electrodes 114 may be fabricated on the substrate 115 using photolithography with either single or multiple photomasks, or they may be fabricated using other microfabrication methods or micromachining protocols, as known to those skilled in the art of microlithography and microfrabrication (See, for example, Rai-Choudhury P. (Editor), Handbook of Microlithography, Micromachining and Microfabrication, Volume 2: Micromachining and microfabrication, SPIE Optical Engineering Press, Bellingham, Wash., USA (1997), the disclosure of which is incorporated herein by reference in its entirety). The protocols in the microfabrication may include many basic steps, for example, photolithographic mask generation, metal deposition, insulator deposition, photoresist deposition, photoresist patterning with masks and developers, and metal or insulator layer patterning. Electrodes may be made of metal (such as aluminum, gold, silver, tin, copper, platinum, palladium), carbon, semiconductor materials such as phosphorous-doped silicon, or any other material having a suitably high electrical conductivity. The substrate onto which the electrodes are fabricated may be silicon, plastic, glass, ceramics, or another solid material. The solid materials may be porous or non-porous. Those skilled in the field of microfabrication and micromachining fabrication may readily choose and determine the fabrication protocols and materials to be used for the fabrication of particular electrode structures.

The electrodes 114 may have any thickness. Preferably, the resistance of the electrodes is sufficiently small that the voltage applied to the electrodes is nearly constant on the electrode surfaces. The electrodes 114 advantageously have a thickness of about 0.001 to about 10 microns, and more preferably have a thickness between about 0.1 to about 1.0 microns. Each electrode 114 may be any width or length. Preferably, however, each electrode is about 1 to about 100 microns wide and about 5 to about 10000 microns long. More preferably, the electrodes have a length of about 20 to about 2000 microns. The electrodes 114 may advantageously be separated from adjacent electrodes by a gap having a width which is the same or similar to the width of the electrodes. Alternatively, the electrodes 114 may be separated from adjacent electrodes by any distance compatible with their intended use. For example, the electrodes may be separated by gaps having widths of about 0.2 to about 500 microns. The electrodes 114 are connected by respective electrical conductor elements 118 to respective connection pads 122. Both the electrical conductor elements 118 and connection pads 122 may be fabricated on the substrate 115 using protocols or methods like those used for fabricating the electrodes 114. The connection pads 122 are in turn electrically connected to at least one signal generator 124 which provides voltage to the electrodes 114. The AC voltages applied to adjacent electrodes 114 may differ in phase by any amount which induces a traveling electrical wave. For example, the AC voltages applied to adjacent electrodes may differ by 90 degrees, e.g., the phases of the AC voltage applied to the electrodes may be at 0, 90, 180, and 270 degrees with respect to each other. Although this is suggested by FIG. 2, which shows only 4 electrodes 114 for each branch (110a, 110b, 110c), it should be understood that this is illustrative only, and a typical branch may, depending on the application, have three or more electrodes 114 which extend over a distance between 5 microns and 10 cm. Preferably, a branch may extend over a distance of between 20 microns and 200 microns. In addition, other phase arrangements are possible, e.g., the AC voltage applied to adjacent electrodes 114 may differ in phase by 120 degrees. In this case, the phases of the AC voltage applied to the electrodes are at 0, 120, and 240 degrees with respect to each other. In preferred embodiments, the difference in phase between the signals applied to adjacent electrodes is constant and is equal to 360/N, where N is the number of the electrodes over which the phase of the applied signals varies by 360 degrees (the number N is larger than 2). For example, when N=3, the phase difference between adjacent electrodes is 120 degrees. When N=4, the phase difference between adjacent electrodes is 90 degrees. When N=5, the phase difference between adjacent electrodes is 72 degrees. In addition, the frequency of the AC voltage may have any value which induces in traveling electrical wave capable of transporting the desired particles. In some embodiments, the phases, magnitudes and/or frequencies of the AC voltages applied to the electrodes in different branches may be different in order to achieve the desired movement of the particles.

The electrodes 114 in the particle switch 110, the conductor elements 118 and the connection pads 122 may be fabricated directly onto the substrate 115. The substrate 115 together with the fabricated electrode elements are referred to herein either as a particle manipulation chip or as a particle switch chip.

The electrodes 114 in the particle switch 110 (and the electrical conductor elements 118 linking the electrodes to the connection pads 122) may be made using methods other than the microfabrication or micromachining protocols described above. The electrodes may be simple electrical wires of appropriate diameter (e.g., 80 microns) arranged according to the configuration shown in FIG. 2 and bound onto pre-fabricated channels on a substrate surface. Channels designed to receive electrode sets like those shown in FIG. 2 may be formed on the substrate by etching or other methods. Such channels allow the electrical wires to be buried into the substrate so that the highest points on the wires are level with or slightly above (e.g., protrude <5 micron above) the substrate surface. The electrical conductor elements 118 may be formed using similar methods.

Referring to FIG. 2, a spacer element 126 into which an opening 130 has been cut is disposed above the substrate 115. The spacer element 126 preferably has a thickness which is larger than the largest dimension of the particles to be manipulated, and which is suitable for specific manipulation applications. For example, the thickness of the spacer element 126 may be between about 10 microns and about 5 mm. More preferably, the spacer is between about 20 and about 500 microns thick. The spacer element 126 may be made of any thin, non-conducting material, for example, a film made of a polymer, plastic, or Teflon. The spacer element is bonded to the substrate 115. The opening 130 is preferably sufficiently large to cover the whole area of the electrodes of the particle switch 110. For example, the opening 130 may be several millimeters wide. The spacer 126 with its opening 130 may be formed, for example, by cutting the spacer film. Alternatively, a rubber O-ring may be used as a spacer, or the spacer 126 with its opening 130 may be made by plastic molding. Disposed above and bonded to the spacer element 126 is a cover 134 into which the three ports 104a, 104b, 104c are formed. The three ports 104a, 104b and 104c may be used as input and output ports of the apparatus, allowing the particles to be manipulated to enter or to leave the apparatus. For example, the port 104a may be used as the input port, and the ports 104b and 104c may be used as output ports. In this case, the input port 104a adjoins an input tubing segment 138a through which particles suspended in fluid (i.e., a particle suspension) may be injected through appropriate means. The particle suspension may be housed in a particle source 144 which is in fluid communication with the input tubing segment 138a. Particles and fluid exit the apparatus 128. through one or both of the two exit ports 104b, 104c, which are connected to respective output tubing segments 138b, 138c, and may enter one or more output reservoirs 146.

Figure 16:
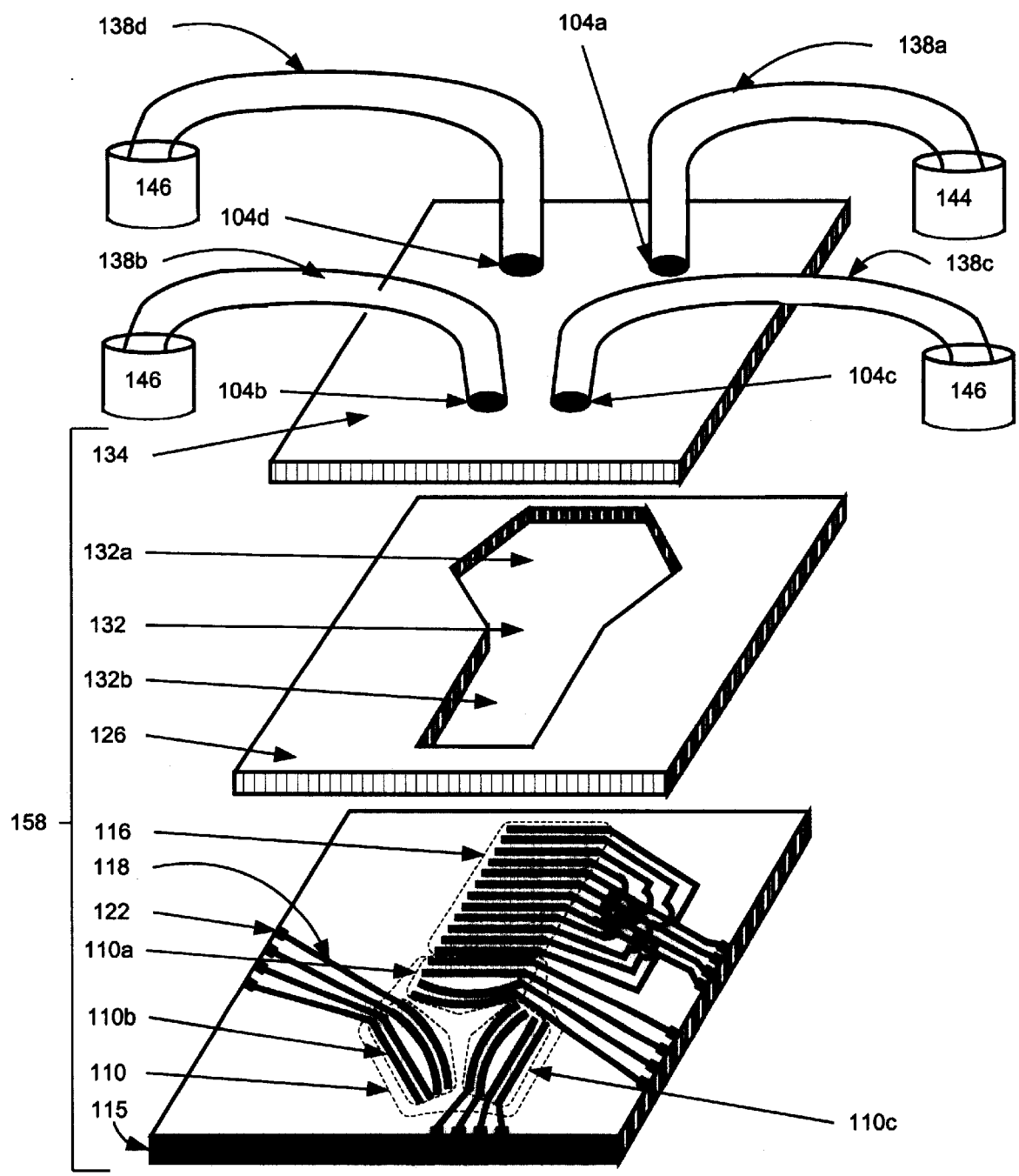
FIGS. 16A, B, C, and D illustrate yet another way that different kinds of particles may be separated from each other using electric fields generated by a particle switch.
Figure 17A:
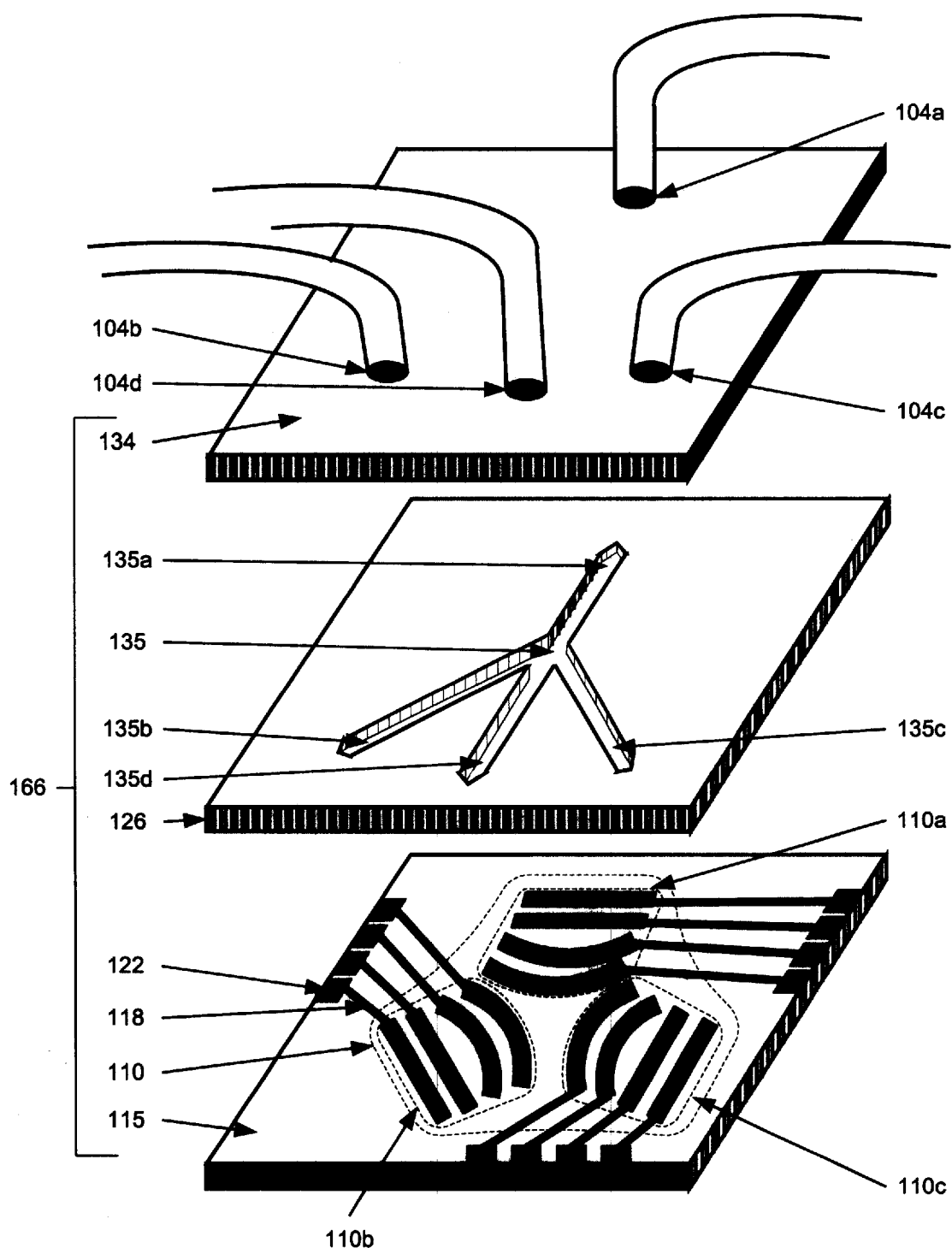
FIGS. 17A and 17B illustrate how a particle switch may be used in conjunction with particle characterization methods.
Figure 20A:
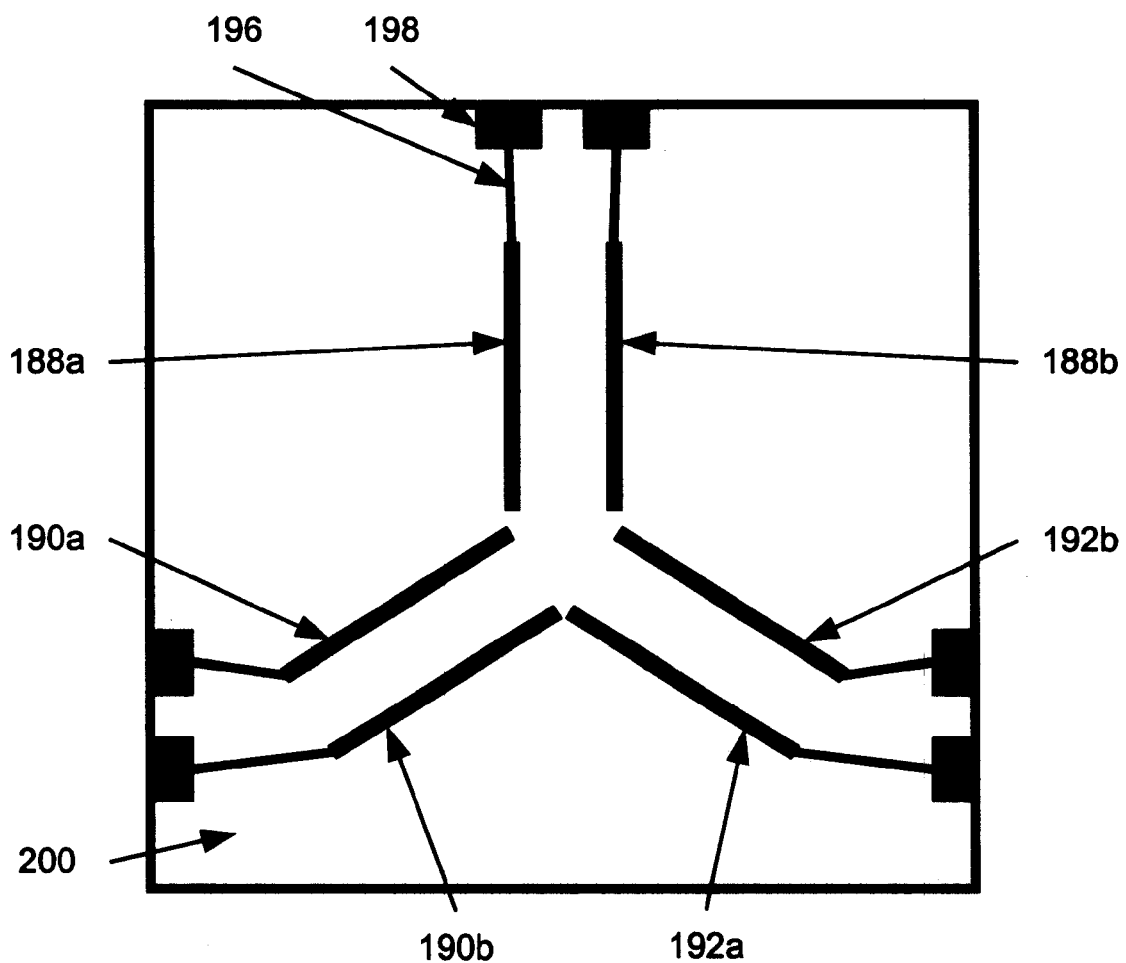
FIGS. 20A, 20B, and 20C show guide electrode structures, and how pairs of guide electrodes are used in combination with electrodes in three branches of a particle switch for manipulating particles.
Figure 20B:
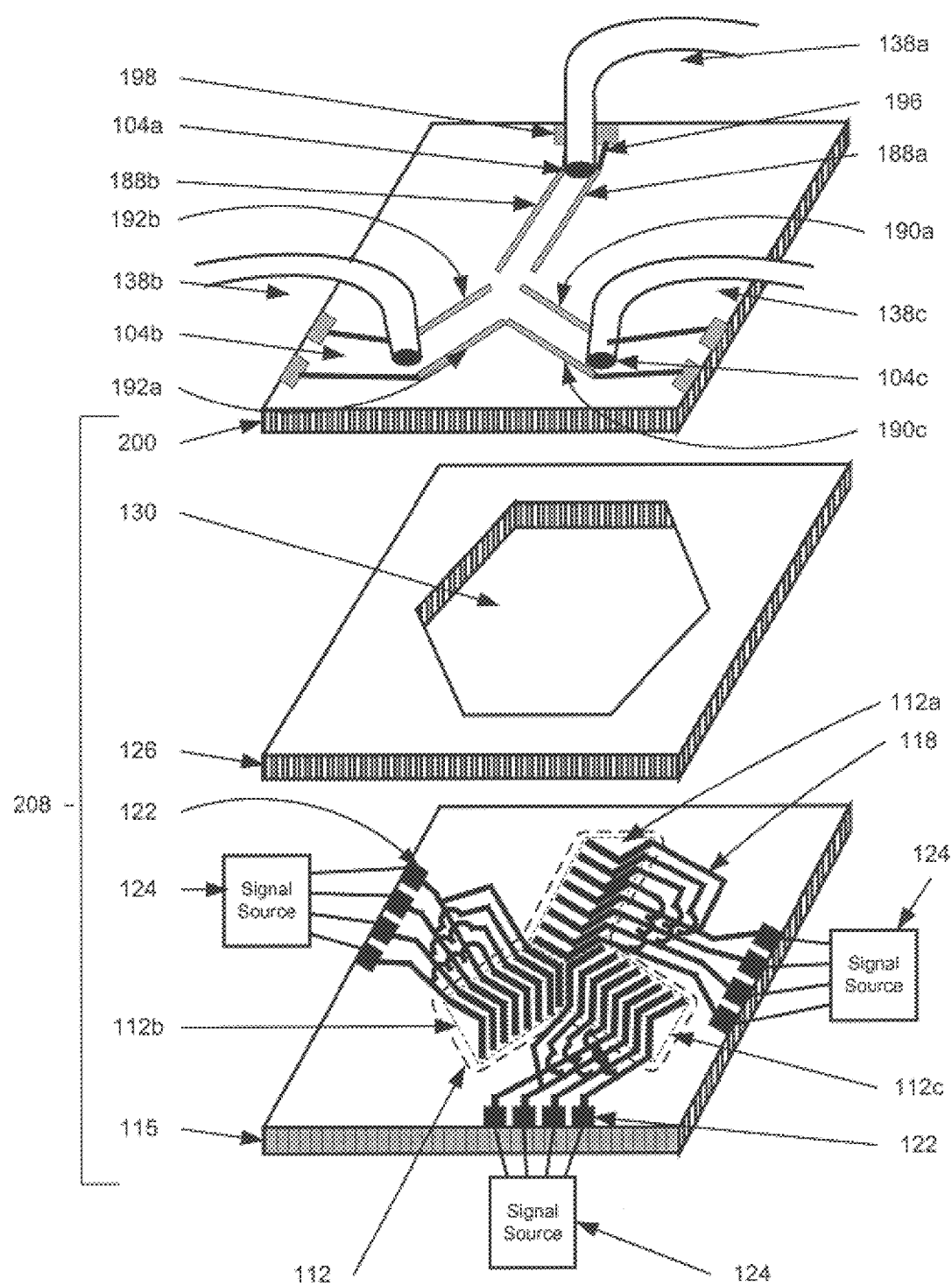

For the sake of clarity, the substrate 115, the spacer 126, and the cover 134 are shown in an assembly view in FIG. 2. In practice, these elements may be bonded together and form an apparatus 128 for manipulating particles, which is sealed except at the input port(s) and output port(s). Assembly views of similarly constructed apparatuses are illustrated in FIG. 16A, FIG. 17A and FIG. 20B.

Although the apparatus 128 in FIG. 2 is shown as comprising three separate elements (the substrate 115, the spacer 126, and the cover 134). In some embodiments, the elements of a particle-switch based apparatus may be integrally formed, e.g., the spacer and the cover may be formed as one piece. For example, the opening 130 may be formed in the cover 134 by etching or micromachining one surface of the cover 134 to the required depth (e.g., the required spacer thickness) and in the desired shape.

Although the apparatus 128 is illustrated in FIG. 2 as having three ports for inputting and outputting the particles to be manipulated, the number of input and output ports is variable, with the only requirement being that the apparatus must comprise at least three electrically independent branches to form a particle switch (i.e., three electrically independent sets 110a, 110b, 110c of electrodes 114, in which each set operates as a different branch, thereby forming the particle switch 110). For example, four electrically independent branches oriented at 90 degrees with respect to each other may be used. As used herein, the term "electrically independent sets of electrodes" refers to sets of electrodes that are electrically isolated from each other and can be independently connected to electrical signals supplied from external signal sources. Thus, the electrodes in one set of electrodes are not interwoven with electrodes from another set of electrodes. However, when "electrically independent sets of electrodes" are used for producing electric fields, the individual electrodes in these "electrically independent sets of electrodes" may be connected to the same electrical signals.

Each branch or electrode set 110a, 110b, 110c of the particle switch 110 in FIG. 2 uses twDEP forces to manipulate and move particles. To this end, the electrodes 114 of any given branch receive electrical signals which are out-of-phase with each other, so that a travelling wave electric field is induced in each branch, thereby creating a twDEP force in each branch in the space above or near the electrodes 114 which acts on and moves the particles. In other words, the three sets 110a, 110b, 110c of electrodes 114 are capable of producing respective traveling wave electric fields along respective branches, in which the three sets of electrodes are electrically independent of each other and meet a common junction 150. Forces generated by the three sets 110a, 110b, 110c of electrodes 114 may act on particles at the common junction 150 to switch particles from one branch into one of the other branches. The electrodes 114 facing the common junction 150 may be advantageously curved to reduce dead space (where electric forces are weaker and thus less effective) between the three sets 110a, 110b, 110c of electrodes 114, as illustrated in FIG. 2.

Figure 3A:
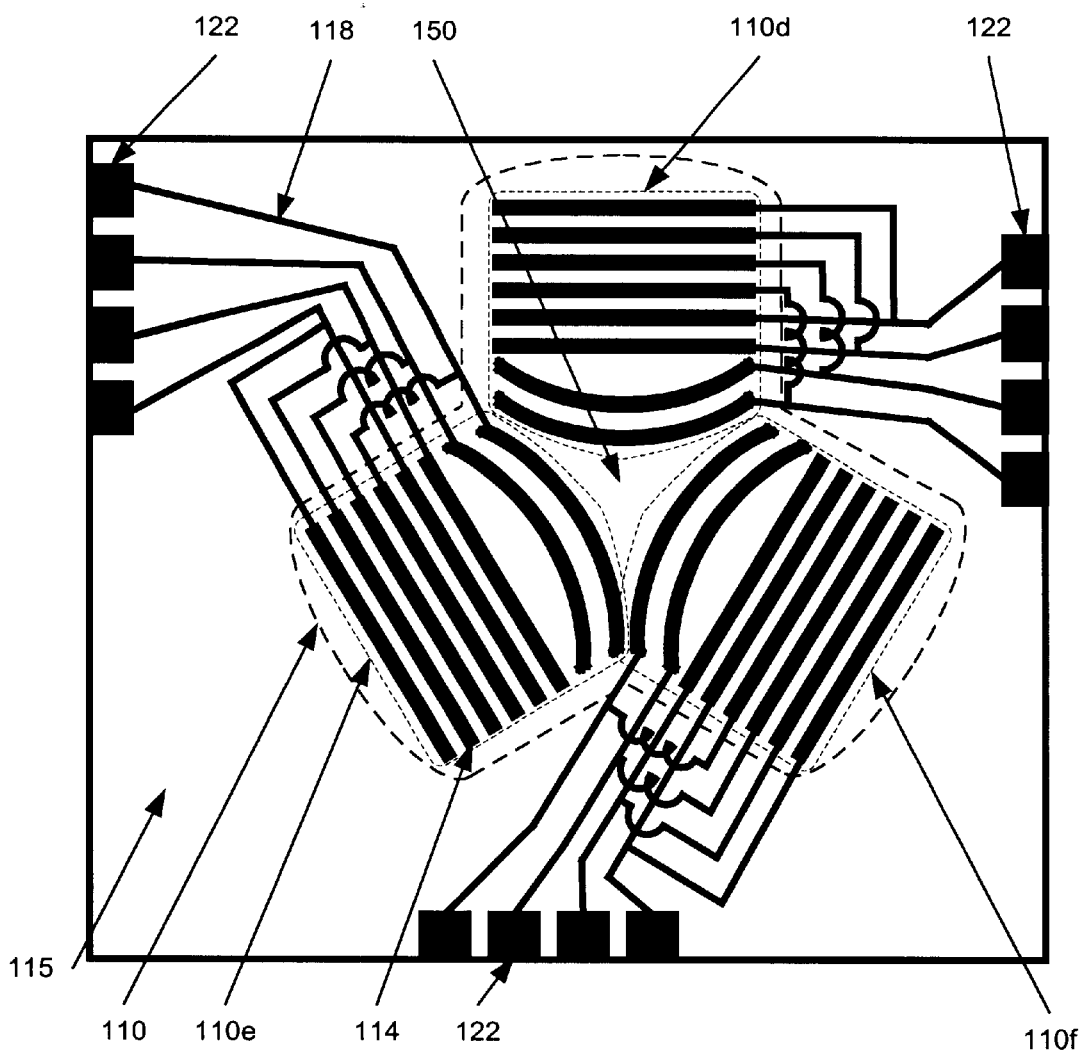
FIGS. 3A and 3B each show a configuration of electrode sets in a particle-switch embodiment.

The twDEP forces may be applied to virtually any type of particle through traveling wave electrical fields as long as the particles have dielectric properties which differ from those of the medium in which they are suspended, so that non-zero electrical polarization is induced in the particles when the particles are subject to electrical fields. Particles within the apparatus 128 are in general subjected not only to the twDEP forces described in the previous paragraph but also experience cDEP forces which pull the particles towards, or push the particles away from, the electrodes 114. How the particles move depends on the relative magnitude of these forces. Particles may be attracted onto the electrodes 114 by positive cDEP forces, or they may levitate above the electrode plane due to negative cDEP forces and move in the direction in which the traveling electric field propagates under the influence of the twDEP forces. For a number of the embodiments herein, however, the particles experience little or no cDEP forces, or experience some negative cDEP force which permits the particles to be levitated above the electrodes 114. For other embodiments, certain particles experience positive cDEP forces so that they are attracted onto and trapped on the electrodes. The kinetic response of the particles to the traveling-wave fields generated by the electrode sets 110a, 110b, 110c is similar to the response experienced by particles to electrical fields in spiral electrodes or other types of linear electrode arrays. (See "Dielectrophoretic Manipulation of Cells Using Spiral Electrodes", X-B. Wang et al., *Biophys. J.*, vol. 72, pages 1887–1899, 1997; "Dielectrophoretic manipulation of particles," X-B. Wang et al., *IEEE/IAS Trans.*, vol. 33, pages 660–669, 1997; "Positioning and manipulation of cells and microparticles using miniaturized electric field traps and travelling waves", G. Fuhr et al., *Sensors and Materials*, vol. 7, pages 131–146, 1995; "Microfluidic cell separation based on generalized dielectrophoresis field flow fractionation", De Gasperis et al., "*Biomedical Microdevices*, vol. 2(1), pages 41–49, 1999, the disclosures of which are incorporated herein by reference in their entireties.) The apparatus 128 of FIG. 2 shows each one of the electrodes 114 in each of the sets 110a, 110b, 110c of electrodes being connected to a different one of the connection pads 122. Other electrical configurations are possible, as illustrated in FIG. 3A, in which, for each electrode set 110d, 110e, 110f, more than one electrode 114 is electrically connected to at least one of the connection pads 122, with adjacent electrodes nevertheless being connected to different ones of the connection pads. FIG. 3A shows that every fourth electrode in each branch is connected to the same connection pad 122, consistent with electrical signals (voltages) at relative phases of 0, 90, 180 and 270 degrees being applied to these electrodes. In the embodiment depicted in FIG. 3A, the electrodes near the junction are curved while the electrodes further from the junction are linear. The electrical connection arrangement of FIG. 3A, in which more than one electrode 114 is connected to the same connection pad 122, is well suited for devices in which many electrodes 114 are used in each branch. In such cases, if the electrodes 114 and the electrical conductor elements 118 are fabricated on a substrate 115 using one of the various microfabrication and micromachining methods, there may exist multiple electrical conductor-layers in the substrate 115 to facilitate the required electrical connection with different conductor elements 118 being connected to the same connection pad 122. A dielectric insulation layer deposited between the electrode layers may be used for appropriate electrical insulation. If photolithography techniques are used, multiple photomasks may be used to fabricate such multiple electric conductor-layers, as is known to those skilled in the art. (See, for example, Rai-Choudhury P. (Editor), Handbook of Microlithography, Micromachining and Microfabrication, volume 2: Micromachining and microfabrication, SPIE Optical Engineering Press, Bellingham, Wash., USA (1997)). Such multiple conductor-layer arrangements are similar to other multiple conductive layer structures described in the literature. (See, for example "Positioning and manipulation of cells and microparticles using miniaturized electric field traps and travelling waves", G. Fuhr et al., *Sensors and Materials*, vol. 7, pages 131–146, 1995; "Large-area traveling-wave dielectrophoretic particle separator", Morgan et al., *J. Micromech. Microeng.* volume 7, pages 65–70, 1997, the disclosures of which are incorporated herein by reference in their entireties.).

Figure 3B:
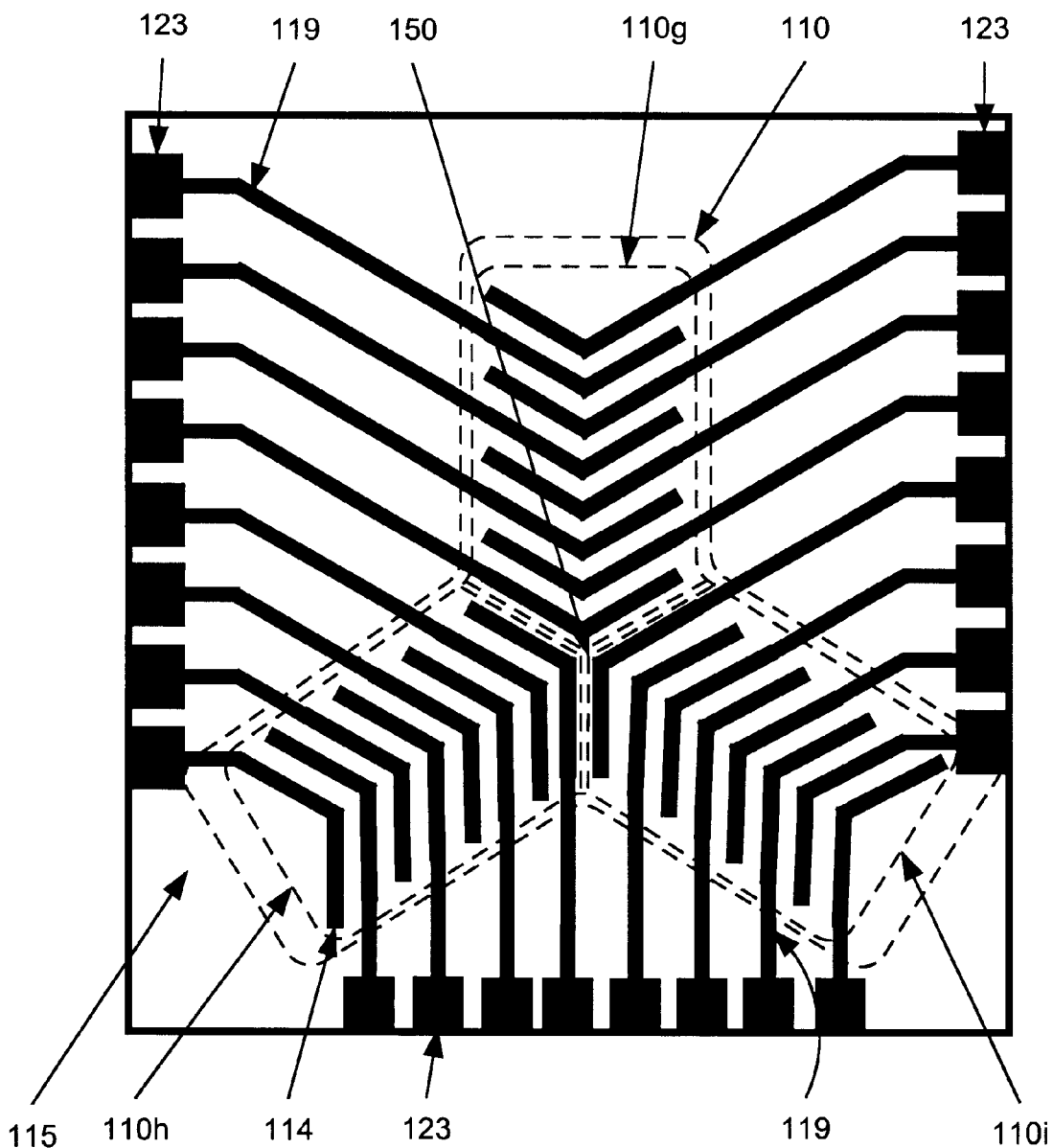

The electrical configuration of FIG. 3B is similar to that shown in FIG. 3A, but the electrodes 114 of FIG. 3B are themselves configured differently, having a generally pointed configuration, so that electrode sets 110g, 110h, 110i of FIG. 3B meet at a common junction 150 which is surrounded by less free space than the common junctions 150 shown in FIGS. 2 and 3A. This arrangement reduces the dead space between the electrodes 114, and the resulting continuity of the fields at and near the common junction 150 facilitates the switching of particles between branches. Another difference between the particle switches in FIG. 3B and FIG. 3A is that all eight electrodes 114 in each branch (110g, 110h, 110i) in FIG. 3B are individually and alternately connected to the pads 123 located along two sides of the substrate 115 through electrical conductor elements 119. As described above, the fabrication of the particle switch shown in FIG. 3A on a substrate may involve multiple layer photolithography. On the other hand, the particle switch shown in FIG. 3B may be fabricated with single-layer photolithography.

Figure 4:
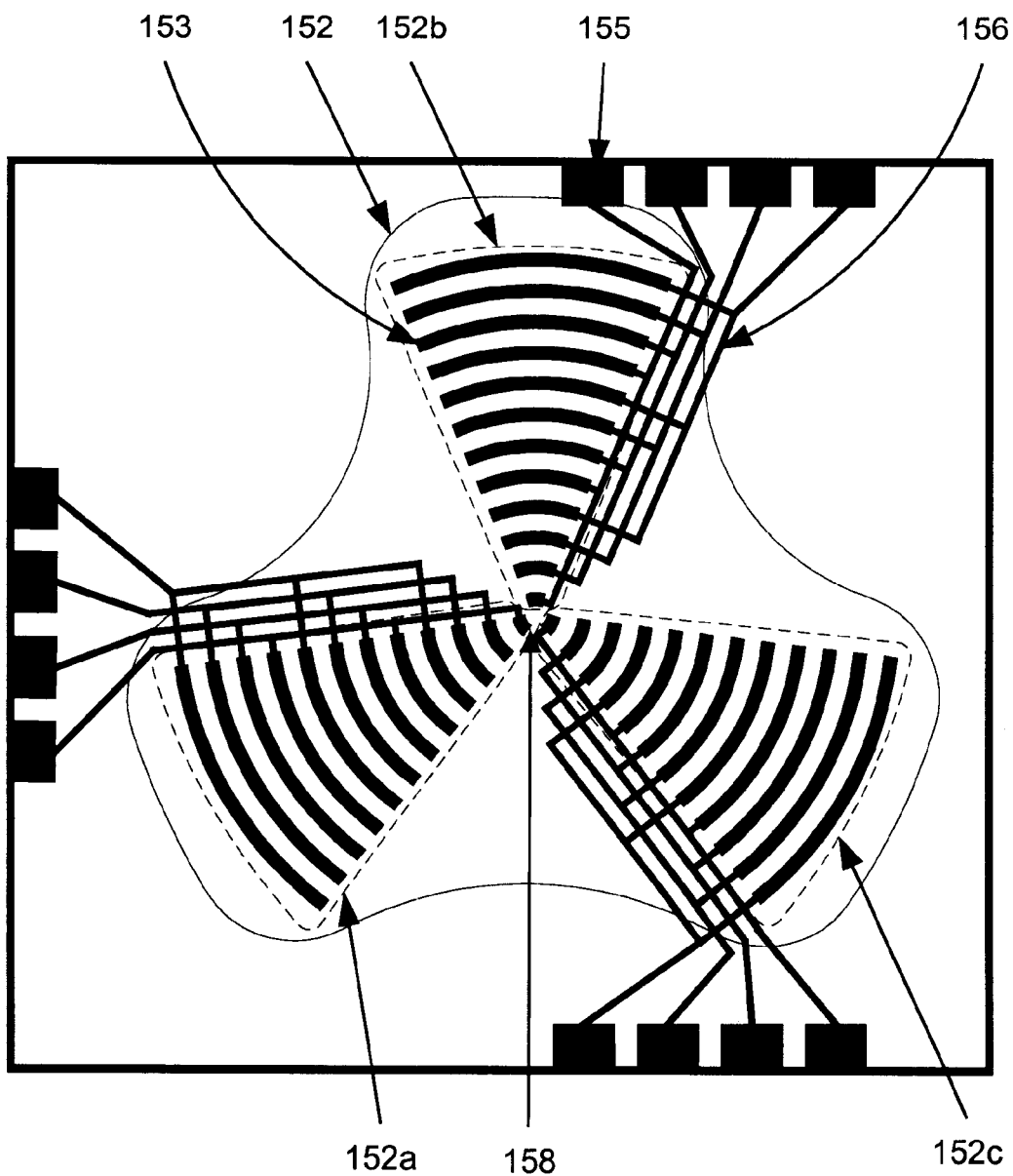
FIG. 4 shows another configuration of electrode sets in another particle switch embodiment.

FIG. 4 shows another electrode configuration in another particle switch embodiment. Here the three branches of the electrode sets 152a, 152b, and 152c are oriented at 120 degrees with respect to each other, and the electrodes 153 within a branch correspond to arc segments of concentric circles of different radii. As with the electrodes shown in FIG. 3A, every fourth electrode 153 in FIG. 4 within a branch is connected to a connection pad 155 by an electrical conductor element 156. If photolithography is used to fabricate the particle switch 152 shown in FIG. 4, the fabrication may involve a multiple layer photolithography process. Each branch (152a, 152b, or 152c) has four connection pads 155. Electrical signals having relative phase relationships at 0, 90, 180 and 270 can be applied to the connection pads 155 of each branch, generating a traveling wave electric field in the branch. Particles may be transported in the branch along the direction normal to the curvatures of the electrodes 153. For example, when electrical signals having the appropriate phase relationship are applied, particles within a branch may be transported towards the common junction 158 between the three electrode sets 152a, 152b, and 152c. Particle kinetic responses to the traveling wave electric field within each branch 152a, 152b, and 152c are similar to the particle responses to spiral electrodes (see "Dielectrophoretic manipulation of cells with spiral electrodes", X-B. Wang et al., *Biophysical J.*, vol. 72, pages 1887–1899, 1997, the disclosure of which is incorporated herein by reference in its entirety). Once they arrive at the common junction 158, the particles may be directed and switched to different branches.

FIGS. 5A, B, C; 6A, B, C; 7A, B, C; 8A, B, C; 9A, B, C; 10A, B, C; 11A, B, C; and 12A, B, C illustrate schematically how the relative phase of the applied voltages may be used to control the movement of particles in a particle switch 110. In each of these sets of figures, Figure A illustrates a particular configuration of the voltages applied to the electrodes 114, with the relative phases of the applied voltages being indicated next to each electrode. Figure B shows the directions that a given particle will move in the individual branches of the particle switch 110 in the case when $\zeta_{twDEP}<0$, and Figure C shows the directions that a given particle will move in the individual branches of the particle switch when $\zeta_{twDEP}>0$. These figures illustrate that the direction in which particles move through the particle switch 110 may be controlled by appropriate selection of the phases applied to the electrodes 114 (the "phase sequence"), and that a change in sign of $\zeta_{twDEP}$ reverses the direction in which the particles move. For example, particles may be concentrated at the common junction 150 after having entered two or three (or more) branches, or they may be dispersed away from the common junction and exit the particle switch 110 from one, two, or all three of the branches after having been initially introduced at the common junction. Furthermore, particles from any two of the three branches may be combined to the third branch, or particles from any one branch may be divided into the other two branches. An advantageous feature of the particle switch is that, during the particle manipulation process, electrical signals applied to the electrodes may be changed in terms of the voltage amplitude, phase sequences, and the frequency of the field. This greatly improves the flexibility of particle on-chip manipulation. Particles may be directed, switched or manipulated along the three branches of the particle switch chip in any desired way by simply changing the electric signals applied to the electrodes. The manipulation process is reversible in the sense that the direction in which particles are directed along a branch under one phase sequence condition may be reversed by applying a different phase sequence condition.

The flexibility of the particle switch 110 with respect to particle on-chip manipulation is a consequence of the large number of ways that signals may be applied to the electrodes in the particle switch 110. The particle switch 110 has three branches, and the direction in which the traveling field propagates within each branch can be either towards or away from the common junction, depending upon the phase sequences of the electrical signals applied to the sets of electrodes. Thus, for this particular embodiment, there are a total of eight field propagation patterns (see FIG. 5A through FIG. 12A) which may be produced in the particle switch 110. Furthermore, the frequencies of the signals applied to the branches may be different. For example, signals of two different frequencies ($f_1$ and $f_2$) may be applied to the three branches so that two branches of the particle switch are connected to signals having the same frequency (e.g., $f_1$) and the third branch is connected to signals of another frequency (e.g., $f_2$). In this case, there are four different frequency combinations that may be applied to the three branches of the particle switch 110. In the two frequency case in which one considers both phase-sequence and frequency as parameters which can be varied, there are thirty-two (=8×4) different modes of operation related to applying signals to the electrodes in the particle switch 110.

However, each branch may be connected to a signal of a different frequency. For the case of three frequencies $f_1$, $f_2$, and $f_3$ which can be applied to the branches of the switch 110, there are six different frequency combinations for these three branches. Considering all possible combinations of phase-sequences and applied frequencies in the three frequency case, there are forty-eight (=8×6) different modes of applying signals to the electrodes in the particle switch 110. The large number of frequency/phase-sequence combinations which may be applied to the branches of the particle switch 110 (and the other particle switch devices disclosed herein) allow the particle switch to be used in many different ways for manipulating either single or multiple types of particles.

Figure 13A:
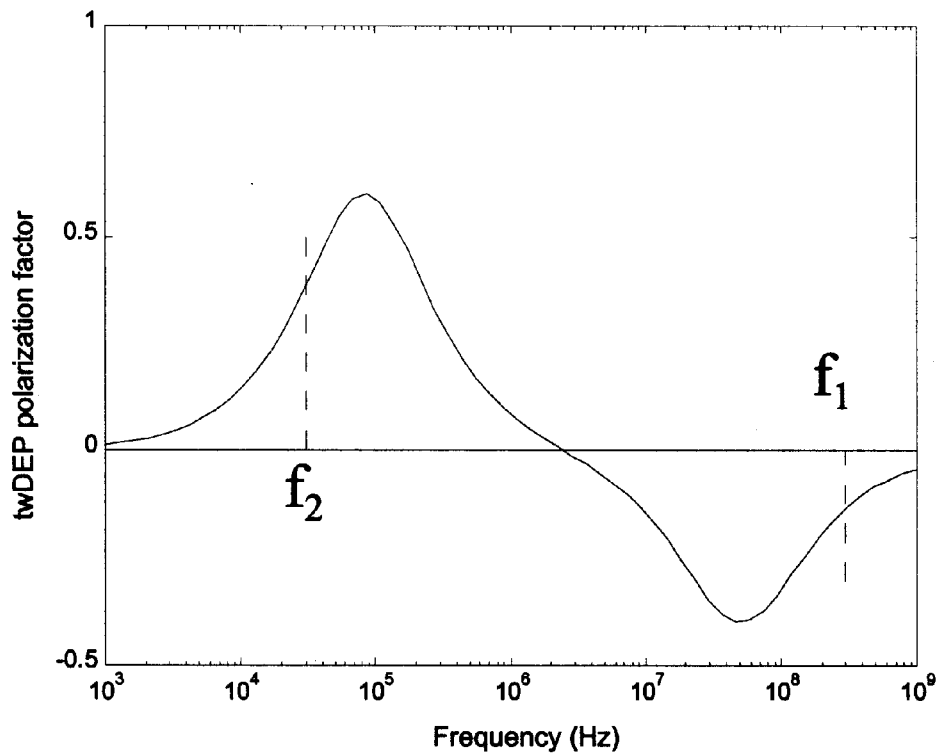
FIGS. 13A and 13B illustrate typical frequency dependencies of the cDEP polarization factor and twDEP polarization factor for a mammalian cell.
Figure 13B:
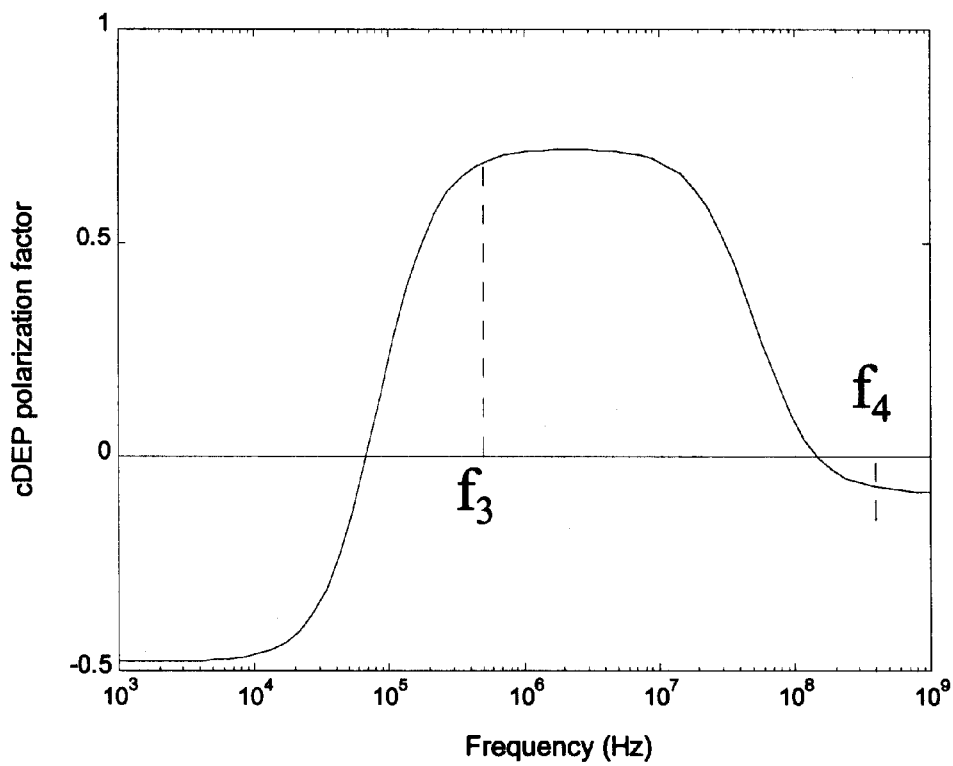

The twDEP forces generated by any one of the sets 110a, 110b, 110c (or 110d, 110e, 110f; or 110g, 110h, 110i) of electrodes 114 interact with the particles in that corresponding branch of the particle switch 110 in a manner which also depends upon the frequency of the applied AC voltage and the nature of the particles. For example, at one applied frequency $f_1$ the particles in a given branch may be moved towards the common junction 150, whereas at another applied frequency $f_2$ the particles may be moved away from the common junction 150. In this manner, the frequencies of the applied voltages in the various branches may be selected to route particles from one of the branches to another of the branches. This degree of freedom is related to the frequency dependence of the particle twDEP polarization factor ($\zeta_{twDEP}$, which in turn is a function of a particle's dielectric properties. FIGS. 13A and 13B show the frequency dependencies of the twDEP polarization factor $\zeta_{twDEP}$ and the cDEP polarization factor $\chi_{cDEP}$ for a typical mammalian cell. As illustrated in FIG. 13A, the cell exhibits a negative $\zeta_{twDEP}$ ($\zeta_{twDEP}<0$) at a field frequency $f_1$ and exhibits a positive $\zeta_{twDEP}$ ($\zeta_{twDEP}>0$) at a frequency $f_2$. The cell, when introduced into a given branch of a particle switch, would move in one direction when subjected to a traveling electric field at frequency $f_1$ but would move in the opposite direction when subjected to a traveling field at frequency $f_2$. Similarly, as illustrated in FIG. 13B, the cell exhibits a positive $\chi_{cDEP}$ ($\chi_{cDEP}>0$) at a frequency $f_3$ and a negative $\chi_{cDEP}$ ($\chi_{cDEP}<0$) at a frequency $f_4$. Thus, the cell will be pulled towards the strong field regions at the electrodes when subjected to a field of non-uniform magnitude distribution at frequency $f_3$ and will be pushed away from the electrodes when subjected to a non-uniform field at frequency $f_4$.

The frequency dependence of the cDEP polarization factor $\chi_{cDEP}$ and twDEP polarization factor $\zeta_{twDEP}$ arises from the frequency dependence of a particle's dielectric properties. The dielectric properties of a mammalian cell are influenced by cell size, membrane thickness, the dielectric properties of cell membrane, and the dielectric properties of cell interior. Typically, a viable cell has a poorly-conducting membrane (membrane conductivity is typically small, less than $10^{-4}$ S/m) which encloses a moderately-conducting cell interior (interior conductivity is typically high, larger than 0.1 S/m). Thus, at low frequencies, the applied field to the cell is dropped principally across the cell membrane, and the cell membrane dominates the dielectric properties of the whole cell. The cell may have negative values for the cDEP polarization factor $\chi_{cDEP}$ ($\chi_{cDEP}<0$) and exhibit negative cDEP. As the frequency is increased, the applied field gradually penetrates through the cell membrane into the cell interior. Thus, the cell exhibits a cDEP polarization factor $\chi_{cDEP}$ that changes from negative to positive. In such a frequency range, the interaction between the cell and the applied field tends to cause the cell to exhibit positive values for the twDEP polarization factor $\zeta_{twDEP}$ ($\zeta_{twDEP}>0$). As the frequency is increased further, the cell interior's properties (at first the effective conductivity and then the effective permittivity), determine the cell responses. The cell first exhibits positive values for the cDEP polarization factor $\chi_{cDEP}$ and then at even higher frequencies exhibits gradually-decreasing values for $\chi_{cDEP}$. In this frequency range, the cell exhibits negative values for the twDEP polarization factor ($\zeta_{twDEP}<0$). The exact frequency ranges for these different regimes of cDEP and twDEP polarization factors depend on the cell dielectric properties and the electrical conductivity of the aqueous solution in which the cells are suspended.

In recent years, there have been a number of studies on measuring and determining cell dielectric properties using the technique of electrorotation. Based on the measured frequency spectra of cell rotations, it may then be possible to analyze cell dielectric properties and to simulate/analyze the frequency dependencies of cDEP and twDEP polarization factors. Those skilled in dielectric characterization of cells by electrorotation and in dielectrophoretic manipulation of cells and particles may readily choose appropriate measurement methods and conditions for measuring the frequency spectrum of cell rotation and then choose appropriate models with which to analyze the measured spectra, derive cell dielectric properties (dielectric parameters), and derive the frequency dependence of the cDEP and twDEP polarization factors. The following references provide the theory, method, materials and conditions for analyzing cell dielectric properties, for deriving cell cDEP and twDEP polarization factors, and for determining operating conditions for manipulating cells in a non-uniform electric field: "Dielectric properties of human leukocyte subpopulation determined by electrorotation as a separation criteria", Yang, J. et al., *Biophys. J.* 76: 3307–3314, 1999; "Dielectrophoretic manipulation of cells using spiral electrodes", X-B. Wang et al., *Biophys. J.*, vol. 72, pages 1887–1899, 1997; "Changes in Friend Murine erythroleukaemia cell membranes during induced differentiation determined by electrorotation", Wang X-B., et al., *Biochim Biophys Acta*, Volume: 1193, pages: 330–344, 1994; "Separation of human breast cancer cells from blood by differential dielectric affinity", Becker F. F., et al., *Proc. Nat. Academ. Sci.* (*USA*) Volume: 29, pages 860–864, 1995; "Electrorotational studies of the cytoplasmic dielectric properties of Friend Murine erythroleukemia cells", Huang Y., et al., *Phys. Med. Biol.*, Volume 40, pages 1789–1806, 1995; "Membrane changes associated with the temperature-sensitive P85$^{gag-mos}$-dependent transformation of rat kidney cells as determined from dielectrophoresis and electrorotation", Huang Y., et al., *Biochim. Biophys. Acta* Volume 1282, 76–84 (1996); "Dielectrophoretic separation of cancer cells from blood", Gascoyne PRC, et al., *IEEE/IAS Trans.*, Volume: 33, pages 670–678, 1997, the disclosures of which are incorporated herein by reference in their entireties.

Dielectric properties of non-biological particles and biological particles other than cells may also be determined using electrorotation techniques and other dielectric spectroscopy methods (e.g., dielectric impedance on cell suspension). After obtaining particle dielectric properties, the cDEP and twDEP polarization factors may then be analyzed and simulated.

The frequency dependence of particles in a non-uniform electric field may be used to selectively manipulate particles in a particle mixture. Particles having different structures, compositions and/or sizes may have different dielectric properties and exhibit different frequency dependencies of the cDEP and twDEP polarization factor. For example, it has been shown that cells of different types (and having different biological characteristics) may have different dielectric properties, and may be separated by conventional dielectrophoresis or traveling-wave dielectrophoresis techniques (e.g., see "Changes in Friend Murine erythroleukaemia cell membranes during induced differentiation determined by electrorotation", Wang X-B., et al., *Biochim Biophys Acta*, volume: 1193, pages 330–344, 1994; "Membrane changes associated with the temperature-sensitive P85$^{gag-mos}$-dependent transformation of rat kidney cells as determined from dielectrophoresis and electrorotation", Huang Y., et al, *Biochim. Biophys. Acta*, volume 1282, pages 76–84, 1996; "Separation of human breast cancer cells from blood by differential dielectric affinity", Becker F F., et al., *Proc. Nat. Academ. Sci.* (*USA*), volume 29, pages 860–864, 1995; "Cell separation by dielectrophoretic field-flow-fractionation",. Wang X-B., et al., *Anal. Chem.* volume 72(4), pages: 832–839, 2000; "Purging breast cancer cells from hematopoitic cells by dielectrophoretic field-flow-fractionation", Huang Y. et al., *J. Hematotherapy and Stem Cell Research* volume 8, pages 481–490, 1999, the disclosures of which are incorporated herein by reference in their entireties).

Figures 14A, 14B:
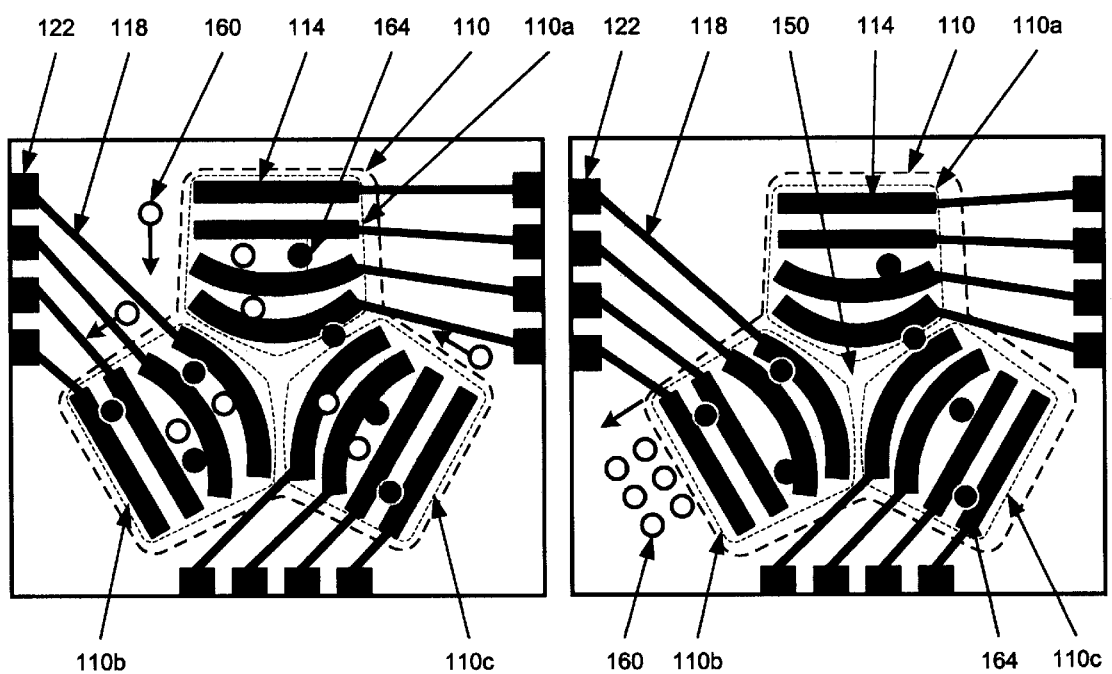
FIGS. 14A and 14B illustrate one way that different kinds of particles may be separated from each other using electric fields generated by a particle switch.

The frequency dependence of particle dielectric properties and particle behavior in traveling electric fields may be exploited in a particle switch to preferentially move one kind of particle while leaving behind another kind of particle. This is illustrated in FIGS. 14A, B. FIG. 14A shows two kinds of particles 160, 164 (indicated schematically by white and dark circles, respectively) after a solution containing both kinds of particles has been introduced into an apparatus, such as the apparatus 128 shown in FIG. 2. FIG. 14A shows that the two kinds of particles 160, 164 are distributed throughout the branches of the particle switch 110 randomly after the solution is initially loaded into the apparatus. When voltages at a selected frequency $f_1$ are applied to the electrodes 114, the particles 160 are directed by twDEP forces into one of the branches, while the particles 164 are attracted to and urged against the electrodes 114 by cDEP forces where they remain stationary and are thereby left behind in the particle switch 110. The particles 164 may also experience certain twDEP forces. However, it is the cDEP forces that act on the particles 164 to urge the particles against the electrode 114. Alternatively, at the applied frequency $f_1$, the particles 164 may experience little or no twDEP forces (in addition to any cDEP forces) and thus will remain stationary or very nearly stationary as the particles 160 are manipulated. FIG. 14B shows that the particles 160 are transported and collected at the branch-end position of the branch 110b of the particle switch 110. Altering the phase sequence of the voltages applied to the electrodes 114 may result in the particles 160 being transported and concentrated at the branch-end positions of other branches 110a and/or 110c, or concentrated at the center 150 of the particle switch 110. In this manner, the particle switch 110 acts as a particle separator, and the particles 160 are effectively concentrated or aggregated in one branch-end position of the branches or may then be collected outside of the apparatus through an output tubing segment.

The method illustrated in FIGS. 14A, 14B may be used to separate one type of particle from a mixture containing two or more types of particles. For the method to work well, it is required that the target particle type to be separated from the mixture be transported by twDEP forces at the operational frequency $f_1$. Simultaneously, other types of particles experience either strong positive cDEP forces or very weak twDEP forces so that these particles either are attracted and collected at the electrodes by the positive cDEP forces or simply remain at their initial positions during the process of manipulating the target particle types. This method may be operated in a batch mode so that the particle mixture is first loaded into the apparatus and is then manipulated by the particle switch 110. During the manipulation process, the particle suspension fluid is either stationary or essentially stationary, except for the motion of the suspension fluid caused by the particle motion. If the particle suspension fluid exhibits some movement, then such movement is preferably small enough that it does not affect the target particles 160 being collected nor cause the other particles 164 to move.

Figure 15A:
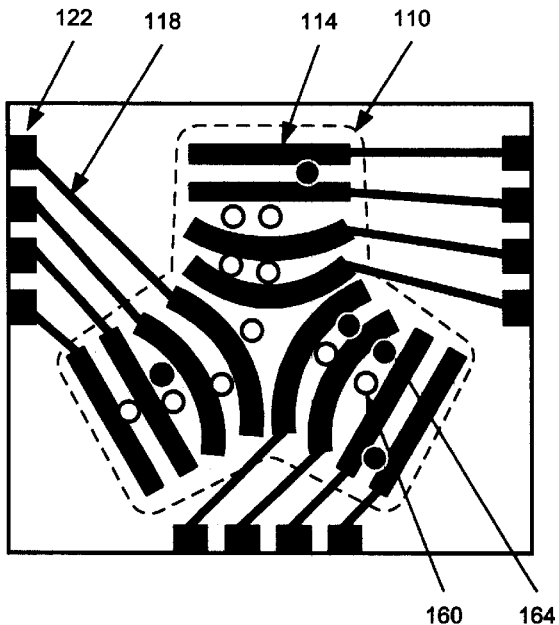
FIGS. 15A, B, and C illustrate another way that different kinds of particles may be separated from each other using electric fields generated by a particle switch.
Figure 15B:
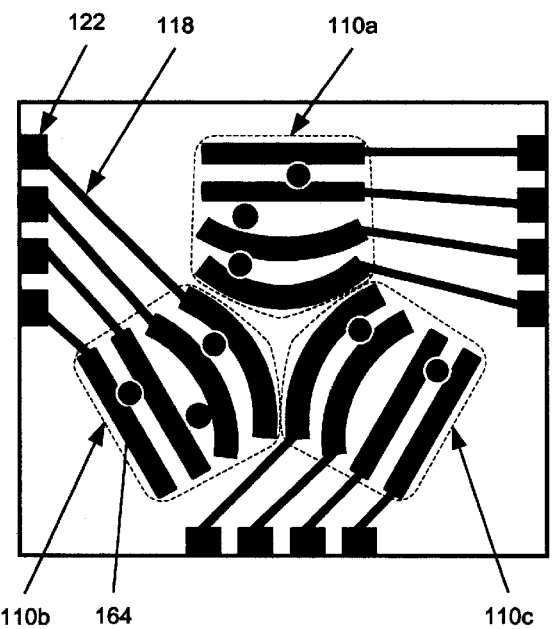
Figure 15C:
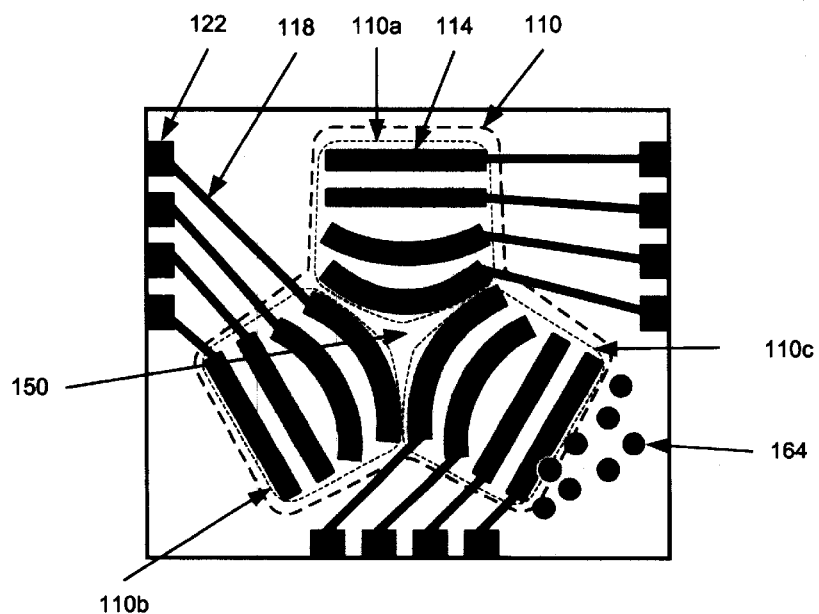

An alternative method of separating particles using a particle switch is illustrated in FIGS. 15A, B, and C. The apparatus illustrated in FIGS. 15A, B, and C is similar to the one shown in FIG. 2. However, the method may be performed with any of the embodiments described herein. In the method of FIGS. 15A, B, and C, a solution containing both kinds of particles 160, 164 is continuously fed into and flushed through the apparatus while the particle switch 110 is operated at the frequency $f_1$. FIG. 15A shows the particles at an instant during the continuous loading of the apparatus with the solution. As the solution passes through the apparatus, the particles 164 experience large positive cDEP forces and are collected on the electrodes 114, despite of the fluid flow forces acting on them by the moving solution. Simultaneously, the particles 160 experience little attraction towards the electrodes 114 and are carried with the moving solution that passes through the apparatus. With the solution being continuously loaded into and flushed through the apparatus, more and more particles 164 are collected at the electrodes 114 by the positive cDEP forces. After a specified time, the loading of the solution into the device is stopped, and there are a number of particles 164 that have been collected at the electrodes 114, as illustrated in FIG. 15B. The frequency of operation is then changed to a different frequency $f_2$ which acts to move the particles 164 into and through one of the branches of the particle switch 110 and to collect particles 164 at the branch-end position of one of the branches, as illustrated in FIG. 15C. In this step, the solution remains stationary or nearly-stationary, except for the motion of the suspension fluid caused by the particle motion. Particles 164 may be moved and concentrated together at certain locations on the particle switch 110. The particles 164 may be transported and collected at the center region 150 between the three branches of the particle switch 110, or transported and collected at any one, or any two, or at three branch-end position(s) of the three branches. To this end, not only the frequency but also the phase sequences of the voltages applied to the electrodes should be chosen appropriately. The phase sequences are determined by the collection position(s) of the particles 164 and by the twDEP polarization factor $\zeta_{tWD}$ of the particles 164 at the chosen frequency $f_2$.

The method illustrated in FIGS. 15A, B, C essentially involves two steps. In the first step, a solution containing multiple types of the particles is continuously introduced and flushed through the apparatus. During this process, the frequency $f_1$ of the voltages applied at the electrodes will cause the target particles 164 to be attracted and collected at the electrodes 114, while other particles 160 are carried with the moving solution. In the second step, the solution motion is stopped, and the target particles 164 are then transported and collected to certain locations within the particle switch by changing the frequency of the applied voltages to $f_2$. The phase sequence of the applied voltages as well as the particle dielectric properties at the frequency $f_2$ determine how and where the particles are concentrated. The method illustrated in FIGS. 15A–15C is also applicable to separating target particles from a mixture containing more than two types of particles.

Another particle separation method is illustrated with respect to the particle switch apparatus 158 of FIGS. 16A, 16B, 16C, and 16D. The apparatus 158 may be constructed as illustrated in FIG. 16A, which is similar to FIG. 2. However, there are several differences between the embodiments of FIG. 2 and FIG. 16A. First, an additional, electrically-independent, electrode set 116 having linear electrodes capable of producing traveling-wave electrical fields is located adjacent to the electrode set 110a of the particle switch 110, as illustrated in FIGS. 16A–D. The electrode set 116 is connected through electrical conductor elements 117 (FIGS. 16B–D) to the connection pads 123, which are connected to at least one signal generator (not shown), that is independent of the signal generator connected to the electrode set 110a. Thus, the electrical voltages applied to the electrode set 116 may be different from those applied to the electrode set 110a. Secondly, the spacer 126 is cut with an opening 132 that is different from the opening 130 of FIG. 2. The opening 132 in FIG. 16A comprises two parts 132a and 132b. The part 132a is positioned above the electrode set 116, and the part 132b is positioned above the particle switch 110. Thirdly, the cover 134 in FIG. 16A is different from the one shown in FIG. 2. The cover 134 of FIG. 16A has been modified to include three output ports 104b, 104c, 104d in addition to the input port 104a. The ports 104a and 104d may be located on either side of the part 132a. The ports 104b and 104c may be located at positions corresponding to the ends of the branches 110b and 110c, respectively. The input port 104a adjoins an input tubing segment 138a through which particles suspended in fluid (i.e., a particle suspension) may be injected by appropriate means. The particle suspension may be housed in a particle source 144 which is in fluid communication with the input tubing segment 138a. Particles and fluid exit the apparatus through one, two, or three of the three exit ports 104b, 104c, and 104d, which are connected to respective output tubing segments 138b, 138c, and 138d, which in turn are in fluid communication with one or more output reservoirs 146. The use of these exit ports is described below.

Figure 16B:
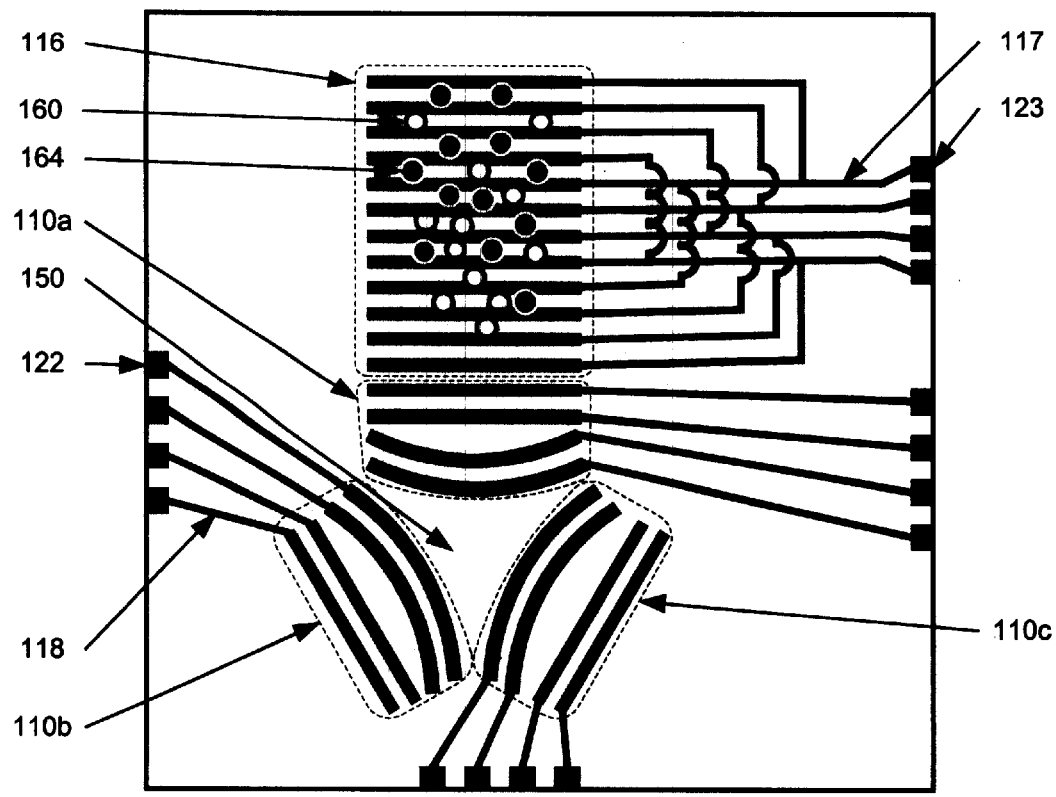

The separation of particles using the apparatus 158 of FIG. 16A involves several steps. First, a solution containing no particles is introduced into the apparatus 158. Secondly, a solution containing two kinds of particles 160 and 164 is continuously fed into and flushed through the apparatus. The particle containing solution is passed through the apparatus from the inlet port 104a to the outlet port 104d, with no or very few particles being carried to the regions of the particle switch 110. At this point, only the electrode set 116 is applied with appropriate voltages at a frequency $f_1$. Under the influence of the electric field operating at frequency $f_1$, particles 160 and 164 are attracted to and collect at the electrodes 116. Over time, more and more particles 160 and 164 are collected at the electrodes 116. After a specified time, the flow of solution is stopped, at which point a certain number of particles 160 and 164 have been collected at the electrodes 116, as illustrated in FIG. 16B. Next, voltages at an appropriately chosen frequency $f_2$ are applied to the electrode set 116 and 110a so that particles 160 and 164 are transported over the electrode set 116 and onto the first branch 110a of the particle switch 110. Simultaneously, voltages at different frequencies $f_3$ and $f_4$ having appropriate respective phase-sequences are applied to the branches 110b, 110c, respectively. The voltages, frequencies, and phase-sequences are selected so that the electric fields interact with the particles 160 and 164 in such a way that the particles 160 and 164 are directed and transported by twDEP forces (generated by the electrodes 114) into the branches 110b, 110c, respectively. In this manner, the apparatus 158 is used to separate the different kinds of particles 160, 164 from each other and concentrate the different kinds of particles 160, 164 in different regions of the particle switch 110.

Figure 16C:
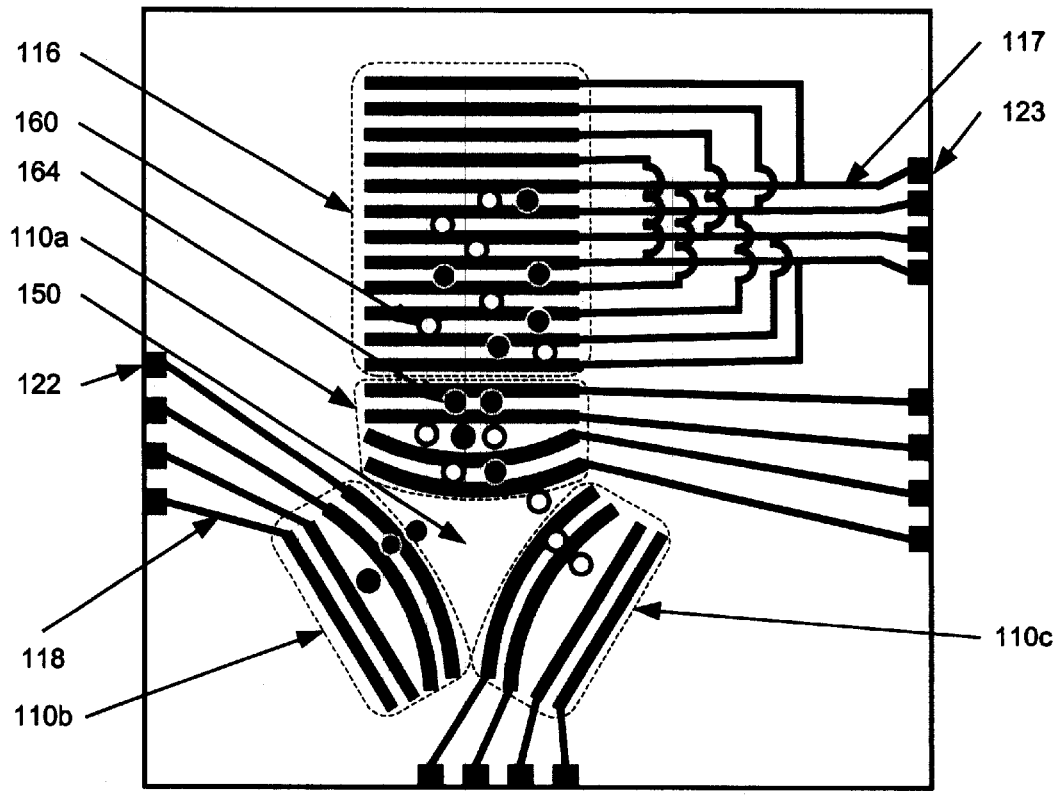
Figure 16D:
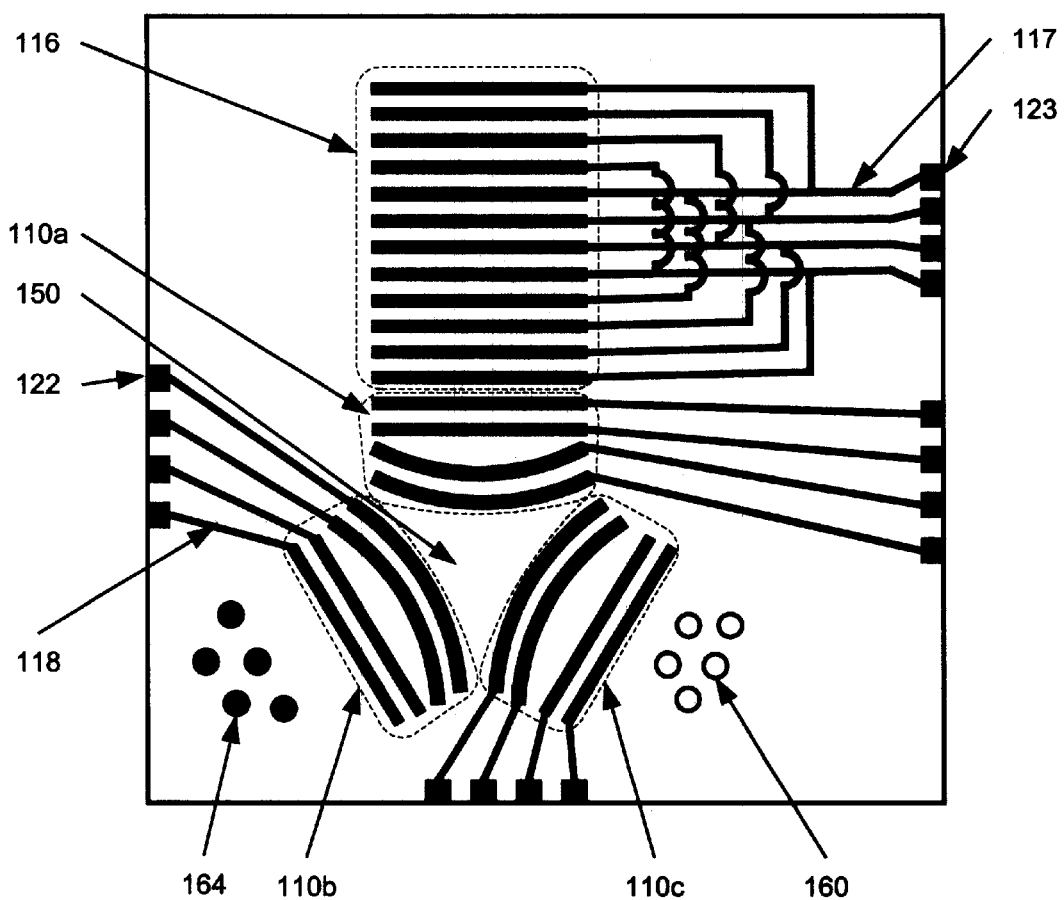

There are a number of variations of the method described above and illustrated in FIGS. 16A–16D. Methods other than the one described above may be used to load different types of particles onto the first branch 110a of the particle switch 110. For example, the particles may be simply loaded onto the electrode set 116 without being continuously loaded and flushed through the apparatus. Alternatively, the branch 110a may be connected to a different electrode set that is capable of concentrating particles towards the electrode set 110a. By loading different kinds of particles onto the end of the branch 110a, the different kinds of particles may then be separated into different branches as shown in FIGS. 16C and 16D.

The method may be extended to process more than two kinds of particles and to separate target particles from the mixture. One method for processing such a complex sample is described here. First, all the particles are loaded onto the electrode set 116 using the method described above, so that the resulting distribution of the particles after loading is like that illustrated in FIG. 16B. Secondly, voltages of appropriate frequencies and phase-sequences are applied to the electrode sets 116, 110a, 110b, and 110c to transport and direct one target particle type into one of the branches 110b, or 110c (e.g., branch 110b, may be used). After the particles of the target type are collected and concentrated at the end of the branch (110b, or 110c), the voltages applied to the electrode sets 116, 110a, 110b, and 110c are then changed to different frequencies (and different phase-sequences) so that the second type of target particles is then collected and concentrated at the end of another branch (e.g., 110c). The concentrated target particles may then be removed from the collection regions by various methods, e.g., transporting them away with another linear electrode set. Then, the voltages applied to the electrode sets 116, 110a, 110b, and 110c are changed again to different frequencies (and different phase-sequences) so that the third type of target particles is collected and concentrated at the end of one of the branches. The above steps may be repeated as needed until multiple types of target particles have been separated and concentrated. In this example, the target particle types are separated out one particle type at a time. However, it is possible to direct, separate and transport two or more types of particles simultaneously using the particle switch, as illustrated in FIGS. 16C–16D.

Another method utilizing the device illustrated in FIGS. 16A, B, C, and D is to combine different kinds of particles at the common junction 150. The different kinds of particles may first be introduced or loaded into the three branches 110a, 110b, 110c of the particle switch. Voltages of appropriate frequencies and phase sequences are then applied to the electrode sets so that all the different kinds of particles are transported and directed into the center region 150 of the particle switch 110.

The methods described above for separating different types of particles, including the methods described with respect to FIGS. 16A, B, C, and D, rely on voltages of different frequencies interacting differently with the different kinds of particles. Thus, appropriate selection of the operating frequencies provides an additional degree of freedom beyond that provided by selection of the voltage phases alone. By choosing frequencies as well as the voltage phases, the particle switches and methods herein may be used for a variety of particle manipulations. In particular, the particle switches and methods herein allow very flexible and dynamic on-chip manipulation of particles. Particles (e.g., cells) of the same type may be processed on a particle switch consisting of three-branches in the following ways. Particles may be switched from either or both of any two given branches into a third branch. Particles may be divided from any one of the branches into the other two branches. Particles may be concentrated into the central region between the three branches. Particles may be dispersed from the central region of the particle switch into the three branches. Note that particles of the same type are subjected to similar electrical fields and are manipulated in similar ways. Such processing procedures may also be applied to multiple types of particles. If multiple types of particles have similar dielectric properties, or if their twDEP polarization factors are of similar magnitude and are of the same sign at the frequencies of the applied voltages, they can also be manipulated just like a single type of particles.

For multiple types of particles having different dielectric properties, selective manipulations or separation of target particle types from the mixture of multiple types of particles may be desired. Individual particle types within the mixture may be separated or selectively transported and concentrated. The separation methods illustrated in FIGS. 14A–B, FIGS. 15A–C, and FIGS. 16A–D may be used for these purposes. A mixture of multiple types of particles may refer to any type of particle mixture requiring a separation procedure or selective manipulation. For example, the mixture may be a mixture of cells from which a target cell population is to be separated. Examples include cancer cells in blood or other bodily fluids, bacteria in blood or other bodily fluids, fetal cells within maternal blood, and target cells within an environmental sample. It is possible that these bodily fluids may have to pre-processed, for example, by being diluted in certain buffers, before being processed by one of the methods or apparatuses disclosed herein. Also, the target cells may be labeled with some labeling molecules or labeling particles, or linked with binding partners that may be molecules or particles. For example, the cell mixture may be a bone marrow sample taken from a patient, in which CD34-positive stem cells in the bone marrow are the target cells to be separated or selectively manipulated. The CD34-positive cells may first be labeled with anti-CD34 antibody-coated magnetic beads to form the cell-bead complexes. The formation of the cell-bead complexes may increase or enhance the differences in dielectric properties between the target CD34-positive cells and the other cells in the mixture, thereby facilitating selective manipulation and separation of the target CD34-positive cells. In other cell separation applications, cells other than the target cells are linked or coupled with their binding partners to form binding partner-cell complexes while the target cells are unmodified.

The methods described with respect to FIGS. 14A–B, 15A–C, and 16A–D, as well as the other methods disclosed herein, may be augmented by identifying at least one of the particle types after the particle type to be identified has traveled away from the common junction 150 or into (or out of) one of the branches, i.e., a biochemical assay may be performed on the particle type(s). For example, a fluorescence monitoring technique may be employed, in which the particles to be identified are exposed to appropriate optical radiation, and fluorescence emitted from the particles is examined in order to identify the particle type. Thus, particles that have been manipulated by a particle switch herein may be identified by fluorescence monitoring techniques. Further, particles may be sorted according to their florescence level, or according to certain properties of the particles that may be determined before the particles enter the particle switch. For example, particles may be processed using an apparatus 166, as illustrated in FIG. 17A. Although the apparatus shown in FIG. 17A is similar to those in FIG. 2, there are some differences. For example, the opening 135 in the spacer 126 has a shape different from the opening 130 of FIG. 2. The opening 135 comprises four interconnected channels 135a, 135b, 135c, and 135d. The channels 135a, 135b, 135c are positioned above the branches 110a, 110b, and 110c, respectively, of the particle switch 110 on the substrate 115. The channel 135d is a linear extension of the channel 135a, as illustrated in FIG. 17A. Another difference between the embodiments of FIG. 17A and FIG. 2 lies in the cover 134, which has been modified to include three output ports 104b, 104c, 104d in addition to the input port 104a. Preferably, the ports 104a, 104b, 104c, and 104d are located on the cover at positions corresponding to the ends of the channels 135a, 135b, 135c, and 135d on the spacer, respectively. The ports 104a, 104b, 104c, and 104d are connected to respective tubing segments (not shown), which are in turn connected to particle sources or output reservoirs (not shown).

Figure 17B:
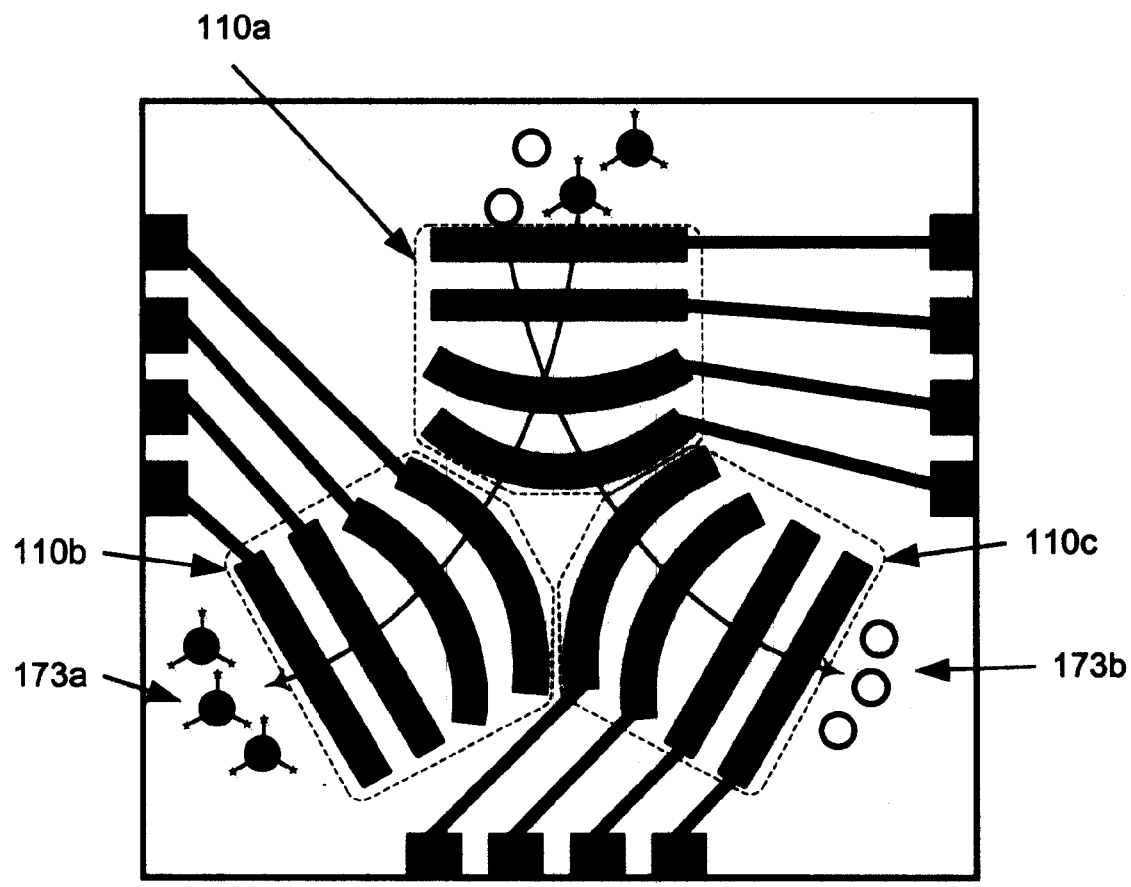

The apparatus 166 may be used to sort or separate particles according to their fluorescence levels (or other properties). In this case, the particles to be sorted may have the same or similar dielectric properties, but may still be distinguished by their fluorescence levels (or other properties). As illustrated in FIG. 17B, prior to entering a first branch 110a, individual particles could be identified by, e.g., fluorescence detection means (or other detection means) using appropriate equipment (not shown). For example, fluorescence microscopy with automatic imaging capture and imaging capabilities may be used. Depending on the result from such fluorescent measurement, appropriate electrical signals could be applied to electrodes in the first branch 110a, and in the branches 110b, and 110c, to direct the particles into either the branch 110b, or 110c, as desired. In one embodiment, particles 173a having a fluorescence level higher than a certain threshold may be transported or directed to the branch 110b, while the particles 173b having a fluorescence level equal to or below that threshold may be transported or directed to the third branch 110c. This sorting process may be continuous, i.e., the particles are continuously transported into the identification region to monitor their fluorescence levels, continuously transported into the apparatus 166, and continuously sorted according to their fluorescence levels. For example, a solution containing particles to be sorted or separated may be continuously fed into the apparatus 166 from the input port 104a and pass through the apparatus 166 to exit at the port 104d, with the port 104b and 104c closed (i.e., no solution moves in or out the apparatus 166 through the ports 104b and 104c). Note that the electrical signals applied to the electrodes in the branches 110a, 110b, and 110c for transporting and directing each individual particle are, in this example, determined by the fluorescence level of the individual particle. In one embodiment, the particles are sorted one-at-a-time. For example, it may be preferable that only after a first particle has been directed to the end of one of the branches 110b and 110c, that the next particle enters the particle switch. Thus, the particle concentration in the medium should be carefully selected and controlled. Such use of a particle switch in combination with a fluorescence monitoring technique is equivalent to flow cytometry in the sense that both rely on particle sorting based on the fluorescence levels of the particles. As discussed above, when combined with other particle detection methods for measuring/detecting other particle properties, the particle switch disclosed herein may also be used as a separator or sorter based on the properties of the particles.

Figure 18A:
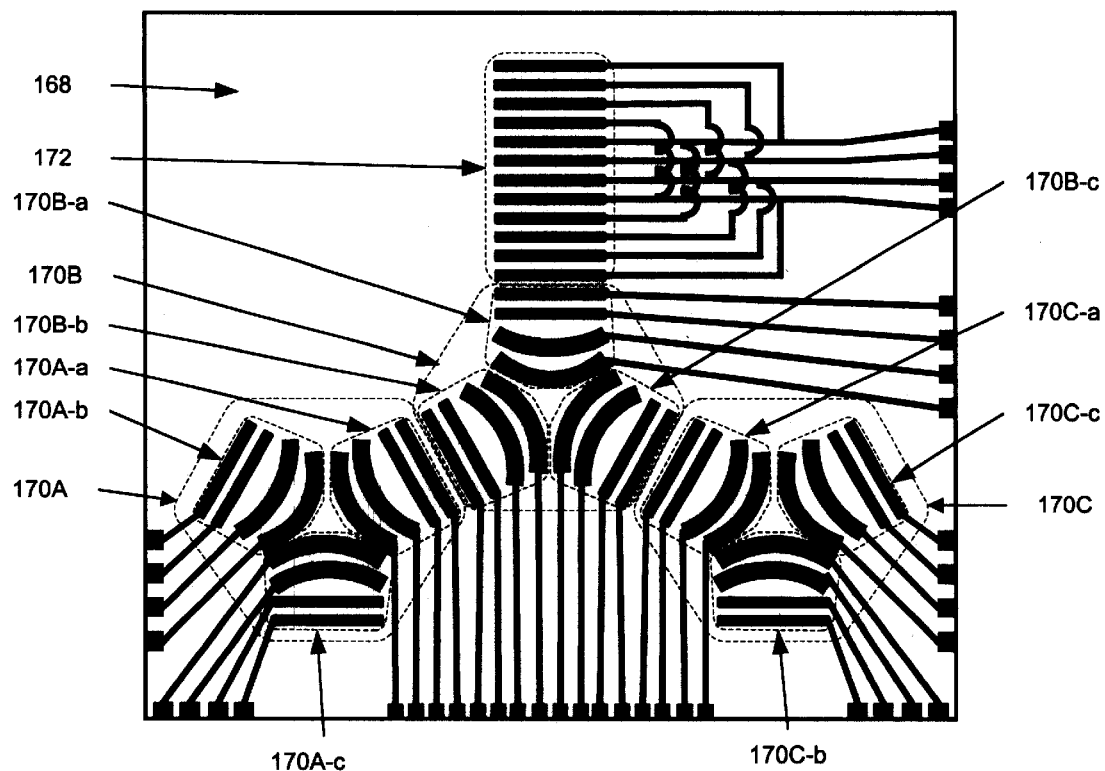
FIGS. 18A and 18B illustrate how individual particle switches may be combined to form arrays.
Figure 18B:
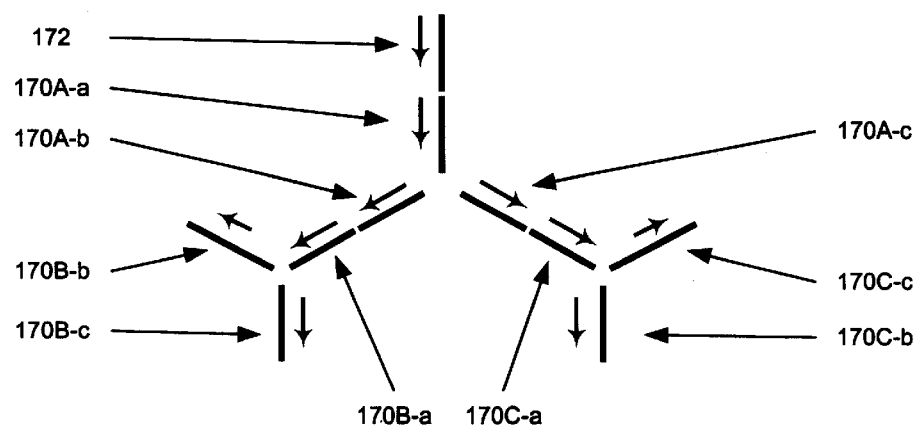

Sets 110a, 110b, 110c of electrodes 114 (or electrode sets 110d, 110e, 110f; or electrode sets 110g, 110h, 110i; or sets of other electrodes configured in alternative ways that will occur to those skilled in the art) can be combined to form larger structures, as illustrated schematically in FIGS. 18A and 18B. FIG. 18A shows a particle manipulation device 168 which comprises three particle switches 170A, 170B, 170C, each of which is analogous to the particle switch formed by the combination of the electrode sets 110a, 110b, and 110c of FIG. 2. It will be appreciated that any of the embodiments of particle switches described herein may be connected to other particle switches of the same embodiment, or of another embodiment. In addition, the number and configuration of such linked particle switches may be any number and configuration compatible with the intended use of the device. The device 168 further comprises a linear electrode set 172, which is analogous to the electrode set 116 in FIGS. 16A–16D. For the sake of clarity, FIG. 18A does not show the spacer, the cover, input or output ports, input or output tubing, or a particle source. Nevertheless, the device 168 may be integrated with some or all these components to constitute a working apparatus (in analogy with those shown in FIGS. 2 and 16). FIG. 18B shows one possible way in which particles can be routed within the particle manipulation device 168, given appropriate selection of the phases and frequencies of the voltage applied to the various electrodes 114. As discussed above, different frequencies and phases can be selected to produce a different particle routing arrangement. Thus, such a device 168 may be used to manipulate either a single type of particle or multiple particle types having similar dielectric properties. For example, the device may be used for transporting particles (e.g., biomolecule-coated microbeads) for certain biochemical assays. In such an assay, it may be desirable to transport certain types of particles to one location of the device for a specified time interval. This can be achieved by applying electrical voltages of appropriate frequencies and phase sequences to the electrodes to induce suitable twDEP forces on the particles. After this specified time interval, it may be advantageous to transport these particles to a different location. This can be achieved by applying electrical voltages of different frequencies and/or different phase sequences to the electrodes to induce the required twDEP forces on the particles, as described herein.

The methods for manipulating multiple types of particles described above and illustrated in FIGS. 14A–B, 15A–C, and 16A–D may be used to process multiple types of particles. For example, the separation method shown in FIGS. 16A–D may be used to sort particles having different properties. The device in FIGS. 18A–B may provide additional particle separation capabilities. For example, referring to FIG. 18A, particles being transported along the electrode set 172 to a first branch 170B-a of the particle switch 170B may first be separated by the particle switch 170B when appropriately chosen electrical signals are applied to it. The two separated populations from the second (170B-b) and the third branch (170B-c) of the particle switch 170B are then directed to the particle switches 170A and 170C, respectively. The electrical signals applied to the particle switches 170A and 170C are carefully chosen in terms of their frequencies and phase sequences so that the particle population that is transported into the nearest branches (170A-a and 170C-a) of the particles switches 170A and 170C are separated further into sub-populations at the second (170A-b and 170C-b) and third (170A-c and 170C-c) branches of the particle switches 170A and 170C.

One important feature of the device shown in FIGS. 18A–B is that the electrical signals applied to the particle switches 170A, 170B, 170C, and 172 are independent of each other. Thus, the device 168 can be operated in many different ways to manipulate and process particles, simply by changing the signals applied to the particle switches. Thus, the manipulation of particles on the device is programmable and is accomplished by changing the electrical signals applied to the particle switches. For example, separation of multiple types of particles is described in the previous paragraph, in which particles are transported and sorted in the device 168 by passing them from the first branch 170B-*a* of the particle switch 170B to second (170A-*b*, 170C-*b*) and third (170A-*c*, 170C-*c*) branches of the particle switches 170A and 170C. By simply changing the phase sequences of the signals applied to the electrodes, particles may be transported from the second branch (170C-*b*) of the particle switch 170C and then separated into the first (170C-*a*) and the third (170C-*c*) branches of the particle switch 170C. The particles being separated into the first branch (170C-*a*) of the particle switch 170C may experience further manipulation (e.g., further sorting) on the particle switch 170B, and then on the particle switch 170A.

Figure 19A:
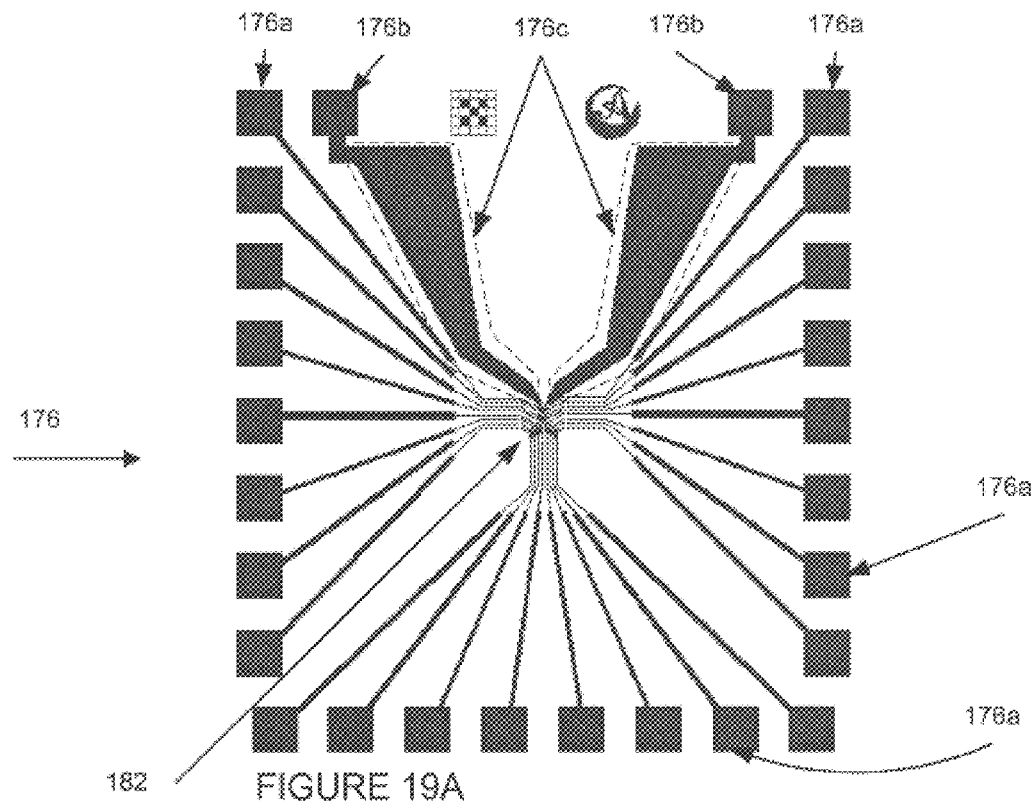
FIGS. 19A and 19B show photomask images of two fabricated particle manipulation chips.
Figure 19B:
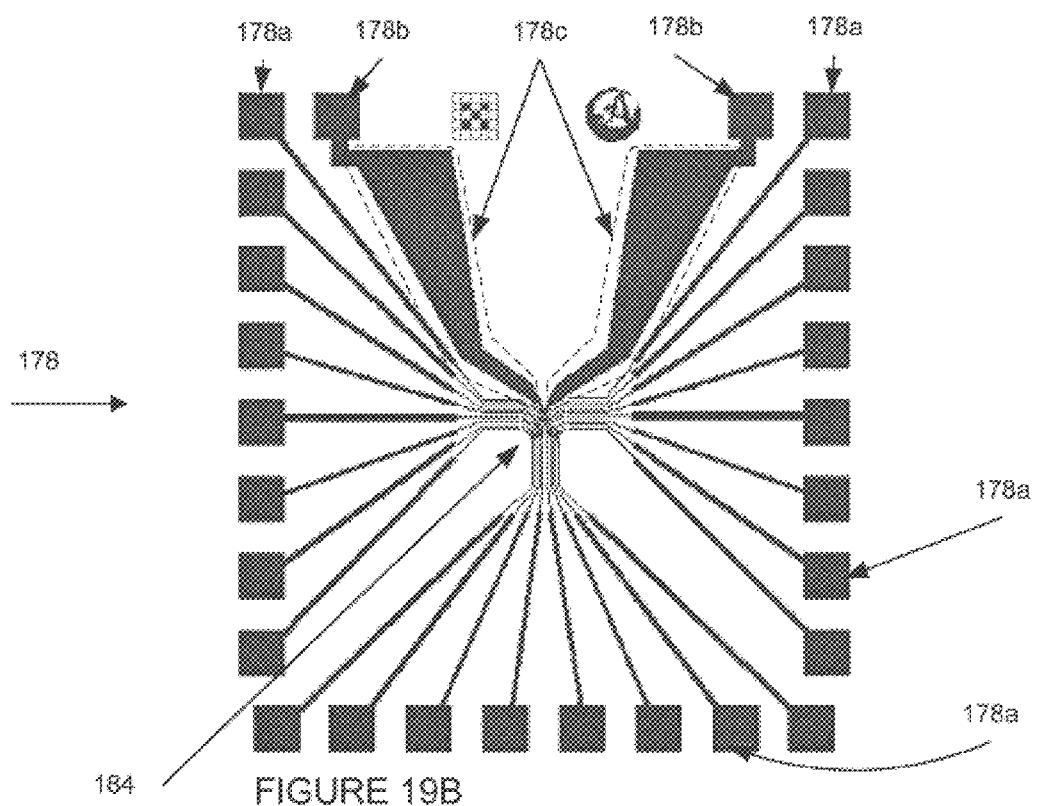
Figure 19C:
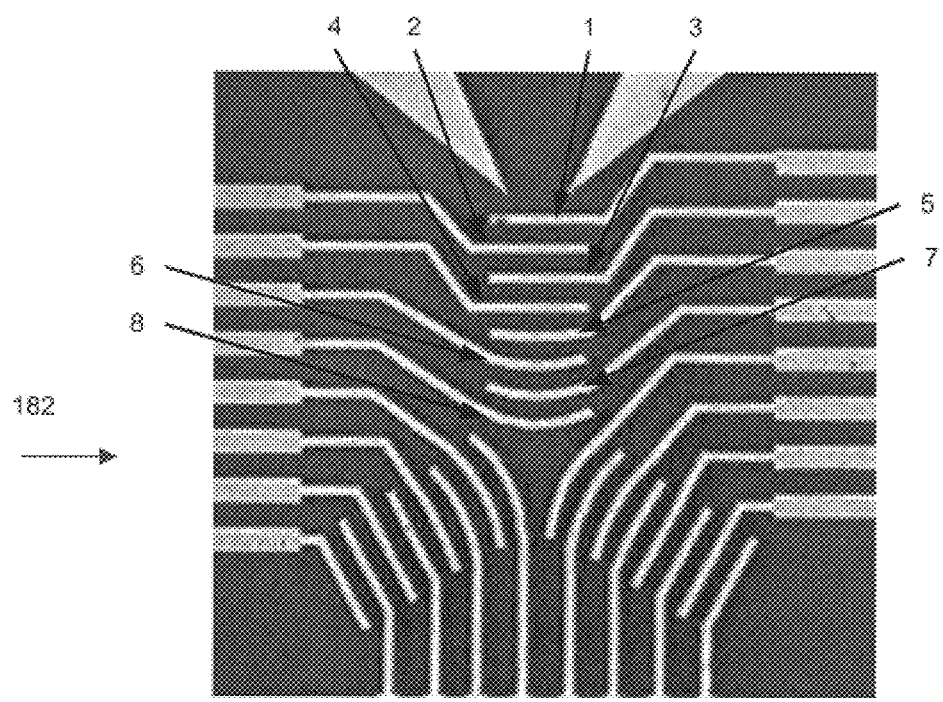
FIGS. 19C and 19D show detailed photo images of the particle switches in the particle manipulation chips of FIGS. 19A and 19B, respectively.
Figure 19D:
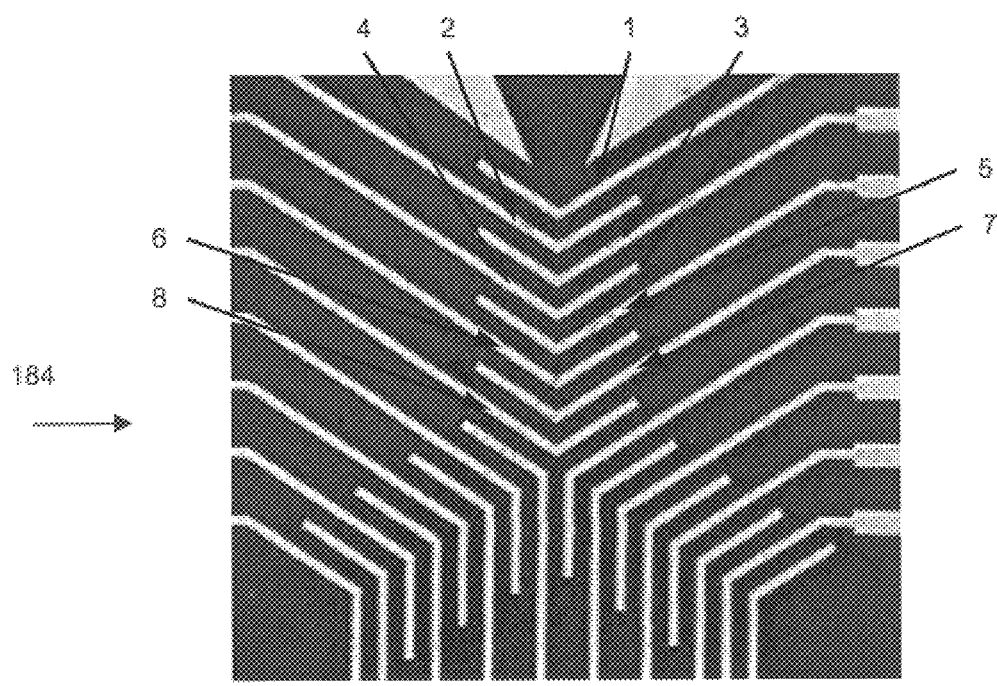

The electrodes on the devices disclosed herein may be formed using microfabrication techniques such as photolithography. FIGS. 19A and 19B show photomask images 176 and 178 of two fabricated particle manipulation chips which include particle switches 182 and 184 (FIGS. 19C and 19D), respectively. The detailed photo images of the particle switches 182 and 184 in these particle manipulation chips are shown in FIGS. 19C and 19D, respectively. Further details of these chips are described below. The photo masks 176 and 178 can be used to fabricate certain embodiments of the present invention. The electrodes 114 in FIG. 2 may be fabricated using photolithography with a single photomask since there is only one electrode layer on this device. The electrodes in FIGS. 3A, 3B, 4, 16A–D, and 18A–B can be fabricated using photolithography using multiple photomasks, since these devices may include two or more electrodes. A dielectric insulation layer deposited between electrode layers can be used to achieve appropriate electrical insulation, as described in, for example, "Positioning and manipulation of cells and microparticles using miniaturized electric field traps and travelling waves", G. Fuhr et al., *Sensors and Materials*, vol. 7, pages 131–146, 1995; and in "Large-area traveling-wave dielectrophoretic particle separator", Morgan et al., *J. Micromech. Microeng.* Volume 7, pages 65–70, 1997, the disclosures of which are incorporated herein by reference in their entireties. Thus, the electrodes may be made on a substrate using photolithography with either single or multiple photomasks, or may be fabricated on a substrate using different fabrication protocols, as known to those skilled in the art of microlithography and microfrabrication and discussed herein.

In order for the particle switching devices herein to operate efficiently, the particles to be manipulated are preferably distributed toward regions over the electrode set so they can be moved along the electrode sets (e.g., the particles are transported over and along the branch 110*a* of FIG. 2). To achieve this, additional electrodes like those shown in FIGS. 20A–C, which illustrate three pairs of guide electrodes, 188*a* and 188*b*; 190*a* and 190*b*; 192*a* and 192*b* may be used to urge the particles away from the guide electrodes. It will be appreciated that guide electrodes may be included in any of the embodiments described herein. Preferably, the electrodes in any given set of electrodes are electrically independent from the electrodes in the other sets of electrodes. However, guide electrodes may also be used in embodiments in which the electrodes in the sets of electrodes are not electrically independent from the electrodes in the other sets of electrodes. The guide electrode pairs 188*a*, 188*b*; 190*a*, 190*b*, 192*a*, 192*b* are oriented substantially perpendicular to the electrodes 114 of the electrode sets 112*a*, 112*b*, 112*c*. Although guide electrode pairs 188*a*, 188*b*, 190*a*, 190*b*, 192*a*, 192*b* are illustrated as being formed in a different substrate than electrode sets 112*a*, 112*b*, and 112*c*, it will be appreciated that they may also be formed in the same substrate, provided the electrode pairs and electrode sets are isolated not electrically connected to one another. The guide electrode pairs, 188*a* and 188*b*; 190*a* and 190*b*; 192*a* and 192*b*, may be fabricated on a substrate 200 using methods and materials like those used for fabricating the electrodes structures shown in FIGS. 2, 14A–B, 15A–C, 16A–D, 17A–B, and 18A–B. Thus, the substrate 200, like its counterpart substrate 115 of FIG. 2, may be silicon, glass, ceramics, plastics, or another solid material. The substrate material may be porous or non-porous. Like the electrodes 114 in FIG. 2, the guide electrodes 188*a* and 188*b*; 190*a* and 190*b*; 192*a* and 192*b* may have any thickness, provided that the resistance of the guide electrodes is sufficiently small that the voltage applied to the guide electrodes is nearly constant on the guide electrode surfaces. The guide electrodes 188*a* and 188*b*; 190*a* and 190*b*; 192*a* and 192*b* advantageously have a thickness of about 0.001 to about 10 microns, and more preferably have a thickness between about 0.1 to about 1.0 microns. These guide electrodes may be any width between about 5 and about 10000 microns. Preferably, however, each guide electrode is about 10 to about 200 microns wide. Each of these guide electrode pairs 188*a,b*; 190*a,b*; 192*a,b* is preferably long enough to cover the length of that branch on the particle switch for which that guide electrode pair is used (e.g., branch 110*a* in FIG. 2, or branch 112*a*, 112*b*, 112*c* in FIG. 20B). The gap between the two guide electrodes in a guide electrode pair (e.g., between 188*a* and 188*b*) are preferably large enough to span electrode sets (e.g., 112*a*), such that, for example, guide electrode pairs 188*a* and 188*b* are substantially perpendicular to the ends of the electrodes in electrode set 112*a*. However, the distance between guide electrodes 188*a* and 188*b* may be any distance compatible with their intended use.

Figure 20C:
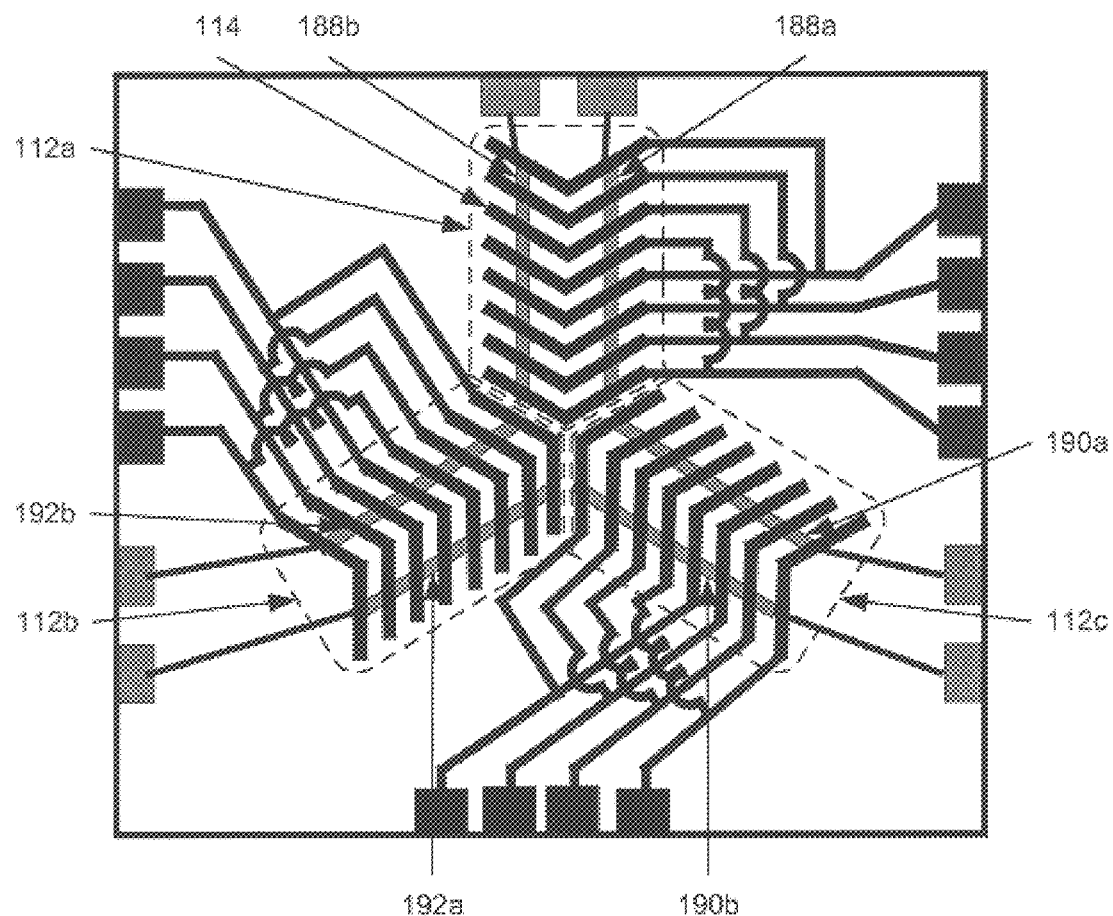

Various techniques such as photolithography may be employed to fabricate the pairs of guide electrodes 188*a*, 188*b*; 190*a*, 190*b*; 192*a*, 192*b*. These electrodes are called "guide electrodes" since they are used to guide or confine the particles in the channel regions defined by these electrode pairs. In particular, the guide electrodes generate cDEP forces which urge the particles away from the guide electrodes. As illustrated in FIG. 20B, the guide electrode substrate 200, the particle switch substrate 115, and a spacer 126 between them form an apparatus 208. The guide electrode substrate 200 forms the cover of the apparatus 208 with the guide electrodes facing the spacer 126 (the guide electrodes are disposed on the surface of the substrate 200 opposite the surface to which the tubing segments are connected), and the particle switch substrate 115 forms the bottom plate of the apparatus 208. The input and output ports (104*a*, 104*b*, 104*c*) are formed on the cover (i.e., the guide electrode substrate 200) and these ports are connected through tubing segments 138*a*, 138*b*, and 138*c*, respectively, to one or more external particle sources or reservoirs (not shown). The guide electrodes (e.g., 188*a* and 188*b*; 192*a* and 192*b*; and 190*a* and 190*b*) and their respective electrode branches (e.g., 112*a*, 112*b*, and 112*c*) of the particle switch 112 are preferably aligned, as illustrated in FIG. 20C. The electrodes 114 of the electrode sets 112*a*, 112*b*, 112*c* may be individually connected by electrical conductor elements 118 to respective connection pads 122 which are in turn connected to a signal generator for supplying voltage signals to the electrodes, as illustrated in FIG. 20B. Similarly, each of the guide electrode pairs 188a and 188b; 190a and 190b; 192a and 192b are connected via electrical conductors 196 and connection pads 198 (as illustrated in FIG. 20A) to a respective signal generator (not shown) that supplies voltage signals to the electrodes of the guide electrode pairs.

The distance between the guide-electrode substrate and the particle manipulation substrate (e.g., particle switch substrate 115 in FIG. 20B) is defined by the thickness of the spacer 126 in FIG. 20B, and should be carefully chosen so that the cDEP forces generated by the guide-electrode pairs are strong enough to manipulate the particles on the particle manipulation substrate (e.g., the substrate 115 in FIG. 20B). If the spacer thickness is too large, then the cDEP forces generated by the guide electrode pairs may be too weak to affect the particles. On the other hand, the spacer thickness should not be too small and is preferably greater than the largest dimension of the particles. The signals applied to the guide electrode pairs 118a and 188b; 190a and 190b; 192a and 192b should be appropriately chosen so that the particles experience negative cDEP forces from these guide electrode pairs and are pushed towards the centers of the channels formed by these guide electrode pairs.

Figure 21:
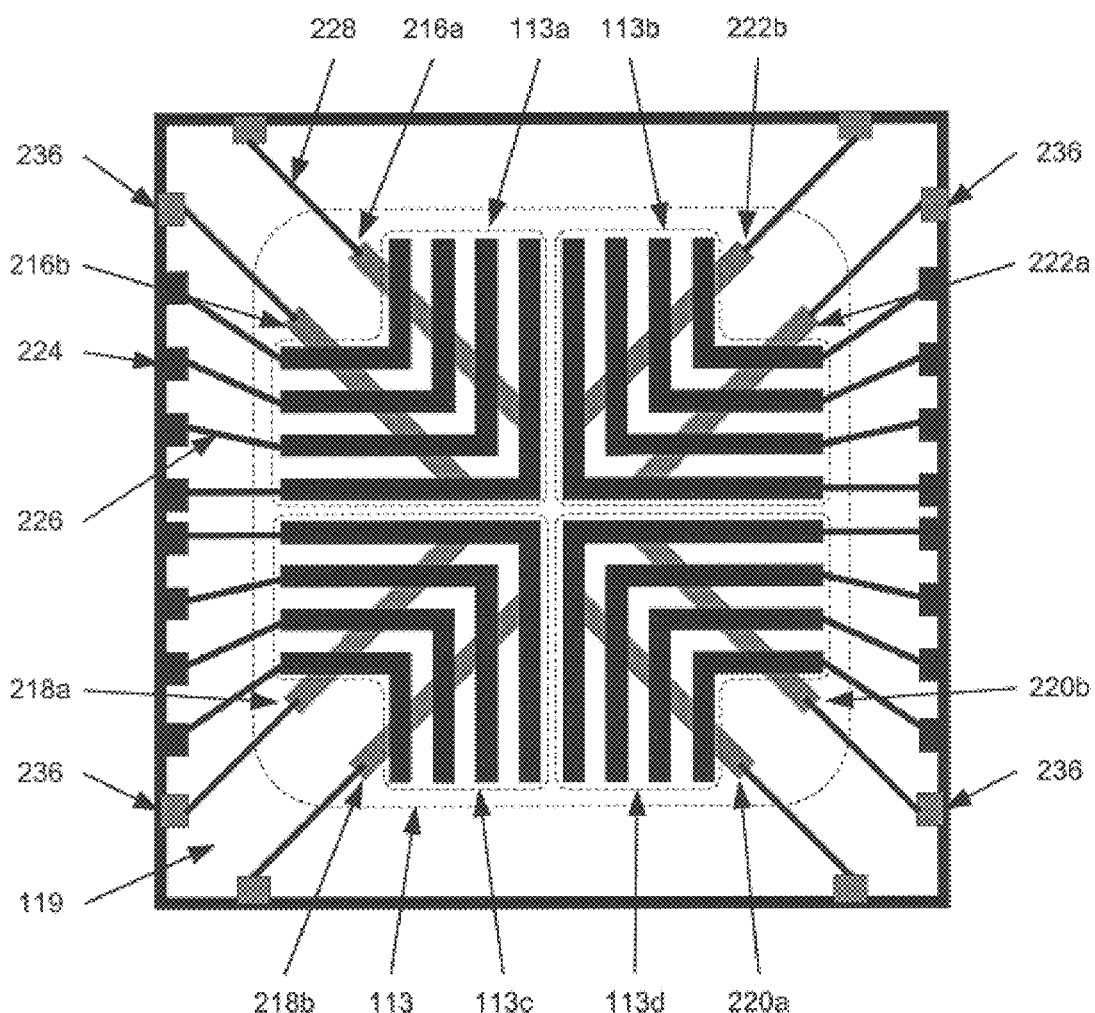
FIG. 21 shows a four-branch particle switch combined with and used together with guide electrodes.

FIG. 21 shows a top view of a particle manipulation apparatus, which comprises a particle switch 113 having four branches. The apparatus is similar to the embodiment of FIGS. 20A, 20B, and 20C, which includes three branches. The branches of FIG. 21 have respective electrode sets 113a, 113b, 113c, 113d and corresponding pairs of guide electrodes 216a, 216b; 218a, 218b; 220a, 220b; and 222a, 222b. The guide electrodes are fabricated on one substrate (not shown) while the electrode sets on the particle switch 113 are fabricated on another substrate 119.

FIG. 21 explicitly shows the electrodes of electrode sets 113a, 113b, 113c, 113d individually connected by electrical conductor element 226 to connection pads 224 which are in turn connected to one or more signal generators (not shown) for supplying voltage signals to the electrodes of the electrode sets 113a, 113b, 113c, 113d. The electrodes of the guide-electrode pairs 216a, 216b; 218a, 218b; 220a, 220b; and 222a, 222b are individually connected via respective elements 228 to respective connection pads 236, which in turn are connected to respective signal generators (not shown) for providing voltages to the corresponding guide electrode pair.

The embodiment of FIGS. 20A, 20B, and 20C (and FIG. 21) includes electrode sets 112a, 112b, 112c (113a, 113b, 113c, 113d in FIG. 21) which generate twDEP forces for directing and transporting particles (e.g., in a particle suspension) through the branches, as discussed previously in connection with FIG. 2, for example. The guide electrode pairs 188a and 188b; 190a and 190b; 192a and 192b (216a and 216b; 218a and 218b; 220a and 220b; and 222a and 222b in FIG. 21) are used for a different purpose, namely, to urge particles towards the center of the branch and away from the guide electrodes of the electrode pairs using cDEP forces. In this manner, particles from a particle source (not shown in FIGS. 20A, 20B, and 21) may be more efficiently guided or channeled through the device by avoiding migration losses which might otherwise arise as particles moved towards the outer edges of the electrodes of the electrode sets used for generating the twDEP forces. The embodiment of FIGS. 20A, 20B, and 20C (and FIG. 21) can be expanded arbitrarily to form arrays in which multiple particle switches are connected together, by analogy with the device shown in FIGS. 18A and 18B. Guide electrodes can be used with particle switches of any electrode configuration described herein.

Figure 22A:
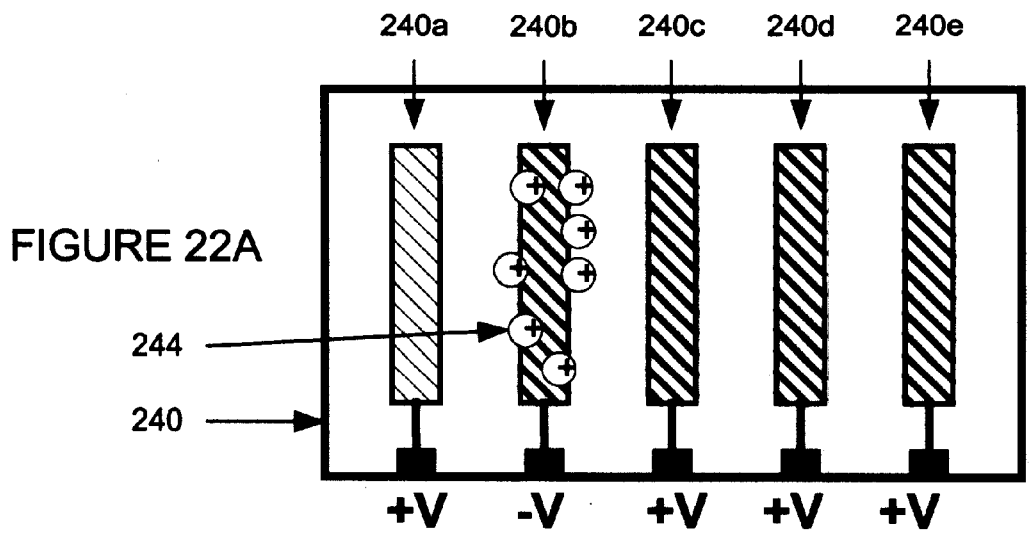
FIGS. 22A, B, and C illustrate how charged particles may be transported from one electrode to the next using DC voltages.
Figure 22B:
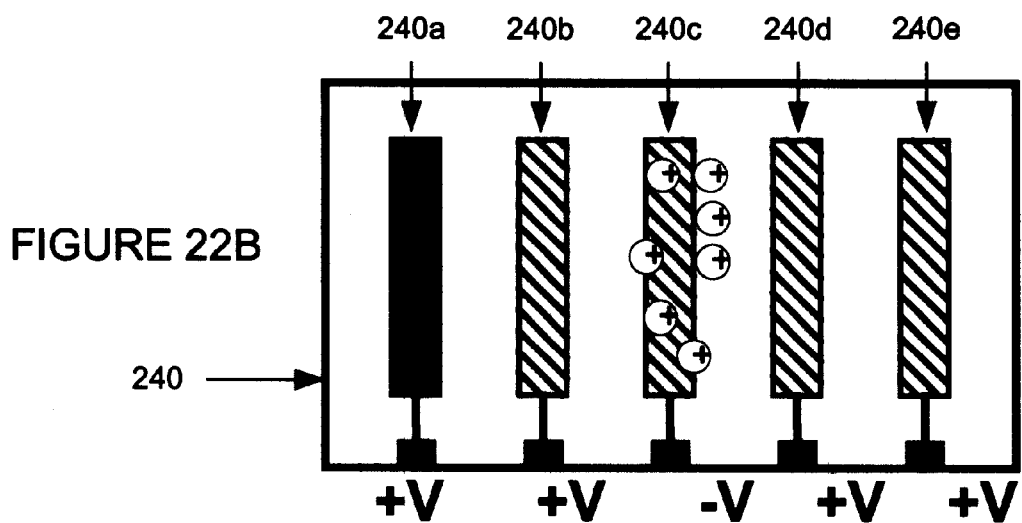
Figure 22C:
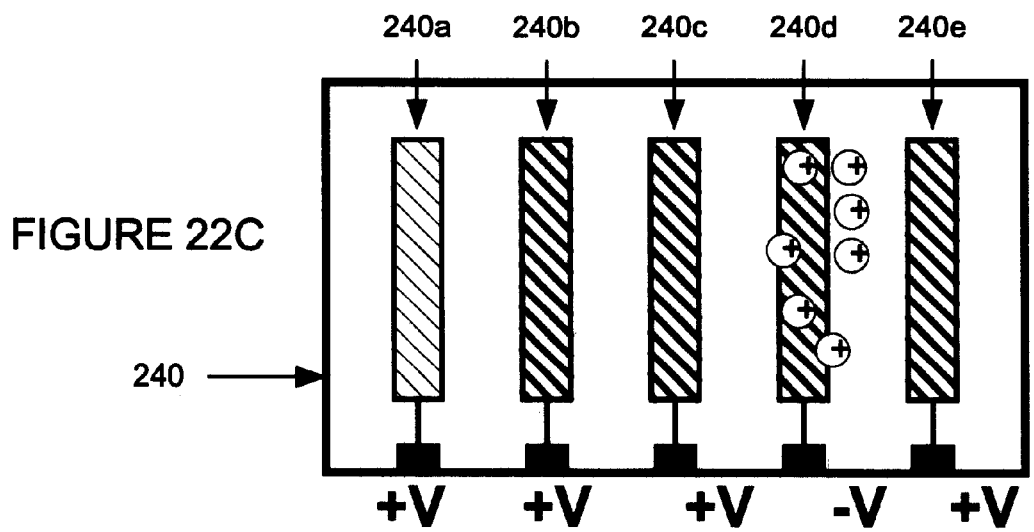

Another embodiment of the present invention involves a method of transporting and switching charged particles based on their movement in a DC electric field. For example, FIGS. 22A, 22B, 22C illustrate how positively-charged particles are moved across a linear, parallel electrode set. It will be appreciated that the following method may also be used with negatively charged particles, except that the polarities of the electrodes will be the opposites of those described for positively charged particles. A plurality of electrodes 240a, 240b, 240c, 240d, 240e (any number of electrodes may be used) is provided, with the electrodes being spaced apart from each other. The electrodes 240a, 240b, 240c, 240d, 240e may be fabricated, for example, on a substrate 240 like the other substrates disclosed herein. A particle suspension containing charged particles 244 is brought into proximity with the electrodes 240a, 240b, 240c, 240d, 240e. Voltages are applied to the electrodes 240a, 240b, 240c, 240d, 240e such that the particles 244 are attracted to one of the electrodes. For example, if the particles 244 are positively charged as indicated in FIG. 22A, then one of the electrodes (e.g., electrode 240b) may be applied with negative electrical potential (i.e., be charged negatively) in order to attract the particles 244 to it; additionally, the other electrodes (e.g., 240a, 240c, 240d, 240e) may be applied with positive potential (i.e., positively charged) to further urge the particles 244 to the negatively charged electrode 240b. Once the positively-charged particles 244 have been attracted to (onto) the electrode 240b, the particles can be transported to a nearby (e.g., adjacent) electrode (see FIG. 22B) by reducing the magnitude and/or reversing the polarity of the electrical potential applied to the electrode 240b while applying a negative electrical potential to, e.g., the electrode 240c. When the negative potential applied to the electrode 240b has been reduced to a sufficiently low value and/or the negative potential applied to the electrode 240c is sufficiently large, the particles 244 will move away from the electrode 240b to the adjacent electrode 240c. As shown in FIG. 22B, transporting the particles from the electrode 240b to the electrode 240c may be most easily accomplished by reversing the polarity of the electrode 240b (to positive), while applying a negative electrical potential to the electrode 240c and applying a positive electrical potential to the remaining electrodes 240a, 240d, 240e. As shown in FIG. 22C, this procedure may be repeated in a step-wise fashion to transport charged particles 244 from one electrode to another electrode, preferably each time from one electrode to an adjacent electrode. Thus, as in the embodiments which rely on traveling wave dielectrophoresis, charged particles are moved across an electrode set by appropriately applying electrical potentials.

The particle motion described with respect to FIGS. 22A, 22B, and 22C results from the electrophoretic force exerted by a DC electrical field on charged particles. Since in this method the electrical potential is effectively shifted down from one electrode to the next electrode like a "traveling wave of electrical potentials", the motion of the charged particles in this case may be termed traveling-wave-electrophoresis. For moving a positively-charged particle in a certain direction (as in FIGS. 22A–22C), it is necessary to move a negative-potential in that same direction along the electrode set. Conversely, for moving a negatively-charged particle in a certain direction, it is necessary to move a positive-potential in that direction along the electrode set. It is important to note that in this embodiment, the motion of charged particles along the electrodes is synchronized with the application of electrical potentials to the electrode set. Each shift in the applied potential to the next electrode results in a corresponding translation of the charged particles along the electrodes. This traveling-wave-electrophoresis based mechanism affects only charged particles.

Figure 23A:
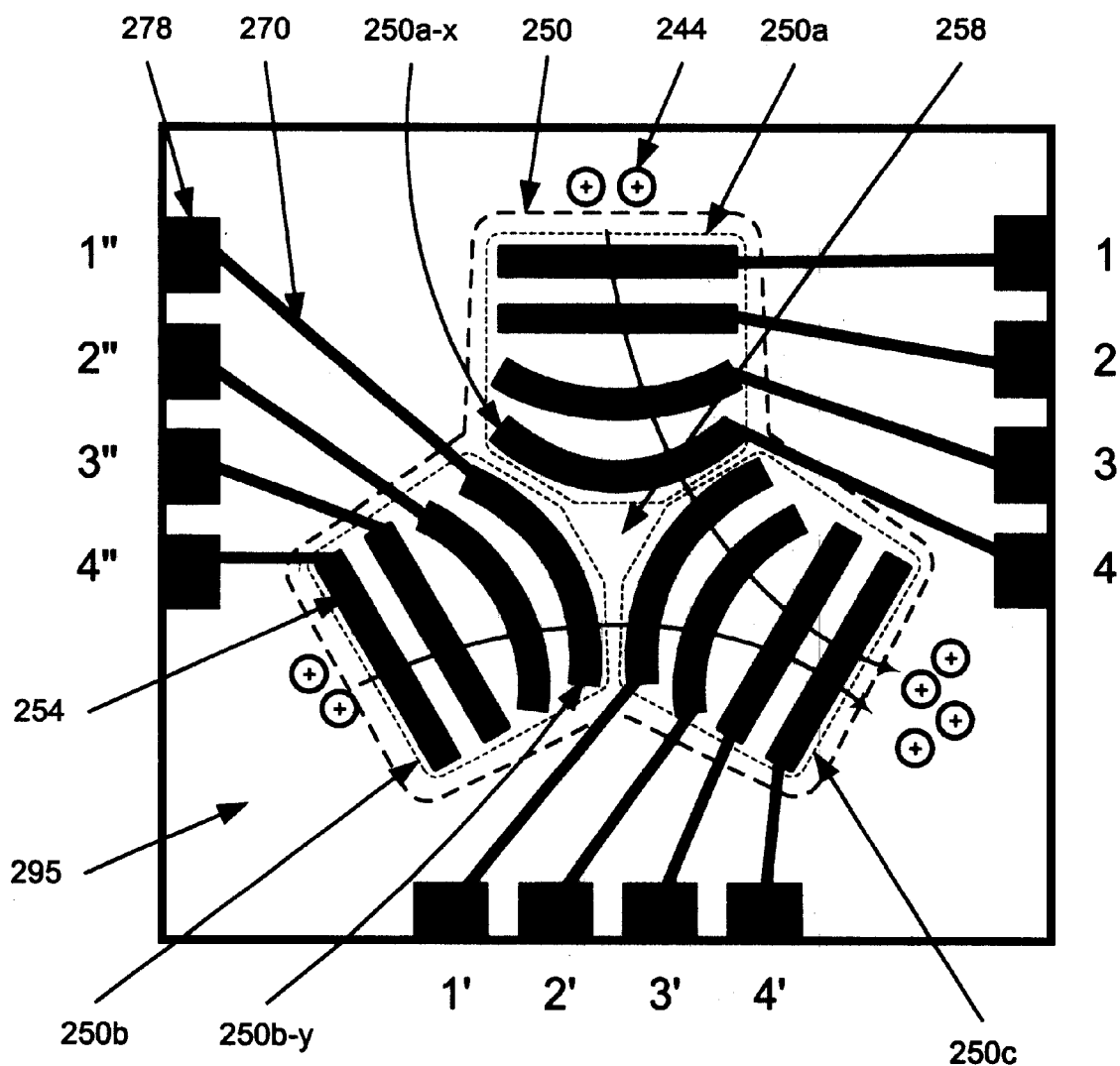
FIG. 23A is a schematic of a three-branch device for transporting charged particles using the method illustrated with respect to FIGS. 22A, B, and C.

FIG. 23A is a schematic of a three branch device 295 for transporting and switching charged particles 244 in accordance with the method described above in connection with FIGS. 22A, 22B, and 22C. An arbitrary number of branches may be used, and larger arrays comprising multiple particle switches connected together may be constructed in analogy with the device illustrated in FIGS. 18A and 18B. FIG. 23A shows three sets 250a, 250b, 250c of electrodes 254, which interconnect at a common junction 258. The individual electrodes 254 in the three electrode sets 250a, 250b, 250c are connected through electrical conductor elements 270 to respective connection pads 278. The three electrode sets 250a, 250b, 250c are advantageously electrically independent from each other and may be connected separately to at least one signal generator (not shown). Devices like those shown in FIG. 23A may be used to construct apparatuses similar to those shown in FIG. 2 (or FIGS. 16–21). Appropriate electrical signals should be applied to the individual electrode sets in order to manipulate and transport the charged particles.

Figure 23B:
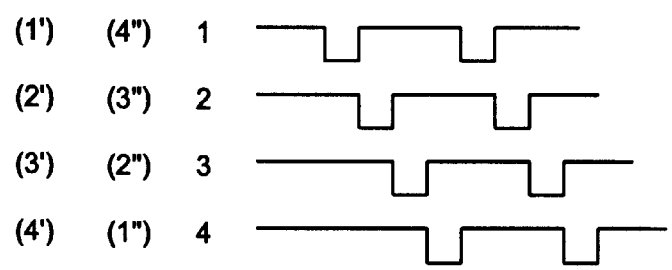
FIG. 23B shows the voltage signals that may be applied to the electrodes of a particle switch to transport and switch charged particles.

FIG. 23B shows an example of the time-dependent DC electrical potentials that can be applied to the electrodes shown in FIG. 23A. The signal sequences are labeled with the numbers 1, 2, 3, 4, 1', 2', 3', 4', 1", 2", 3" and 4". Each of the connection pads 278 in FIG. 23A is also individually labeled with a number, corresponding to the sequence in FIG. 23B for applying signals to each of the pads. Such electrical signals cause the positively charged particles 244 to move from the electrode sets 250a and 250b to the electrode set 250c. Note that the electrical potentials applied to the electrodes 254 may be supplied in the manner outlined above to transport charged particles within a branch and from one branch to another branch via the common junction 258. It is important that the potentials of the electrodes facing each other across the common junction 258 be appropriately synchronized so that the particles 244 can move from one branch to another branch. For example, when switching a negatively-charged particle from the branch 250a to the branch 250b, the positive potential applied to the electrode 250a–x of the branch 250a may be advantageously shifted to the electrode 250b–y of the branch 250b.

Figure 24A:
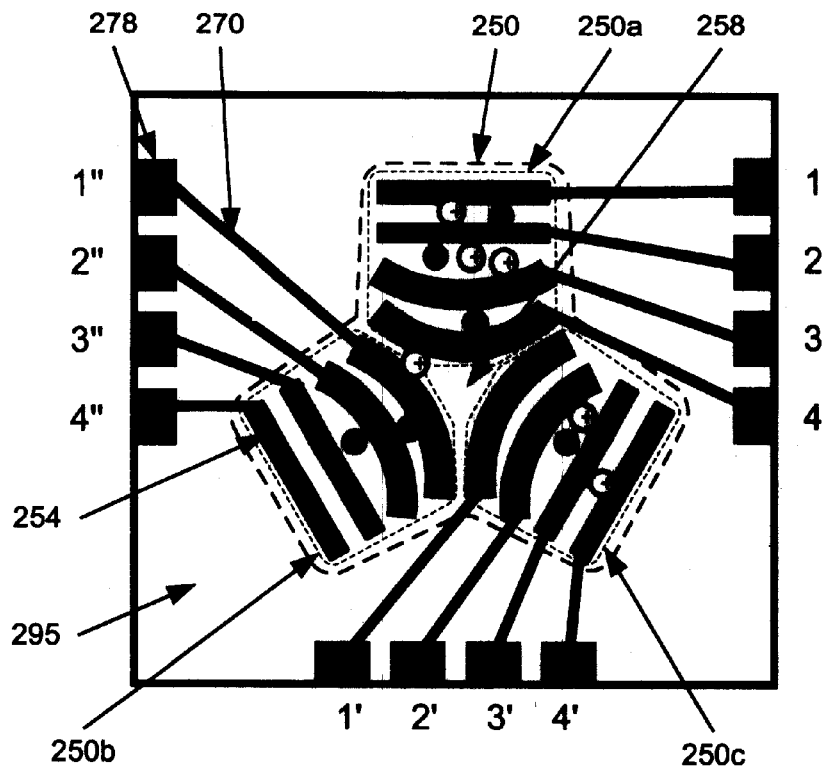
FIGS. 24A and 24B illustrate one way that positively-charged particles may be separated from non-charged particles using electric fields generated by a particle switch.
Figure 24B:
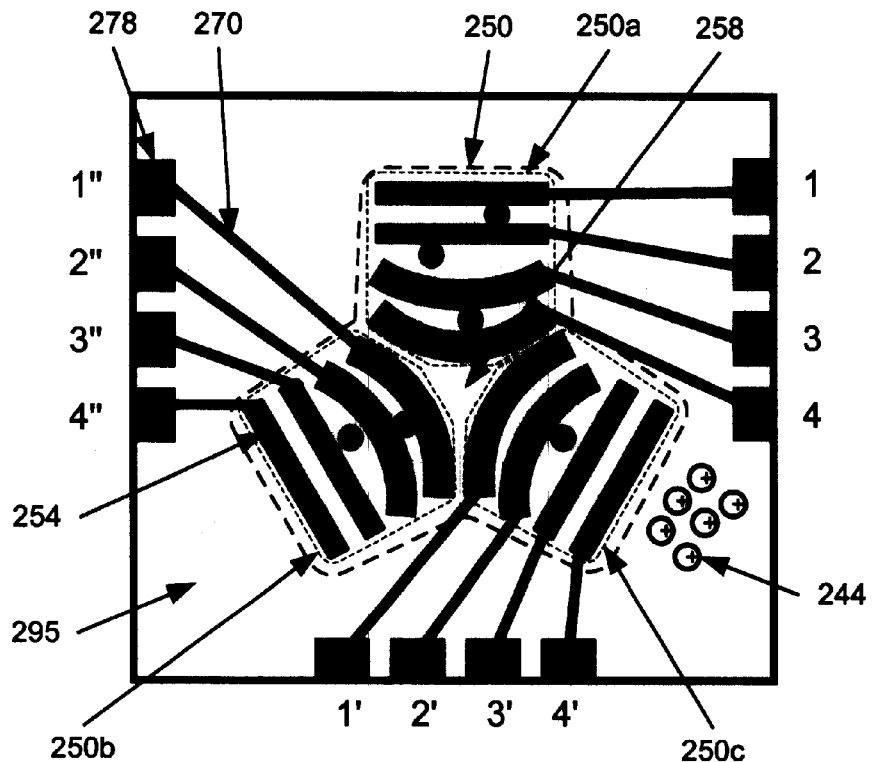

Electrical signals may be applied to the electrodes in different ways, resulting in different ways of manipulating and transporting charged particles. For example, the device may also be used to transport and switch negatively charged particles. Alternatively, the device may be used to separate charged particles from non-charged particles, or separate positively-charged particles from negatively charged particles. For example, the following steps may be used to separate positively-charged particles from non-charged particles. FIG. 24A shows two kinds of particles 244, 294 (positively-charged particles 244 are represented by white circles marked with 'plus' sign and non-charged particles 294 are represented by dark circles) after a solution containing both kinds of particles has been introduced into an apparatus comprising a charged-particle manipulation chip 295 such as that shown in FIG. 23A. The complete apparatus is constructed according to the arrangement shown in FIG. 2. FIG. 24A shows that the two kinds of particles 244, 294 are distributed randomly throughout the branches of particle switch 250 after the solution is initially loaded into the apparatus. When DC electrical signals are applied to the electrodes 254 on the chip 295 according to the sequence shown in FIG. 23B, the positively-charged particles 244 are transported and directed towards the branch 250c while the non-charged particles 294 remain stationary and are thereby left behind in the particle switch 250 (FIG. 24B). In this manner, the particle switch 250 acts as a particle separator, and the positively-charged particles 244 are effectively concentrated or aggregated at an end of one of the branches, or they may be collected outside the apparatus through an output tubing segment.

The methods illustrated in FIGS. 24A and 24B for separating positively-charged particles from non-charged particles can be readily extended for separating negatively-charged particles from non-charged particles and for separating negatively-charged particles from positively-charged particles.

With respect to traveling-wave electrophoresis effects, several general issues should be considered. First, in some instances, a DC electric field may produce unwanted electrochemistry effects on the electrode surfaces. In such instances, relatively small electrode potentials are preferably used to help reduce or eliminate unwanted electrolytic effects, e.g., water electrolysis, do not take place in the solutions used to transport the particles. Secondly, in some instances, because of the electrode-polarization effect, a large fraction of the applied DC electrical voltage may be dropped across the electrode-solution interface. Thus, in such instances, only a small DC electrical voltage is actually applied across the solution separating adjacent electrodes to generate the DC electric field for transporting the charged particles. When choosing the magnitudes of the electric potentials supplied to the electrodes, this effect is preferably taken into account.

Furthermore, in some embodiments of the particle switches described herein, it may be advantageous to cover the electrodes with a thin layer of an insulator or a thin-layer of a biocompatible material. For the electrodes in either a twDEP particle switch or a traveling-wave-electrophoresis particle switch, a thin-layer of a porous or non-porous coating may be used for covering the electrode surfaces or the substrate surfaces on which the electrode are positioned. Such a thin-layer may prevent particles from sticking to the electrodes or the substrate, as the case may be. For example, a hydrophobic layer may be used to prevent particles with hydrophilic surfaces from sticking. Other functional layers, such as a hydrophilic layer, may also be used, depending on the application. Additionally, functional molecules may be incorporated into these thin layers. These functional molecules may, for example, bind or immobilize the target particles that are being manipulated.

Two types of particle switches were fabricated on glass substrates (about 1 mm thick) using the single layer photolithography technique. The general layout of the electrodes on the substrate was similar to that illustrated in FIG. 2, with each particle switch comprising three branches of electrode sets. Each branch in these switches consisted of eight electrodes, instead of the four electrodes for each branch in the particle switch shown in FIG. 2. The eight electrodes in each branch were individually and alternately connected to the pads located along two sides of the square-shaped chips, as shown in FIGS. 19A, 19B, 19C, and 19D. FIGS. 19A and 19B are photomask images for making these two types of particle switches, and FIGS. 19C and 19D are the photo images of the fabricated particle switches. For example, in FIGS. 19A and 19C, the electrodes 1, 3, 5, 7 of the top branch are connected to the pads on the right side of the chip, while the electrodes 2, 4, 6, 8 of the top branch are connected to the pads on the left side of chip. These connections between individual electrodes and connection pads are like the electrical connections schematically shown in FIG. 3B. In FIGS. 19A and 19B, the black features, e.g., the black lines and pads, correspond to the electrodes. In FIGS. 19C and 19D, the white features correspond to the electrodes. Thus, there were a total of 26 pads on each chip, of which 24 pads (176a in FIG. 19A and 178a in FIG. 19B) were for electrical connections of the electrodes in the three branches and the other 2 pads (176b in FIG. 19A and 178b in FIG. 19B) were for electrical connections of two additional electrodes (176c in FIG. 19A and 178c in FIG. 19B). For a first type of fabricated particle switch as detailed in FIG. 19C, there were six linear, parallel electrodes with two curved electrodes facing the common junction. For a second type of fabricated particle switch as detailed in FIG. 19D, all eight electrodes in each electrode set were bent to form an angle of 120 degrees. The two large electrodes (176c in FIG. 19A and 178c in FIG. 19B) located above the top branch electrode set may be used to urge particles into the particle switch under effects such as fluid flow forces. Both the electrode width and the gaps between the adjacent electrodes were designed to be 30 microns, with the fabricated electrode width being around 25 microns and the gaps between the electrodes being around 35 microns. The electrodes were patterned on the substrate using photolithography with photomasks. The electrodes were made of a thin gold layer (about 200 nanometers) on a titanium seed layer (about 25 nanometers). The metal layers (gold and titanium) were deposited on the glass by evaporation or sputtering. The substrate on which the electrodes are disposed was square with a width of about 2.5 cm. Together, this substrate and the electrodes constitute the particle switch chip.

All the individual electrode elements in the particle switch were connected to the pads on the edges. Electrical signals, supplied by a 4-phase signal generator, were applied to the electrodes through connecting wires to the pads. In the experiment, in order to change the phase sequences of the electrical signals applied to the electrodes, 2-way, four-pole mechanical switches were used for each electrode set.

Guide electrodes similar to those shown in FIG. 20A were also fabricated on a glass substrate. The guide electrodes, similar to the particle switch electrodes, were made of a thin gold layer (about 200 nanometers) on a titanium seed layer (about 25 nanometers), and fabricated using single layer photolithography. Each guide electrode (e.g., the electrode 188a) was about 500 microns long and 50 microns wide. The glass substrate and its guide electrodes constitute the guide electrode chip.

A device was constructed with the guide electrode chip on top and a particle switch chip underneath it, similar to the structure shown in FIG. 20B. The particle switch substrate having the electrode configuration of pointed electrodes (as in FIGS. 19B and 19D) was used as the bottom plate. The spacer was formed by two thin wires having a diameter of about 80 microns. The guide electrode chip was then used as a cover. The guide electrode chip and the particle switch chip were separated by the two thin wires and were glued together on two sides of the rectangular chips, with the other two sides remaining open, to allow the particle suspension to be introduced into the device.

The manipulation of particles using these particle switch devices was demonstrated on diluted human blood. An isotonic, aqueous buffer having 8.5% sucrose by weight was used to dilute the whole blood at a ratio 1:100. The diluted blood sample was introduced into the device through one of the opened sides. The blood cells, mainly red blood cells, were initially distributed randomly over the electrode sets of the particle switches. Four-phase electrical signals having a frequency between 10 kHz and 100 kHz and a peak-to-peak amplitude of 3–6 V were applied to the electrodes of each branch through connection pads. The phase sequences used were like those illustrated in FIGS. 5A–12A. In these frequency ranges, red blood cells exhibited positive values for the twDEP polarization factor ($\zeta_{twDEP}>0$) and were transported by the twDEP forces in the direction opposite that of the traveling direction of the traveling electric field, i.e., in the direction in which the phase of the electrical signals on the electrodes was increased. Using the phase sequence shown in FIG. 7A, the red blood cells on each of the three branches were transported away from the central region between the three branches, and transported to the region outside the electrode branches. Using the phase sequence shown in FIG. 10A, all the red blood cells on the three branches were concentrated into the central regions between the three branches. Using the phase sequences shown in FIGS. 5A, 8A and 11A, the red blood cells on one electrode branch (the phase sequence on the electrodes of this branch was increasing towards the center) were transported towards the center region between the electrode sets while the red blood cells on the other two branches were transported away from the center. Using the phase sequences shown in FIGS. 6A, 9A, and 12A, the red blood cells on one electrode branch (the phase sequence on the electrodes of this branch was increasing towards the center) were transported away from the center region between the electrode sets while the red blood cells on the other two branches were transported towards the center.

In these experiments, the guide electrodes were supplied with peak-to-peak voltages of 2–10 V at frequencies between 5 and 20 kHz.

Various embodiments of the present invention have been described above.

Although this invention has been described with reference to specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A device for producing traveling wave electric fields, comprising:
    at least three pathways which meet at a common junction, each of said pathways comprising a plurality of electrodes, wherein the plurality of electrodes in each of said pathways is electrically independent of the plurality of electrodes in the other pathways; and
    a signal source electrically connected to the plurality of electrodes in each of said pathways, wherein said signal source provides out-of-phase signals to the individual members of said plurality of electrodes in each pathway so as to produce a traveling wave electric field in each of said pathways.

2. A device for producing traveling wave electric fields, comprising:
    at least three sets of electrodes, wherein said sets of electrodes produce respective traveling wave electric fields in regions adjacent to said sets of electrodes when said electrodes are connected to out-of-phase signals, wherein said sets of electrodes are electrically independent of each other and meet at a common junction.

3. A device for manipulating particles, comprising:
    at least three pathways which meet at a common junction, each of said pathways comprising a set of electrodes which is electrically independent of the sets of electrodes in the other pathways;

wherein said set of electrodes in each of said pathways receives out-of-phase signals from at least one signal source, so as to generate traveling-wave dielectrophoresis (twDEP) forces on particles in each of said pathways to move the particles along each of said pathways; and wherein said common junction permits the twDEP forces to route the particles from one of said pathways to another of said pathways.

4. The device of claim 3, wherein said at least three sets of electrodes are three sets of electrodes.

5. The device of claim 4, wherein said three sets of electrodes are oriented at about 120 degrees with respect to each other.

6. The device of claim 3, wherein said at least three sets of electrodes are four sets of electrodes.

7. The device of claim 6, wherein said four sets of electrodes are oriented at about 90 degrees with respect to each other.

8. The device of claim 3, wherein each of said sets of electrodes comprises at least three electrodes.

9. The device of claim 3, further comprising input tubing in fluid communication with a particle source and at least a first one of said sets of electrodes.

10. The device of claim 9, further comprising output tubing in fluid communication with at least a second one of said sets of electrodes, said output tubing being in fluid communication with an output reservoir.

11. The device of claim 9, further comprising:

a substrate on which said sets of electrodes are disposed;

a cover having at least one port therein through which said input tubing passes; and a spacer element disposed between said substrate and said cover, said spacer element having an opening therein through which the particles to be manipulated are introduced from said input tubing.

12. The device of claim 3, wherein said at least three sets of electrodes are disposed on a solid substrate.

13. The device of claim 12, wherein said substrate is selected from the group consisting of silicon, glass, ceramics, and plastics.

14. The device of claim 3, wherein said at least one signal source applies AC voltages to each electrode in said sets of electrodes, wherein the phases of said voltages applied to the electrodes of said sets of electrodes are selected to induce respective traveling wave electric fields along said pathways.

15. The device of claim 14, wherein said phases are at 0, 90, 180, and 270 degrees with respect to each other.

16. The device of claim 14, further comprising conductor elements that extend from said electrodes to connection pads, said connection pads connected to at least one signal generator.

17. The device of claim 16, wherein the electrodes in any given one of said sets of electrodes are all connected to different connection pads.

18. The device of claim 16, wherein, in any given one of said sets of electrodes, adjacent electrodes are connected to different connection pads and more than one electrode is connected to at least one of said connection pads.

19. The device of claim 14, wherein the voltages applied to adjacent electrodes are out-of-phase with each other.

20. The device of claim 3, further comprising an electrically-independent, linear electrode set located adjacent one of said sets of electrodes, wherein said linear electrode set is capable of producing traveling wave electric fields.

21. A method of separating a first kind of particle from a second kind of particle, comprising:

introducing a continuous stream of fluid having first and second kinds of particle in suspension into a device of claim 20;

applying electric voltages to said linear electrode set to produce conventional dielectrophoresis (cDEP) forces on the first and second kinds of particles so that the first and second kinds of particles are attracted to electrodes of said linear electrode set where the first and second kinds of particles are held in place by the cDEP forces, ceasing the stream of fluid; and applying electric voltages to said linear electrode set and to said at least three sets of electrodes at frequencies and phases selected to generate traveling wave dielectrophoresis forces for transporting the first kind of particle to the end of one pathway and transporting the second kind of particles to the end of another.

22. The device of claim 3, wherein the particles comprise biological material.

23. The device of claim 22, wherein said biological material includes at least one member selected from the group consisting of cells, organelles, cell aggregates, biomolecule-covered microparticles, and complexes between moieties and their binding partners.

24. The device of claim 3, wherein the particles comprise non-biological material.

25. The device of claim 3, wherein at least one electrode disposed near said common junction has a curvature therein.

26. The device of claim 3, said electrodes having a configuration which is generally pointed.

27. The device of claim 3, wherein said electrodes in each of said sets of electrodes are concentric arc segments with decreasing size towards said common junction.

28. A device for manipulating particles, comprising an array of devices of claim 3 connected to one another.

29. A method of sorting particles, comprising:

providing a device of claim 3;

introducing a sample comprising at least two types of particles into the device; and generating traveling wave dielectrophoresis forces at said junction such that at least one of the particle types travels away from said junction in a first direction and at least one of the other particle types travels away from said junction in a second direction.

30. The method of claim 29, wherein twDEP forces are generated by applying voltages to the sets of electrodes.

31. The method of claim 29, further comprising identifying at least one particle type before said particle type enters the junction and applying voltages to the sets of electrodes, the voltages selected in view of the result of said identifying step.

32. The method of claim 31, wherein said identifying step comprises monitoring the fluorescence of said particle types.

33. A method of combining different kinds of particles, comprising:

introducing at least a first kind of particle into a first pathway of a device of claim 3;

introducing at least a second kind of particle into a second pathway of the device of claim 3; and transporting the at least said first kind and at least said second kind of particles towards said junction such that said at least said first kind of particle and said at least said second kind of particle are combined with one another at said junction.

34. A method of concentrating particles, comprising:

introducing particles into at least first and second pathways of a device of claim 3; and transporting the particles towards said junction such that the particles are concentrated at said junction.

35. The method of claim 34, comprising:

introducing particles into at least three pathways of the device; and transporting the particles in said at least three pathways towards said junction such that the particles are concentrated at said junction.

36. A method of dispersing particles, comprising:

introducing particles into a common junction of a device of claim 3;

dispersing the particles away from said junction and into at least two of the pathways.

37. The method of claim 36, comprising dispersing the particles away from said junction and into three pathways.

38. A method of separating particles from a mixture comprising a first kind of particle and a second kind of particle, the mixture being distributed throughout a device of claim 3, comprising:

applying conventional dielectrophoresis (cDEP) forces to the first kind of particle to cause the first kind of particle to remain stationary; and applying traveling wave dielectrophoresis (twDEP) forces to the second kind of particle to cause the second kind of particle to be moved away from and thereby be separated from the first kind of particle.

39. The method of claim 38, further comprising causing the first kind of particle to be attracted to at least one of said three sets of electrodes where the first kind of particle is held in place by the cDEP forces.

40. The method of claim 38, further comprising diverting the second kind of particle to a desired pathway.

41. The method of claim 38, wherein said separation comprises applying electric fields of different frequencies to at least one of said three sets of electrodes, the fields of the different frequencies interacting differently with the first and second kinds of particle to cause the first kind of particle to remain stationary while the second kind of particle is transported.

42. The method of claim 38, wherein the first and second kinds of particle are introduced onto electrodes in the form of a particle suspension.

43. The method of claim 38, wherein the mixture further comprises a third kind of particle, and wherein the method further comprises separating out the third kind of particle from the first and second kinds of particle.

44. A method of separating a first kind of particle from a second kind of particle, comprising:

introducing a continuous stream of fluid having the first and second kinds of particle in suspension into a device of claim 3;

applying conventional dielectrophoresis (cDEP) forces to the first kind of particle to cause the first kind of particle to be attracted to at least one of said three sets of electrodes where the first kind of particle is held in place by cDEP forces while the second kind of particle is carried with the stream of fluid and thereby separated from the first kind of particle;

ceasing the stream of fluid; and applying electric voltages to the electrodes at a frequency selected to generate traveling wave dielectrophoresis forces for transporting the first kind of particle.

45. A device for manipulating particles, comprising:

a first set of electrodes which generates traveling wave dielectrophoresis (twDEP) forces on particles which move the particles along a pathway, wherein the electrodes in said first set of electrodes are connected to a signal source capable of generating out-of-phase signals, thereby providing said twDEP forces; and a second set of electrodes which generates a centering force which urges said particles toward the center of said pathway, wherein the electrodes in said second set of electrodes are connected to a signal source capable of generating at least one electrical signal, thereby providing said centering force.

46. The device of claim 45, wherein said first set of electrodes is disposed on a first substrate, and said second set of electrodes is disposed on a second substrate, said substrates separated by a spacer.

47. The device of claim 45, wherein said second set of electrodes generates conventional dielectrophoresis (cDEP) forces.

48. The device of claim 47, wherein said electrodes of said second set are oriented substantially perpendicular to said electrodes of said first set.

49. A device for manipulating particles, comprising at least three pathways, each pathway comprising:

a first set of electrodes which generates traveling wave dielectrophoresis (twDEP) forces on particles which move the particles along a pathway, wherein the electrodes in said first set of electrodes are connected to a signal source capable of generating out-of-phase signals, thereby providing said twDEP forces; and a second set of electrodes which generates a centering force which urges said particles toward the center of said pathway, wherein the electrodes in said second set of electrodes are connected to a signal source capable of generating at least one electrical signal, thereby providing said centering force, and wherein said at least three pathways meet at a common junction to permit the twDEP forces to route particles from one of said pathways to another of said pathways.

50. A method of transporting particles, comprising:

(a) providing a plurality of electrodes which are spaced apart from each other;

(b) applying a voltage of a first polarity to a first electrode to attract particles having a net charge of a polarity opposite to the first polarity;

(c) transporting the particles to a second electrode by applying a voltage of the first polarity to the second electrode, while reducing the magnitude of the voltage applied to the first electrode, so that the charged particles are moved away from the first electrode and attracted towards the second electrode; and repeating said transporting procedure of step (c) for other electrodes to transport the particles from one electrode to another electrode in a step-wise fashion.

51. The method of claim 50, wherein the plurality of electrodes comprises:

at least three sets of electrodes, each set of electrodes forming a pathway, said sets of electrodes which generate forces on charged particles for moving the charged particles along respective pathways, wherein the sets of electrodes are electrically independent from each other and the pathways are interconnected at a common junction to permit the forces to route charged particles from one of the pathways to another of the pathways.

52. The method of claim 50, wherein the step of reducing the magnitude of the voltage comprises reversing the polarity of the first electrode.

53. The method of claim 52, wherein said transporting step comprises applying a voltage of a polarity opposite to the first polarity to all the electrodes except the second electrode.

\* \* \* \* \*